US012139818B2

(12) United States Patent
Cera et al.

(10) Patent No.: US 12,139,818 B2
(45) Date of Patent: Nov. 12, 2024

(54) ALPHA-KERATIN SOLUTIONS COMPRISING ALPHA-KERATIN INTERMEDIATE FILAMENTS IN LIQUID CRYSTAL PHASE, METHODS OF PREPARATION, AND USES THEREOF

(71) Applicant: President and Fellows of Harvard College, Cambridge, MA (US)

(72) Inventors: Luca Cera, Cambridge, MA (US); Kevin Kit Parker, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 615 days.

(21) Appl. No.: 17/262,318

(22) PCT Filed: Jul. 26, 2019

(86) PCT No.: PCT/US2019/043719

§ 371 (c)(1),
(2) Date: Jan. 22, 2021

(87) PCT Pub. No.: WO2020/023902

PCT Pub. Date: Jan. 30, 2020

(65) Prior Publication Data

US 2021/0324539 A1 Oct. 21, 2021

Related U.S. Application Data

(60) Provisional application No. 62/781,926, filed on Dec. 19, 2018, provisional application No. 62/703,630, filed on Jul. 26, 2018.

(51) Int. Cl.
*D01D 1/02* (2006.01)
*B33Y 70/00* (2020.01)
(Continued)

(52) U.S. Cl.
CPC ................ *D01D 1/02* (2013.01); *B33Y 70/00* (2014.12); *B33Y 80/00* (2014.12); *D01D 5/06* (2013.01); *D01F 4/00* (2013.01); *B33Y 10/00* (2014.12); *B33Y 30/00* (2014.12); *D10B 2211/02* (2013.01); *D10B 2401/046* (2013.01)

(58) Field of Classification Search
CPC ............... D01D 1/02; D01D 5/06; D01F 4/00
See application file for complete search history.

(56) References Cited

U.S. PATENT DOCUMENTS

2004/0103481 A1 6/2004 Russell

FOREIGN PATENT DOCUMENTS

CN 201545991 U 8/2010
JP H07300771 11/1995

OTHER PUBLICATIONS

Xiao et al. “Is biopolymer hair a multi-responsive smart material?” Polymer Chemistry, vol. 8 1-5, 31-34, 45-50 Issue 1 (Aug. 9, 2016): pp. 283-294.

(Continued)

*Primary Examiner* — Larry W Thrower
(74) *Attorney, Agent, or Firm* — McCarter & English, LLP; Maria Laccotripe Zacharakis; Deborah L. Nagle

(57) ABSTRACT

The present invention provides methods for preparing an alpha-keratin solution comprising alpha-keratin protofibrils and intermediate filaments in liquid crystal phase and uses thereof for fabricating, e.g., shape-memory polymeric fibers, yarns, threads, fabrics, structures and objects.

16 Claims, 43 Drawing Sheets

(51) Int. Cl.

| | |
|---|---|
| ***B33Y 80/00*** | (2015.01) |
| ***D01D 5/06*** | (2006.01) |
| ***D01F 4/00*** | (2006.01) |
| *B33Y 10/00* | (2015.01) |
| *B33Y 30/00* | (2015.01) |

(56) References Cited

OTHER PUBLICATIONS

Xiao et al. "Shape Memory Investigation of alpha-Keratin Fibers as Multi-Coupled Stimuli of 1-5, 31-34, 45-50 Responsive Smart Materials" polymers, vol. 9 Issue 3 (Mar. 3, 2017): pp. 1-15.

Hu et al. "The Investigation about the Shape Memory Behavior of Wool" Advances in Science 1-5, 31-34, 45-50 and Technology, vol. 60 (Sep. 2, 2008): pp. 1-10.

International Search Report and Writen Opinion from PCT/US2019/043719, mailed Oct. 24, 2019.

Keratin Fibrils

Keratin Fibrils: Detail

Strain, 7%

Strain, 22%

Strain, 30%

Strain, 22%

Strain, 11%

ALPHA-KERATIN SOLUTIONS COMPRISING ALPHA-KERATIN INTERMEDIATE FILAMENTS IN LIQUID CRYSTAL PHASE, METHODS OF PREPARATION, AND USES THEREOF

RELATED APPLICATIONS

This application is a U.S. national stage filing, under 35 U.S.C. § 371(c), of International Application No. PCT/US2019/043719, fled on Jul. 26, 2019, which claims the benefit of and priority to U.S. Provisional Application No. 62/703,630, filed on Jul. 26, 2018, and U.S. Provisional Application No. 62/781,926, filed on Dec. 19, 2018, the entire contents of each of which are incorporated herein by reference.

STATEMENT OF GOVERNMENT SUPPORT

This invention was made with government support under 1420570 awarded by the National Science Foundation. The government has certain rights in the invention.

BACKGROUND OF THE INVENTION

Shape-memory fabrics belong to a class of smart materials capable of returning from a deformed state to their original (e.g., fixed) shape induced by an external stimulus (e.g., trigger), such as temperature change. There could be benefits to employing shape-memory fibers, threads, yarns, and fabrics in smart textiles. Current shape-memory fibers, however, are limited to a restricted class of synthetic materials like metal alloys and polyurethanes making them non-ergonomic and non-biodegradable. Furthermore, current shape-memory fibers have poor compatibility with weaving manufacturing methods. Accordingly, the inventors have recognized that there is a need in the art for biocompatible, shape-memory polymeric fibers, threads, yarns, and fabrics that are can be prepared cost efficiently and are bio-sustainable and methods for preparing such shape-memory polymeric fibers, threads, yarns, and fabrics.

SUMMARY OF THE INVENTION

It has been observed that animal hair, such as wool, has a shape-memory effect that is based on the reversible phase transition of keratin alpha-helix into keratin beta-sheets. Alpha-keratin accounts for 90% of the weight of wool. Millions of tons of keratin-containing wool are wasted every year in the textile industry due to improper utilization. The inventors are unaware of any conventional methods for extracting alpha-keratin, such as alpha-keratin in its liquid crystal phase, for use as a spinning dope, and spinning of alpha-keratin fibers which maintain the hierarchical organization and anisotropic architecture of α-helices present in animal hair. Further, the inventors are not aware of any conventional methods for efficiently preparing alpha-keratin from animal hair that maintains the hierarchical organization and anisotropic architecture of α-helices present in animal hair, such as wool, and fabricating biocompatible, shape-memory polymeric fibers, threads, yarns, fabrics, and objects or structures using the extracted alpha-keratin.

Provided herein are methods for preparing an alpha-keratin solution and uses thereof for fabricating biocompatible, shape-memory polymeric fibers, threads, yarns, fabrics, and objects or structures from natural materials. Specifically, the present disclosure provides methods for preparing an alpha-keratin solution including alpha-keratin protofibrils and intermediate filaments in liquid crystal phase from hair, such as human or animal hair, e.g., wool, that is, e.g., suitable for use as a wet-spinning or dry-jet wet spinning dope that is compatible with art-known manufacturing methods or suitable for use in 3D printing of objects or structures. The spinning dope or 3D printing material prepared according to the methods of the invention preserves the ability of the alpha-keratin helices present in the dope or 3D printing material to adopt a hierarchical organization that mimics the in vivo hierarchical organization and shape-memory of native alpha-keratin protofibrils and intermediate filaments in hair. The present disclosure further discloses methods for preparing polymeric fibers, polymeric fiber threads, polymeric fiber yarns, polymeric fiber fabrics, and keratin shape memory objects or structures including the alpha-keratin intermediate filaments prepared from hair, e.g., wool. In some embodiments, the disclosed methods can also be used to produce light responsive, shape-memory fibers, yarns, fabrics, and objects or structures by combining gold nanoparticles, silicon nanocrystal, or nano-semiconductors with the keratin dope or 3D printing material. Some embodiments of the methods disclosed herein enable novel design and functionalities of biocompatible, shape-memory fabrics such as breathable fabrics, damping fabrics, wicking fabrics, body-adaptable fabrics, thermal energy storage fabrics, light responsive fabrics, and smart supercapacitors.

In one aspect, the present invention provides a method for preparing an alpha-keratin solution including alpha-keratin protofibrils and intermediate filaments in liquid crystal phase from hair for preparation of shape-memory polymeric fibers. In some embodiments, the method includes providing a hair powder and contacting the hair powder with an aqueous solution including about 6 M to about 12 M of a denaturing agent (e.g., lithium bromide (LiBr)) and about 50 mM to about 300 mM of a reducing agent, thereby preparing a hair residue suspension including insoluble hair residue and a solution including alpha-keratin protofibrils and intermediate filaments in liquid crystal phase. The method also includes separating the insoluble hair residue from the solution and contacting the solution with a salt solution including about 20 to about 50 mg/mL of the salt, thereby yielding a two-phase solution including alpha-keratin protofibrils and intermediate filaments in liquid crystal phase and a solution including the remaining salt. The method also includes separating the alpha-keratin protofibrils and intermediate filaments in liquid crystal phase from the solution including the remaining salt, thereby preparing the alpha-keratin solution including alpha-keratin protofibrils and intermediate filaments in liquid crystal phase from hair for preparation of shape-memory polymeric fibers. In some embodiments, the denaturing agent includes any of LiBr, a guanidinium salt like thiocyanate or HCl, and a deep eutectic solvent.

In one embodiment, the denaturing agent is LiBr.

In one embodiment, the prepared alpha-keratin solution includes at least 20% (w/v) alpha-keratin protofibrils and intermediate filaments.

In one embodiment, the prepared alpha-keratin solution includes at least 30% (w/v) alpha-keratin protofibrils and intermediate filaments.

In one embodiment, the prepared alpha-keratin solution includes between 25% and 50% (w/v) alpha-keratin protofibrils and intermediate filaments.

In one embodiment, the prepared alpha-keratin solution includes at least 40% (w/v) alpha-keratin protofibrils and intermediate filaments.

In one embodiment, the prepared alpha-keratin solution includes between 40% and 50% (w/v) alpha-keratin protofibrils and intermediate filaments.

In one embodiment, the hair is animal hair or human hair.

In one embodiment, the hair is wool.

In one embodiment, contacting the hair powder with the aqueous solution of the denaturing agent (e.g., LiBr) and a reducing agent includes mixing the wool powder and the aqueous solution at a temperature of about 70° C. to about 100° C. for about 16 to about 48 hours.

In one embodiment, the hair powder is contacted with a solution including about 6.25 M, about 6.5, about 6.75 M, about 7 M, about 7.25 M, about 7.5, about 7.75 M, about 8 M, about 8.25 M, about 8.5, about 8.75 M, about 8 M, about 8.25 M, about 8.5, about 8.75 M, about 9 M, about 9.25 M, about 9.5, about 9.75 M, about 10 M, about 10.25 M, about 1.5, about 10.75 M, about 11 M, about 11.25 M, about 11.5, or about 11.75 M of the denaturing agent (e.g., LiBr).

In one embodiment, the hair powder is contacted with a solution including about 8 M of the denaturing agent (e.g., LiBr).

In one embodiment, the hair powder is contacted with a solution including about between 7 M LiBr and 9 M of the denaturing agent (e.g., LiBr).

In one embodiment, the reducing agent is dithiothreitol (DTT).

In one embodiment, the wool powder is contacted with a solution including about 75 mM, about 100 mM, about 125 mM, about 150 mM, 175 mM, 200 mM, about 225 mM, about 250 mM, or about 275 mM DTT.

In one embodiment, the hair powder is contacted with a solution including about 150 mM DTT.

In one embodiment, the hair powder is contacted with a solution including between 130 mM DTT and 170 mM DTT.

In one embodiment, the insoluble hair residue is removed from the hair residue suspension by filtration or ultracentrifugation.

In one embodiment, the filtration is hot filtration.

In one embodiment, the salt solution includes sodium chloride (NaCl), a phosphate salt (e.g., $NaH_2PO_4$ or $Na_2HPO_4$), calcium chloride ($CaCl_2$), magnesium chloride ($MgCl_2$), a sulfate, or a combination of any of aforementioned.

In one embodiment, the salt solution includes a concentration of the salt sufficient to achieve complete precipitation of the alpha-keratin crystal phase.

In one embodiment, the salt is NaCl and the solution includes about 21, 22, 23, 24, 25, 26, 27, 28, 29, 30, 31, 32, 33, 34, 35, 36, 37, 28, 39, 40, 41, 42, 43, 44, 45, 46, 47, 48, or about 49 mg/mL NaCl.

In one embodiment, the solution including alpha-keratin intermediate filaments in liquid crystal phase is separated from the solution including the remaining salt by filtration.

In one aspect, the present invention provides a method of making one or more shape-memory polymeric fibers. In some embodiments the method includes preparing alpha-keratin solution including alpha-keratin protofibrils and intermediate filaments in liquid crystal phase from hair according to any one of the methods described herein, and forming one or more shape-memory polymeric fibers including alpha-keratin via wet spinning of a spinning material including the alpha-keratin solution.

In one embodiment, forming the one or more shape-memory polymeric fibers includes extruding or ejecting the one or more streams of the spinning material into a first coagulation bath forming one or more polymeric fibers.

In one embodiment, the first coagulation bath includes $NaH_2PO_4$, $Na_2HPO_4$, $Na_2SO_4$, $CaCl_2$, $MgCl_2$, or any combination of the aforementioned.

In one embodiment, forming the one or more shape-memory polymeric fibers further includes drawing the one or more polymeric fibers from the first coagulation bath into a second coagulation bath that fixes a configuration of the fibers.

In one embodiment, the second coagulation bath includes a thiol oxidative agent, e.g., $H_2O_2$, and at least one coagulation salt. In some embodiments, the thiol oxidative agent includes $H_2O_2$, sodium hypochlorite (NaClO), any other hypochlorite salt, or any combination of the aforementioned.

In one embodiment, forming the one or more shape-memory polymeric fibers including alpha-keratin via wet spinning of the spinning material including the alpha-keratin solution includes: introducing a spinning material including the alpha-keratin solution into a reservoir having one or more orifices; rotating the reservoir about an axis of rotation of the reservoir to cause ejection of the spinning material through the one or more orifices in one or more jets; and collecting the one or more jets of the spinning material in a collection device including a coagulating first solution forming one or more polymeric fibers.

In one embodiment, the first solution includes $NaH_2PO_4$, $Na_2HPO_4$, $Na_2SO_4$, $CaCl_2$, $MgCl_2$, or any combination of the aforementioned.

In one embodiment, the first solution includes about 0.1, about 0.15, about 0.2, about 0.25, about 0.3, about 0.35, about 0.4, about 0.45, about 0.5, about 0.55, about 0.6, about 0.65, or about 0.7 M $Na_2SO_4$.

In one embodiment, the method further includes exposing the formed one or more polymeric fibers to a second solution.

In one embodiment, the second solution includes a thiol oxidative agent, (e.g., $H_2O_2$), and at least one coagulation salt. In some embodiments, the thiol oxidative agent includes $H_2O_2$, sodium hypochlorite (NaClO), any other hypochlorite salt, or any combination of the aforementioned.

In one embodiment, the at least one coagulation salt includes one or more of $NaH_2PO_4$, $Na_2HPO_4$, $Na_2SO_4$, $CaCl_2$, $MgCl_2$, or any combination of the aforementioned.

In one embodiment, the second solution includes about 0.5, about 0.6, about 0.7, about 0.8, about 0.9, about 1.0, about 1.1, about 1.2, about 1.3, about 1.4, about 1.5 M $Na_2SO_4$; and about 0.5, 0.6, 0.7, 0.8, 0.9, 1, 1.1, 1.2, 1.3, 1.4, or about 1.5% $H_2O_2$.

In one aspect, the present invention provides a method including making a plurality of shape-memory polymeric fibers according to any of the foregoing methods of the invention and forming a shape-memory thread, a shape-memory yarn, and/or a shape-memory fabric from the plurality of shape-memory polymeric fibers.

In one aspect, the present invention provides a method of making a shape memory object or structure. The method includes providing an alpha-keratin solution including alpha-keratin protofibrils and intermediate filaments in liquid crystal phase, and forming a shape memory object or structure from a material including the alpha-keratin solution via additive manufacturing.

In one aspect, the present invention provides a method of making a shape memory object or structure. The method includes providing an alpha-keratin solution including alpha-keratin protofibrils and intermediate filaments in liquid crystal phase prepared according to any method described herein, and forming a shape memory object or structure from a material including the alpha-keratin solution via additive manufacturing.

In one embodiment, forming the shape memory object or structure from the material including the alpha-keratin solution via additive manufacturing includes extruding the material from one or more nozzles onto a solid support in a bath while moving the one or more nozzles relative to the solid support or moving the solid support relative to the one or more nozzles in at least two dimensions, and coagulating the extruded material forming an extruded material object or structure.

In one embodiment, a 3D printing system is used to extrude the material onto the solid support.

In one embodiment, coagulating the extruded material includes exposing the extruded material to a coagulating solution including $NaH_2PO_4$, $Na_2HPO_4$, $Na_2SO_4$, $CaCl_2$, $MgCl_2$, or any combination of the aforementioned.

In one embodiment, the material is extruded into a printing bath that supports the extruded material object or structure and at least partially coagulated the extruded material and then later exposed to the coagulating solution including $NaH_2PO_4$, $Na_2HPO_4$, $Na_2SO_4$, $CaCl_2$, $MgCl_2$, or any combination of the aforementioned.

In one embodiment, the coagulating solution includes about 0.1, about 0.15, about 0.2, about 0.25, about 0.3, about 0.35, about 0.4, about 0.45, about 0.5, about 0.55, about 0.6, about 0.65, or about 0.7 M $Na_2SO_4$.

In one embodiment, forming a shape memory object or structure from a material including the alpha-keratin solution via additive manufacturing further includes fixing a memory configuration of the extruded material object or structure while the extruded material object or structure is in a desired memory shape.

In one embodiment, the method further includes physically manipulating the extruded material object or structure into the desired memory shape prior to fixing.

In one embodiment, fixing the memory configuration of extruded material object or structure includes exposing the extruded material object or structure to a solution including a thiol oxidative agent (e.g., $H_2O_2$) and at least one coagulation salt. In some embodiments, the thiol oxidative agent includes $H_2O_2$, sodium hypochlorite (NaClO), any other hypochlorite salt, or any combination of the aforementioned.

In one embodiment, the at least one coagulation salt includes one or more of $NaH_2PO_4$, $Na_2HPO_4$, $Na_2SO_4$, $CaCl_2$, $MgCl_2$.

In one aspect, the present invention provides an alpha-keratin solution for preparation of a shape-memory material, including alpha-keratin protofibrils and intermediate filaments in liquid crystal phase, where the alpha-keratin solution includes at least 30% (w/v) alpha-keratin protofibrils and intermediate filaments.

In one embodiment, the alpha-keratin solution includes between 30% and 50% (w/v) alpha-keratin protofibrils and intermediate filaments.

In one embodiment, the alpha-keratin solution includes at least 40% (w/v) alpha-keratin protofibrils and intermediate filaments.

In one embodiment, the alpha-keratin solution includes between 40% and 50% (w/v) alpha-keratin protofibrils and intermediate filaments.

In one embodiment, the alpha-keratin protofibrils and intermediate filaments are extracted from animal hair or human hair.

In one embodiment, the hair is wool.

In one embodiment, the alpha-keratin protofibrils have a diameter of about 2 nanometers (nm) to about 3 nanometers (nm).

In one embodiment, the alpha-keratin intermediate filaments have a diameter of about 8 nm to about 15 nm.

In one aspect, the present invention provides a shape-memory polymeric fiber, prepared from any one of the alpha-keratin solutions of the invention.

In one aspect, the present invention provides a shape-memory thread, a shape-memory yarn, and/or a shape-memory fabric made from a plurality of the shape-memory polymeric fibers of the invention.

In one aspect, the present invention provides a shape-memory object or structure made from a plurality of shape-memory threads, shape-memory yarns, and/or shape-memory fabrics of the invention.

In one aspect, the present invention provides a shape-memory polymeric fiber prepared according to any one of the methods of the invention.

In another aspect, the present invention provides a shape-memory thread, a shape-memory yarn, and/or a shape-memory fabric prepared according to any of the methods of the invention.

Further features and advantages of certain embodiments will become more fully apparent in the following description of embodiments and drawings thereof, and from the claims.

BRIEF DESCRIPTION OF THE DRAWINGS

The drawings are intended to illustrate aspects and embodiments described herein and are not intended to depict relative sizes and dimensions, or to limit the scope of examples or embodiments.

FIG. 11A is an SEM image of a keratin polymeric fiber drawn at 1.1 m/min. FIG. 11B is an SEM image of a keratin polymeric fiber drawn at 2.2 m/min. FIG. 11C is an SEM image of a keratin polymeric fiber drawn at 3.3 m/min. FIG. 11D is an SEM image of a keratin polymeric fiber drawn at 4.4 m/min. FIG. 11E is an SEM image of a keratin polymeric fiber drawn at 5.5 m/min. FIG. 11F is an SEM image of a keratin polymeric fiber drawn at 6.6 m/min. FIG. 11G is an SEM image of a keratin polymeric fiber drawn at 7.7 m/min. FIG. 11H is an SEM image of a keratin polymeric fiber drawn at 9.9 m/min.

FIG. 18A is an image of the fiber just after exposure to water at 0 seconds. FIG. 18B is an image of the fiber after 10 seconds. FIG. 18C is an image of the fiber after 30 seconds. FIG. 18D is an image of the fiber after 60 seconds. FIG. 18E is an image of the fiber after 130 seconds.

FIG. 19C is an image taken of the yarn when wet, under 5 grams of load, and exhibiting 7% strain.

FIG. 19D is an image taken of the yarn when wet, under 50 grams of load and exhibiting 22% strain. FIG. 19E is an image taken of the yarn when wet, under 70 grams of load, and exhibiting 30% strain. FIG. 19F is an image taken of the yarn when dry, under 5 grams of load and exhibiting 22% strain. FIG. 19G is an image taken of the yarn when wet 5, under 5 grams of load and exhibiting 11% strain.

FIG. 23A is an image of a 3D printed structure printed with a filling parameter of 50%. FIG. 23B is an image of a 3D printed structure printed with a filling parameter of 80%. FIG. 23C is an image of a 3D printed structure printed with a filling parameter of 80%.

DETAILED DESCRIPTION

Figure 1A:
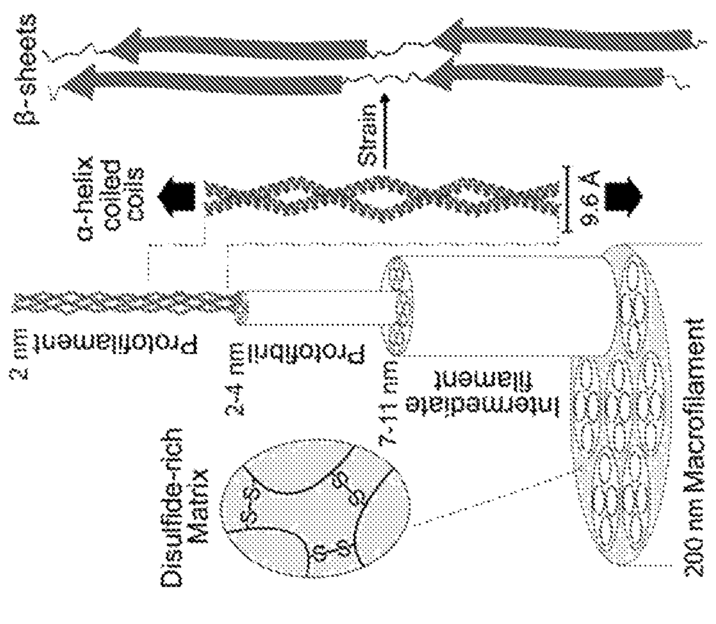
FIG. 1A schematically depicts the hierarchical structure of wool keratin and an α-helix-to-β-sheet transition under strain. The coiled-coils are the smallest protein building blocks, which further self-assembled to generate the protofibrils as the first fibrillar assembly, and protofibrils, intermediate filaments and macrofilaments along with the increase of special scale. The gray area represents the matrix component of the hair, which is rich in disulfide bonds and stabilize the packing of intermediate filaments within macrofilaments.

Provided herein are methods for preparing an alpha-keratin and uses thereof for fabricating biocompatible, shape-memory polymeric fibers, threads, yarns, fabrics, and shape-memory objects from natural materials. Specifically, the present disclosure provides methods for preparing an alpha-keratin solution including alpha-keratin protofibrils and intermediate filaments in liquid crystal phase from hair, such as human or animal hair, e.g., wool.

Methods are also provided herein for preparing polymeric fibers, polymeric fiber threads, polymeric fiber yarns, and polymeric fiber fabrics including the alpha-keratin protofibrils and intermediate filaments extracted from hair, e.g., wool, using the methods disclosed herein.

Methods are also provided herein for preparing shape-memory objects from the alpha-keratin solutions disclosed herein using additive manufacturing (e.g., 3D printing).

The methods of the present invention are useful in various applications. By recapitulating the hierarchical organization and anisotropic architecture of the alpha-helices present in animal hair, the alpha-keratin solution including alpha-keratin protofibrils and intermediate filaments serves as a desirable material for use in a spinning process, e.g., wet-spinning or dry jet-wet spinning process, as it is amenable to be used as a dope in any suitable method to spin, e.g., wet or dry jet-wet spin, shape-memory polymeric fibers e.g., for threads, yarns and/or fabrics, and it is amenable to be used in additive manufacturing, e.g., 3D printing, to produce shape-memory objects. In addition, light responsive fabrics can be made by combining gold nanoparticles, silicon nanoocrystal, or nano-semiconductors with the keratin dope prior to the spinning process. In some embodiments, the shape-memory polymeric fibers produced according to the methods disclosed herein can be further used to make various smart materials such as breathable fabrics, damping fabrics, body-adaptable fabrics, thermal energy storage fabrics, light responsive fabrics, and smart supercapacitors.

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as “one embodiment”, “an embodiment”, “an example embodiment” or “an exemplary embodiment” means that a particular feature, structure or characteristic described in connection with the embodiment is included in at least one embodiment of the invention and could possibly be included in multiple different embodiments. The appearances of phrases such as “in one embodiment” in various places in the specification are not necessarily all referring to the same embodiment.

In addition, it should be noted that whenever a value or range of values of a parameter are recited, it is intended that values and ranges intermediate to the recited values are also part of this invention.

In order that the disclosure may be more readily understood, certain terms are first defined. These definitions should be read in light of the remainder of the disclosure and as understood by a person of ordinary skill in the art. Unless defined otherwise, all technical and scientific terms used herein have the same meaning as commonly understood by a person of ordinary skill in the art. Additional definitions are set forth throughout the detailed description.

I. Definitions

The articles "a" and "an," as used herein, should be understood to mean "at least one," unless clearly indicated to the contrary.

The phrase "and/or," when used between elements in a list, is intended to mean either (1) that only a single listed element is present, or (2) that more than one element of the list is present. For example, "A, B, and/or C" indicates that the selection may be A alone; B alone; C alone; A and B; A and C; B and C; or A, B, and C. The phrase "and/or" may be used interchangeably with "at least one of" or "one or more of" the elements in a list.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

"Alpha-keratin" or "α-keratin" is an α-helical fibrous protein found in higher animals such as mammals, birds and reptiles. Alpha-keratin is the primary component of hairs, horns, nails and the epidermal layer of the skin. The secondary structure of natural alpha-keratin is composed predominantly of alpha-helices, which form coiled-coil dimers in strands along the fiber axis. Dimers are typically formed by one neutral-basic keratin (type II) fiber and one acidic keratin (type I) fiber. In turn, these dimers coil together in an antiparallel manner to form tetramers. When tetramers are connected from head to tail, they are known as "protofilaments." The protofilaments pair to form protofibrils. Protofibrils self-assemble to form a bundle called an "intermediate filament" ("IF"), or "keratin intermediate filament" ("KIF"), with a diameter of about 70-110 Å is formed. Keratin intermediate filaments further assemble into micro filaments with a diameter of about 0.1-0.4 μm and multiple micro filaments of keratin form macrostructures such as animal hair with a diameter of about 50 μm (see, R. A. Quinlan et al, *Ann. N. Y. Acad. Sci.* 1985, 455, 282-306, H. Thomas et al. *Int. J. Biol. Macromol.* 1986, 8, 258-264 and C. Popescu et al, Chem. Soc. Rev., 2007, 36, 1282-1291).

As used herein, "liquid crystals" or "liquid crystal phase" refers to a matter or a state of matter wherein the matter has properties between those of a conventional liquid and those of a solid crystal. For example, a liquid crystal may flow like a liquid, but the molecules in a liquid crystal may be oriented in a crystal-like way. Accordingly, an "alpha-keratin protofibril and intermediate filament in liquid crystal phase" is a substance that flows like a liquid having alpha-helical keratin arranged or organized into protofibrils and intermediate filaments oriented in a crystal-like way.

As used herein, a "reducing agent" is a compound that cleaves the disulfide bonds (S-S) present in the keratin, by forming two thio groups (SH) and prevents the protein from aggregating. Exemplary reducing agents include, but are not limited to 1, 4-dithiothreitol (DTT), 2-Mercaptoethanol (BME), dithioerythritol (DTE), Tris (2-Carboxyethyl) phosphine hydrochloride) (TCEP) and L-glutathione (GSH). In some embodiments, a reducing agent is a DTT.

As used herein, the term "powder" refers to a dry, bulk solid including fine particles that flow freely when shaken or tilted.

As used herein, a "suspension" is a heterogeneous mixture that contains solid particles sufficiently large for sedimentation. The particles may be visible to the naked eye or under a microscope, usually must be larger than 1 micrometer, and will eventually settle. Suspensions are heterogeneous mixtures in which the solid particles do not dissolve, but get suspended throughout the bulk of the solvent, left floating around freely in the medium. The internal phase (solid) is dispersed throughout the external phase (fluid) through mechanical agitation.

A "solution" is a homogeneous liquid mixture including two or more substances, the minor component (the solute) which is uniformly distributed within the major component (the solvent).

A "two-phase solution" is a mixture of two immiscible solutions in which the boundary of separation of the two solutions is visible.

As used herein, the term "dope" refers to a solution suitable for preparing polymeric fibers using a wet-spinning or dry jet-wet spinning process. "Keratin dope" refers to an alpha-keratin solution including alpha-keratin protofibrils and intermediate filaments in liquid crystal phase prepared according to the methods described herein and suitable for preparing polymeric fibers including alpha-keratin protofibrils and intermediate filaments using a wet-spinning process or dry jet-wet spinning process. As will be understood by one of ordinary skill in the art in view of the present disclosure, the keratin dope may also be suitable for use as or inclusion in a material to be printed or deposited via an additive manufacturing process, such as 3D printing, which may be referred to herein as a keratin printing material, a keratin 3D printing material, or a keratin printing ink. A keratin dope or keratin printing material can further include agents that are responsive to certain stimuli. For example, a keratin dope or keratin printing material including alpha-keratin protofibrils and intermediate filaments in liquid crystal phase prepared according to the methods described herein can further include agents that are light-responsive, such as gold nanoparticles, silicon nanocrystal and nano-semiconductors. The resulting fibers, yarns, fabrics or printed objects may be light-responsive fibers, yarns, fabrics, or printed objects.

The terms "fiber" and "polymeric fiber" are used herein interchangeably, and both terms refer to fibers having micron, submicron, and nanometer dimensions and including alpha-keratin intermediate filaments. In some embodiments, a polymeric fiber includes a plurality of alpha-keratin protofibrils and/or intermediate filaments. In some embodiments, a polymeric fiber is prepared via wet spinning. In other embodiments, a polymeric fiber is prepared via dry jet-wet spinning.

As used herein, "hair" includes human hair and hair of other animals (e.g., mammals) including, but not limited to wool and fur.

As used herein, "shape-memory" is a property of certain smart materials to return from a deformed state to their original (e.g., fixed) shape induced by an external stimulus (trigger). Triggers of a shape-memory effect include, but are not limited to light, moisture, and temperature change.

As used herein, "light-responsive" refers to the ability of certain kinds of polymeric materials to respond to light by changing their physical properties such as shape. Light stimulus can be, for example, laser irradiation.

As used herein, "wet spinning" refers to a process of preparing polymer fibers in which a stream of a solution including a polymer is ejected or extruded directly into a liquid bath containing a non-solvent, and precipitation and/or coagulation of the stream forms a polymer fiber, which is subjected to a tensile force that draws the polymeric fiber. In some embodiments, the wet spinning process includes ejecting or extruding the stream into a first coagulation bath and immersing the formed polymer fiber in a second coagulation bath. In some embodiments, the polymer fiber is drawn in both the first coagulation bath and the second coagulation bath. In some embodiments, a wet spinning process includes an immersed rotary jet spinning (iRJS) process.

As used herein, "dry jet-wet spinning" refers to a process of preparing polymer fibers in which a stream of a solution including a polymer is ejected or extruded into air prior to entering a liquid bath containing a non-solvent. Precipitation and/or coagulation of the stream forms a polymer fiber, which is subject to a tensile force that draws the polymer fiber. In some embodiments, a dry jet-wet spinning process includes an immersed rotary jet spinning (iRJS) process.

In some embodiments, "wet spinning" and "dry jet-wet spinning" can include the use of a spinneret or rotating reservoir having multiple orifices to prepare multiple polymer fibers simultaneously. In some embodiments, the multiple polymer fibers are combined (e.g., in a yarn) and the combination of fibers is drawn.

Definitions of common terms in cell biology and molecular biology can be found in, e.g., *The Encyclopedia of Molecular Biology*, published by Blackwell Science Ltd., 1994 (ISBN 0-632-02182-9); Benjamin Lewin, Genes X, published by Jones & Bartlett Publishing, 2009 (ISBN-10: 0763766321); Kendrew et al. (eds.), *Molecular Biology and Biotechnology: a Comprehensive Desk Reference*, published by VCH Publishers, Inc., 1995 (ISBN 1-56081-569-8) and *Current Protocols in Protein Sciences* 2009, Wiley Intersciences, Coligan et al., eds.

The word "nozzle" as used herein refers to any element having an opening or orifice for extrusion of a material. The term "nozzle" as used herein, includes, but is not limited to 3D printing nozzles, additive manufacturing nozzles, hollow needles suitable for extrusion, hollow cylinders suitable for extrusion, components of 3-D printing and additive manufacturing heads suitable for extrusion, and an orifice in a wall suitable for extrusion.

The term 3D printing as used herein refers to using a 3D printing device or 3D printing system to manufacture an object, and other additive manufacturing methods.

II. Methods of the Invention

A. Methods for Preparing an Alpha-Keratin Solution Including Alpha-Keratin Liquid Crystals Including Alpha-Keratin Protofibrils and Alpha-Keratin Intermediate Filaments (KIFs) from Natural Materials As described above, the present invention is based, at least in part, on the discovery of methods for preparing alpha-keratin liquid crystals from hair, e.g., wool, that preserve the hierarchical organization and anisotropic nature of alpha-keratin protofibrils and intermediate filaments present in human and animal hair, and that is suitable for use as a spinnable dope for fabricating biocompatible shape-memory polymeric fibers, threads, yarns, and/or fabrics including alpha-keratin protofibrils and intermediate filaments.

Accordingly, in one aspect, the present invention provides methods for preparing an alpha-keratin solution including alpha-keratin protofibrils and intermediate filaments in liquid crystal phase from hair for preparation of shape-memory polymeric fibers. In some embodiments, the methods include providing a hair powder; contacting the hair powder with an aqueous solution including about 6 M to about 12 M lithium bromide (LiBr) and about 50 mM to about 300 mM of a reducing agent, thereby preparing a hair residue suspension including insoluble hair residue and a solution including alpha-keratin intermediate filaments in liquid crystal phase. The methods also include separating the insoluble hair residue from the solution and contacting the solution with a salt solution including about 20 to about 50 mg/mL of the salt, thereby yielding an alpha-keratin keratin solution including alpha-keratin protofibrils and intermediate filaments in liquid crystal phase and a solution including the remaining salt. The method also includes separating the alpha-keratin solution including alpha-keratin protofibrils and intermediate filaments in liquid crystal phase from the solution including the remaining salt, thereby preparing an alpha-keratin solution including alpha-keratin protofibrils and intermediate filaments in liquid crystal phase from hair for preparation of shape-memory polymeric fibers or shape-memory objects.

Hair suitable for use in the methods of the invention may be human hair or animal hair. In one embodiment, the hair is animal hair. In one embodiment, the animal hair is wool e.g., sheep wool, goat wool, alpaca wool, or rabbit fur.

The hair powder, e.g., animal hair powder, e.g., wool powder, for use in the methods disclosed herein may be prepared using any method known to one of ordinary skill in the art for preparing a powder.

For example, as described in the examples, Angora goat wool was obtained and washed using, e.g., ethanol, to remove oils and other debris. Other agents suitable to wash hair prior to preparing a hair powder include, for example, any suitable solvent such as petroleum, ether, or acetone. The washed wool fibers were cut into segments and the wool segments were ground into micron-sized particles. Other methods for grinding the hair into a powder include, for example, a pestle and mortar.

In some embodiments, hair, e.g., wool, is washed in ethanol for about 1 to about 48 hours, about 1 to about 48 hours, about 1 to about 48 hours, about 1 to about 48 hours, about 2 to about 48 hours, about 3 to about 48 hours, about 4 to about 48 hours, about 5 to about 48 hours, about 6 to about 48 hours, about 7 to about 48 hours, about 8 to about 48 hours, about 9 to about 48 hours, about 10 to about 48 hours, about 11 to about 48 hours, about 12 to about 48 hours, about 13 to about 48 hours, about 14 to about 48 hours, about 15 to about 48 hours, about 16 to about 48 hours, about 17 to about 48 hours, about 18 to about 48 hours, about 19 to about 48 hours, about 20 to about 48 hours, about 21 to about 48 hours, about 22 to about 48 hours, about 23 to about 48 hours, or about 24 to about 48 hours, e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 333, 34, 35, 36, 37, 38, 39, 40, 41, 42, 43, 44, 45, 46, 47, or about 48 hours. Ranges and values intermediate to the above recited ranges and values are also contemplated to be part of the invention.

In some embodiments, the washed hair is rinsed, e.g., in water, and allowed to dry, e.g., at room temperature. The washing and rinsing of the hair may be performed once, or may be repeated two or more times.

Segments or fibers of the washed hair may be prepared using any suitable method. For example, the hair, e.g., wool fibers, may be cut, e.g., manually, into segments that are approximately about 0.5 mm, about 1 mm, about 2 mm, about 3 mm, about 4 mm, about 5 mm, about 6 mm, about 7 mm, about 8 mm in length, about 9 mm, about 10 mm, or any other suitable size. Values intermediate to the above recited ranges and values are also contemplated to be part of the invention.

The hair segments, e.g., wool fiber segments, may be ground using any suitable method known to one of ordinary skill in the art to prepare a hair powder. For example, one suitable method includes use of a ball mill at, for example, about 200 rpm, about 225 rpm, about 250 rpm, about 275 rpm, about 300 rpm, about 325 rpm, about 350 rpm, about 370 rpm, about 400 rpm, about 425 rpm, about 450 rpm, about 475 rpm, about 500 rpm, about 525 rpm, about 550 rpm, about 575 rpm, about 600 rpm, about 625 rpm, about 650 rpm, about 675 rpm, or about 700 rpm, or any other speed that produces a fine powder in a reasonable grinding time without degrading the hair and/or alpha-keratin in the hair segments (e.g., oxidizing and/or degrading the alpha-keratin protein), as well as to maximize the surface area of the hair fiber in contact with the solution in the subsequent step(s). Ranges and values intermediate to the above recited ranges and values are also contemplated to be part of the invention.

In some embodiments, the hair segments are ground in a ball mill at about 450 rpm. In some embodiments, the hair segments are ground in 20-minute sessions with 5-minute intervals of settling, for a total duration of 3 hours. The duration of grinding, number of grinding intervals, and total grinding time may be adjusted according to the size of the hair segments, grinding speed and equipment used for grinding.

Figure 2:
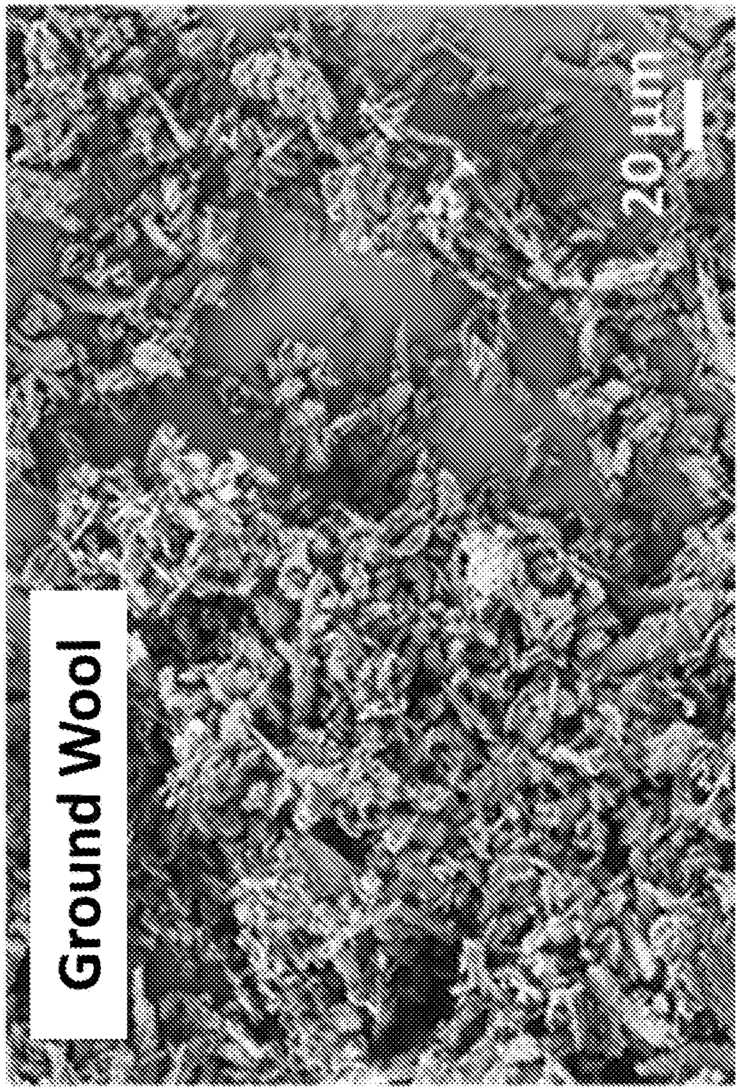
FIG. 2 is a scanning electron micrograph (SEM) image of the ground wool.

In some embodiments, the hair segments are ground to micron-sized particles, e.g., about 1-1000 μm, about 1-950 μm, about 1-900 μm, about 1-850 μm, about 1-800 μm, about 1-750 μm, about 1-700 μm, about 1-650 μm, about 1-600 μm, about 1-550 μm, about 1-500 μm, about 1-450 μm, about 1-400 μm, about 1-350 μm, about 1-300 μm, about 1-250 μm, about 1-200 μm, about 1-150 μm, about 1-100 μm, about 1-50 μm, about 1-25 μm, about 1-20 μm, about 1-15 μm, about 1-10 μm, about 1-5 μm, or about 1000, 950, 900, 850, 800, 750, 700, 650, 600, 550, 500, 450, 400, 350, 300, 250, 200, 150, 100, 75, 50, 25, 20, 15, 10, 5, or about 1 μm in diameter (see FIG. 2). Ranges and values intermediate to the above recited ranges and values are also contemplated to be part of the invention.

The hair powder, e.g., wool powder, is contacted with an aqueous solution including lithium bromide (LiBr) and a reducing agent. LiBr induces a reversible and concentration dependent liquid phase transition of hard alpha-keratin and is used as a mild denaturing agent for the extraction of alpha-keratin from hair. In some embodiments, a denaturing agent other than LiBr is employed. For example, in some embodiments the denaturing agent includes any of guanidinium salts, (e.g., thiocyanate or HCl), urea, and a deep eutectic solvent.

The concentration of LiBr in the aqueous solution may be, for example, about 6 M to about 12 M, about 6.25 M to about 11.75 M, about 6.5 M to about 11.5 M, about 6.75 M to about 11.25 M, about 7 M to about 11 M, about 7.25 M to about 10.75 M, about 7.5 M to about 10.5 M, about 7.75 M to about 10.25 M, about 6 M to about 11 M, about 6.25 M to about 10.75 M, about 6.5 M to about 10.5 M, about 6.75 M to about 10.25 M, about 7 M to about 9 M, about 7.25 M to about 9.75 M, about 7.5 M to about 9.5 M, about 7.75 M to about 9.25 M, about 7 M to about 10 M, about 7.25 M to about 9.75 M, about 7.5 M to about 9.5 M, about 7.75 M to about 9.25 M, e.g., about 6 M, about 6.25 M, about 6.5, about 6.75 M, about 7 M, about 7.25 M, about 7.5, about 7.75 M, about 8 M, about 8.25 M, about 8.5, about 8.75 M, about 8 M, about 8.25 M, about 8.5, about 8.75 M, about 9 M, about 9.25 M, about 9.5, about 9.75 M, about 10 M, about 10.25 M, about 1.5, about 10.75 M, about 11 M, about 11.25 M, about 11.5 M, or about 11.75 M, or about 12 M. In some embodiments, the wool powder is contacted with an aqueous solution including about 8 M LiBr. Ranges and values intermediate to the above recited ranges and values are also contemplated to be part of the invention.

Suitable reducing agents for use in the methods of the invention include any agents that inhibit oxidative damage and aggregation of the proteins in solution. Exemplary reducing agents include, but are not limited to, 1, 4-dithiothreitol (DTT), 2-Mercaptoethanol (BME), dithioerythritol (DTE), Tris (2-Carboxyethyl) phosphine hydrochloride) (TCEP) and L-glutathione (GSH). In some embodiments, the reducing agent is DTT.

The concentration of DTT in the aqueous solution may be, for example, about 75 mM to about 300 mM, about 100 mM to about 275 mM, about 125 mM to about 250 mM, about 100 mM to about 300 mM, about 125 mM to about 275 mM, about 125 mM to about 250 mM, e.g., about 75 mM, about 100 mM, about 125 mM, about 150 mM, 175 mM, 200 mM, about 225 mM, about 250 mM, about 275 mM, or about 300 mM DTT. In some embodiments, the concentration of DTT in the aqueous solution is about 150 mM. Ranges and values intermediate to the above recited ranges and values are also contemplated to be part of the invention.

In some embodiments, the hair powder is contacted with an aqueous solution including LiBr and a reducing agent in an oxygen-free environment, e.g., a $N_2$ environment, e.g., an environment of about 99.9%, 99.8%, 99.7%, 99.6%, 99.5%, 99.4%, 99.3%, 99.2%, 99.1%, 99.0%, 98%, 97%, 96%, 95%, 94%, 93%, 92%, 91%, 90%, 85%, 80%, 75%, 70%, 65%, 60%, 55%, or about 50% $N_2$. Values intermediate to the above recited ranges and values are also contemplated to be part of the invention.

In some embodiments, contacting the hair powder with an aqueous solution including LiBr, e.g., about 6 M to about 12 M, e.g., about 8M, and a reducing agent, e.g., DTT, e.g., about 75 mM to about 300 mM DTT, e.g., about 150 mM DTT, includes stirring the aqueous solution at a temperature of, for example, about 70° C. to about 100° C., e.g., about 70° C., about 75° C., about 80° C., about 85° C., about 90° C., about 95° C., or about 100° C. In one embodiment, the aqueous solution is stirred at a temperature of about 90° C. Ranges and values intermediate to the above recited ranges and values are also contemplated to be part of the invention.

In some embodiments, the aqueous solution that has contacted the hair powder is stirred at about 70° C. to about 100° C., e.g., 90° C., for a period of about 10 to about 60 hours, e.g., about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or about 60 hours. In some embodiments, the aqueous solution is stirred for about 16 to about 48 hours. In some embodiments, the aqueous solution is stirred for about 24 to about 48 hours. In some embodiments, the aqueous solution is stirred for about 40 hours. Ranges and values intermediate to the above recited ranges and values are also contemplated to be part of the invention.

Contacting the hair powder, e.g., wool powder, with an aqueous solution including LiBr and a reducing agent results in a hair residue suspension including insoluble hair residue and a solution including alpha-keratin intermediate filaments in liquid crystal phase. A liquid crystal is a state of a matter that flows like a liquid, but in which the molecules are oriented in a crystal-like way. For example, a solution that includes alpha-keratin intermediate filaments in a liquid crystal phase has a liquid form and flows like a liquid, but the keratin molecules in the solution are alpha-helical keratin molecules in their native crystalline orientation and form alpha-keratin protofibrils and alpha-keratin intermediate filaments in the solution. Furthermore, the alpha-keratin molecules in a liquid crystal phase in the keratin solution are capable of reconstitution to their original hierarchical organization, e.g., keratin tetramers, etc.

The insoluble hair residue, e.g., wool residue, may be separated from the solution using any suitable method known to one of ordinary skill in the art, such as filtration, centrifugation, etc.

In one embodiment, the insoluble hair residue is removed by filtration. In one embodiment, the filtration is hot filtration, e.g., filtration at a temperature of, for example, about 70° C. to about 100° C., e.g., about 70° C., about 75° C., about 80° C., about 85° C., about 90° C., about 95° C., or about 100° C. In one embodiment, the aqueous solution is stirred at a temperature of about 90° C. In one embodiment, the hot filtration is hot filtration under negative pressure. In some embodiments, the insoluble wool residue is removed by centrifugation, e.g., ultracentrifugation, e.g., hot centrifugation. Ranges and values intermediate to the above recited ranges and values are also contemplated to be part of the invention.

In some embodiments, the solution including alpha-keratin intermediate filaments in a liquid crystal phase is allowed to cool to room temperature after the insoluble hair residue is removed.

The solution obtained from the foregoing steps is further contacted with a salt solution to prepare an alpha-keratin solution including alpha-keratin protofibrils and intermediate filaments in liquid crystal phase and a solution including the remaining salt, i.e., a two-phase solution. Suitable salts for use in the methods of the invention include, for example, NaCl, phosphate salts (e.g., $NaH_2PO_4$ or $Na_2HPO_4$), $CaCl_2$, $MgCl_2$, or sulfate salts. In some embodiments, the salt is NaCl.

A suitable amount of salt in the salt solution includes an amount sufficient to achieve separation of the alpha-keratin solution including alpha-keratin protofibrils and intermediate filaments in liquid crystal phase from the salt solution, i.e., an amount sufficient to achieve a two-phase solution. In some embodiments, the salt solution is added to the solution portion-wise, e.g., with stirring.

One of ordinary skill in the art may determine if a sufficient amount of salt has been added by, for example, separating the alpha-keratin solution including alpha-keratin intermediate filaments in liquid crystal phase from the solution including the remaining salt, as described below, and dialyzing the solution including the remaining salt against, e.g., deionized water, dehydrating the solution and subjecting any remaining molecules in the dehydrated solution to a suitable microscopic analysis.

In some embodiments, the salt is NaCl and the concentration of the NaCl in the salt solution is about 5 mg/mL to about 50 mg/mL, about 10 mg/mL to about 50 mg/mL, about 15 mg/mL to about 50 mg/mL, about 20 mg/mL to about 50 mg/mL, about 25 mg/mL to about 50 mg/mL, about 30 mg/mL to about 50 mg/mL, about 35 mg/mL to about 50 mg/mL, about 40 mg/mL to about 50 mg/mL, about 5 mg/mL to about 45 mg/mL, about 5 mg/mL to about 40 mg/mL, about 5 mg/mL to about 35 mg/mL, about 5 mg/mL to about 30 mg/mL, about 5 mg/mL to about 25 mg/mL, about 5 mg/mL to about 20 mg/mL, about 5 mg/mL to about 15 mg/mL, or about 5 mg/mL to about 10 mg/mL. For example, the concentration of NaCl may be about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 28, 39, 40, 41, 42, 43, 44, 45, 46, 47, 48, or about 49 mg/mL. In some embodiments, the concentration of NaCl is about 32 mg/mL. Ranges and values intermediate to the above recited ranges and values are also contemplated to be part of the invention.

Contacting the solution including alpha-keratin protofibrils and intermediate filaments in a liquid crystal phase with a salt solution may be performed between about 10° C. to about 50° C., about 10° C. to about 40° C., about 10° C. to about 30° C., about 10° C. to about 20° C., about 20° C. to about 50° C., about 30° C. to about 50° C., or about 40° C. to about 50° C., e.g., about 10, 15, 20, 25, 30, 35, 40, 45, or about 50° C. In one embodiment, the contacting of the solution including alpha-keratin protofibrils and intermediate filaments in a liquid crystal phase with the salt solution is performed at about 25° C., e.g., room temperature. Ranges and values intermediate to the above recited ranges and values are also contemplated to be part of the invention.

In some embodiments, the solution including alpha-keratin protofibrils and intermediate filaments in a liquid crystal phase that has been contacted with the salt solution is stored at about 4° C. for about 1 to about 10 hours, about 2 to about 9 hours, about 3 to about 8 hours, about 4 to about 7 hours, e.g., about 1, 2, 3, 4, 5, 6, 7, 8, 9, or about 10 hours, to achieve complete separation of the alpha-keratin solution including alpha-keratin protofibrils and intermediate filaments in the liquid crystal phase. In some embodiments, storage is at about 4° C. for about 6 hours. Ranges and values intermediate to the above recited ranges and values are also contemplated to be part of the invention.

The alpha-keratin solution including alpha-keratin protofibrils and intermediate filaments in liquid crystal phase is then separated from the solution including the remaining salt using any suitable method, such as centrifugation. In some embodiments, the centrifugation is conducted at a speed of about 3,000 rpm. In some embodiments, the alpha-keratin solution including alpha-keratin protofibrils and intermediate filaments in liquid crystal phase is separated from the solution including the remaining salt is removed at about 4° C.

Figures 4A, 4B, 4C:
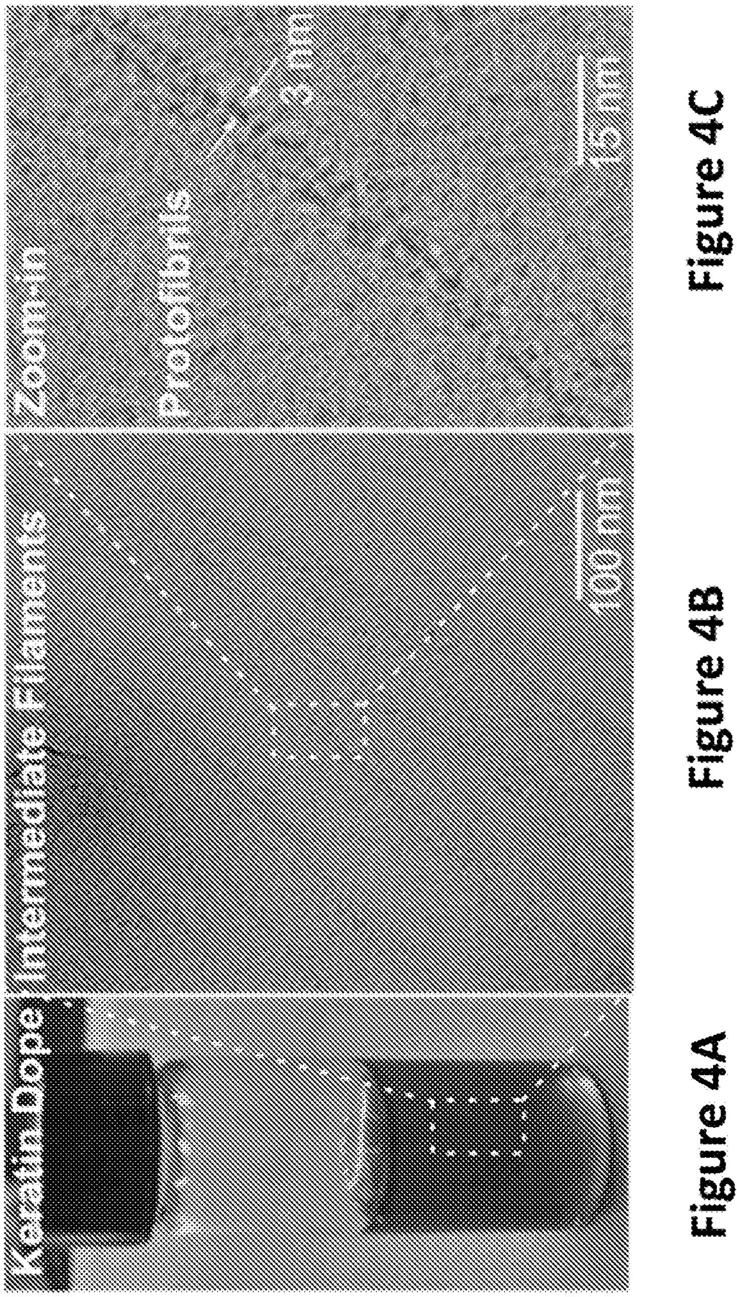
FIG. 4A is a photographic image of an "alpha-keratin dope" after extraction from Angora goat wool using an example method including preparation with lithium bromide (LiBr) and DTT.
FIG. 4B is a cryo-transmission electron micrograph (Cryo-TEM) image of alpha-keratin intermediate filaments obtained from a 20 μL drop of a 20× diluted solution of an alpha-keratin dope, such as that shown in FIG. 3A, prepared using a method employing an 8 M LiBr water solution, as described in an example.
FIG. 4C is a detail of the Cryo-TEM image of FIG. 4B with arrows indicating protofilaments.

The foregoing steps result in the preparation of an alpha-keratin solution including alpha-keratin protofibrils and intermediate filaments in liquid crystal phase which is suitable for use as, e.g., a spinnable alpha-keratin dope or as a keratin 3D printing material (see, e.g., FIG. 4A).

The concentration of the alpha-keratin in the alpha-keratin solution can be calculated by, e.g., isolating the keratin via dialysis against water, e.g., deionized water, and subsequent dehydration via freeze dry.

B. Methods for Preparing Shape-Memory Polymeric Fibers Including Alpha-Keratin

Because the methods of the invention for preparing an alpha-keratin solution including alpha-keratin protofibrils and intermediate filaments in liquid crystal phase maintain the alpha-helical nature of the alpha-keratin protofibrils and intermediate filaments, and the alpha-keratin solution including alpha-keratin protofibrils and intermediate filaments in liquid crystal phase is amenable for use in a spinning process, e.g., wet spinning process or as printing material in an additive manufacturing process such as 3D printing. The alpha-keratin solution including alpha-keratin protofibrils and intermediate filaments in liquid crystal phase produced as described herein may be used as a dope in any suitable method to spin, e.g., wet spin or dry jet-wet spin, biocompatible shape-memory polymeric fibers, threads, yarns and/or fabrics including alpha-keratin protofibrils and intermediate filaments in which the hierarchical organization of the alpha-keratin protofibrils and intermediate filaments is reconstituted in the de novo spun fibers.

Any suitable wet-spinning or dry jet-wet spinning method known to one of ordinary skill in the art may be used to spin one or more polymeric fibers, e.g., shape-memory polymeric fibers, including alpha-keratin protofibrils and intermediate filaments.

Accordingly, in one aspect, the methods of the invention for preparing an alpha-keratin solution including alpha-keratin protofibrils and intermediate filaments in liquid crystal phase further include providing the alpha-keratin solution including alpha-keratin protofibrils and intermediate filaments in liquid crystal phase and preparing one or more shape-memory polymeric fibers including alpha-keratin protofibrils and intermediate filaments via wet spinning or dry jet-wet spinning.

In one embodiment, a suitable spinning method includes spinning the keratin dope (i.e., the alpha-keratin solution including alpha-keratin protofibrils and intermediate filaments in liquid crystal phase) prepared as described herein into a first coagulation bath, which may also be referred to as a first coagulant bath. In some embodiments, the shape-memory polymeric fibers formed in the first coagulation bath are drawn into a second coagulation bath, which may also be referred to as a second coagulant bath. In some embodiments, the keratin dope can further include other particles and/or agents that introduce additional features to the shape-memory polymeric fibers. In one embodiment, the keratin dope including alpha-keratin protofibrils and intermediate filaments in liquid crystal phase prepared as described herein further includes gold nano particles, silicon nanoparticles, or nano semiconductors that are light-responsive. In some embodiments, the shape-memory polymeric fibers formed are light-responsive (e.g., upon laser irradiation).

In other embodiments, suitable spinning methods include introducing the alpha-keratin solution including alpha-keratin protofibrils and intermediate filaments in liquid crystal phase into a reservoir having one or more orifices; rotating the reservoir about an axis of rotation of the reservoir to cause ejection of the alpha-keratin solution including alpha-keratin protofibrils and intermediate filaments in liquid crystal phase through the one or more orifices in one or more jets into a first solution in a first collection device, e.g., either directly or through an air gap between the orifice and the first solution; and collecting the one or more jets of the alpha-keratin solution including alpha-keratin protofibrils and intermediate filaments in liquid crystal phase ejected from the rotating reservoir in the first collection device including the first solution, e.g., $Na_2SO_4$, to cause formation of one or more shape-memory polymeric fibers including alpha-keratin protofibrils and intermediate filaments. In some embodiments, the method further includes drawing the formed alpha-keratin protofibril and intermediate filament fibers from the collection device into a second collection device including a second solution.

Any coagulant suitable for the coagulation of shape-memory polymeric fibers including alpha-keratin protofibrils and intermediate filaments can be used for the first and/or second coagulation baths. Exemplary coagulants include, but are not limited to $Na_2SO_4$, a phosphate buffer (e.g., a phosphate buffer having a pH of about 5.8 to about 8), $CaCl_2$, and $MgCl_2$. In some embodiments, the coagulant includes $NaH_2PO_4$, $Na_2HPO_4$, $Na_2SO_4$, $CaCl_2$, $MgCl_2$, or any combination of the aforementioned.

In some embodiments, the first coagulation bath includes $Na_2SO_4$. In some embodiments, the second coagulation bath includes $Na_2SO_4$ and a thiol oxidative agent. In some embodiments, the thiol oxidative agent is $H_2O_2$. In some embodiments, the thiol oxidative agent includes $H_2O_2$, sodium hypochlorite (NaClO), any other hypochlorite salt, or any combination of the aforementioned.

In some embodiments, the second coagulation bath includes $H_2O_2$ and one or more of $NaH_2PO_4$, $Na_2HPO_4$, $Na_2SO_4$, $CaCl_2$, and $MgCl_2$.

The concentration of $Na_2SO_4$ in the first solution or first coagulation bath may be about 0.1 to about 0.7 M, about 0.2 to about 0.6 M, about 0.3 to about 0.5 M, e.g., about 0.1, about 0.125, about 0.15, about 0.175, about 0.2, about 0.225, about 0.25, about 0.275, about 0.3, about 0.325, about 0.35, about 0.375, about 0.4, about 0.425, about 0.45, about 0.475, about 0.5, about 0.525, about 0.55, about 0.575, about 0.6, about 0.625, about 0.65, about 0.675, or about 0.7 M $Na_2SO_4$. In one embodiment, the concentration of $Na_2SO_4$ in the first solution or first coagulation bath is about 0.4 M.

The concentration of $NaH_2PO_4$ in the first solution or first coagulation bath may be about 0.1 to about 0.7 M, about 0.2 to about 0.6 M, about 0.3 to about 0.5 M, e.g., about 0.1, about 0.125, about 0.15, about 0.175, about 0.2, about 0.225, about 0.25, about 0.275, about 0.3, about 0.325, about 0.35, about 0.375, about 0.4, about 0.425, about 0.45, about 0.475, about 0.5, about 0.525, about 0.55, about 0.575, about 0.6, about 0.625, about 0.65, about 0.675, or about 0.7 M $NaH_2PO_4$. In one embodiment, the concentration of $NaH_2PO_4$ in the first solution or first coagulation bath is about 0.4 M.

The concentration of $Na_2SO_4$ in the second solution or second coagulation bath, may be about 0.5 to about 2.5 M, about 0.75 to about 2.25 M, about 1 to about 2 M, e.g., about 0.5, about 0.6, about 0.7, about 0.8, about 0.9, about 1.0, about 1.1, about 1.2, about 1.3, about 1.4, about 1.5 M, about 1.6 M, about 1.7 M, about 1.8 M, about 1.9 M, about 2.0 M, about 2.1 M, about 2.2 M, about 2.3 M, about 2.4 M, or about 2.5 M. In one embodiment, the concentration of $Na_2SO_4$ in the second solution or second coagulation bath is about 1.5 M.

The concentration of $NaH_2PO_4$ in the second solution or second coagulant bath may be about 0.4 to about 1.6 M, about 0.6 M to about 1.2 M, about 0.7 to about 0.9 M, e.g., about 0.4, about 0.5, about 0.6, about 0.7, about 0.8, about 0.9, about 1.0, about 1.1, about 1.2, about 1.3, about 1.4, about 1.5 M, or about 1.6 M. In one embodiment, the concentration of $NaH_2PO_4$ in the second solution is about 0.8 M.

The second solution may include $H_2O_2$ at about 0.5 to about 1.5%, about 0.6 to about 1.4%, about 0.7 to about 1.3, e.g., about 0.5, 0.6, 0.7, 0.8, 0.9, 1, 1.1, 1.2, 1.3, 1.4, or about 1.5%. In one embodiment, the second solution includes about 1% $H_2O_2$.

Suitable devices for preparing one or more shape-memory polymeric fibers including alpha-keratin intermediate filaments that include a rotating reservoir having one or more orifices include those described in U.S. Patent Publication No. 2015/0354094, the entire contents of which are incorporated herein by reference. Such devices are referred to as immersed rotary jet spinning (iRJS) devices.

In one embodiment, a suitable iRJS device includes a reservoir for holding the alpha-keratin solution including alpha-keratin protofibrils and intermediate filaments in liquid crystal phase (alpha-keratin dope) and including a surface having one or more orifices for ejecting the alpha-keratin solution including alpha-keratin protofibrils and intermediate filaments in liquid crystal phase for fiber formation; a motion generator configured to impart rotational motion to the reservoir, the rotational motion of the reservoir causing ejection of the alpha-keratin liquid crystals including alpha-keratin intermediate filaments through the one or more orifices; and a collection device holding a liquid, the collection device configured and positioned to accept the alpha-keratin solution including alpha-keratin protofibrils and intermediate filaments in liquid crystal phase ejected from the reservoir; wherein the reservoir and the collection device are positioned such that the one or more orifices of the reservoir are submerged in the liquid in the collection device during rotation of the reservoir to eject the alpha-keratin solution including alpha-keratin protofibrils and intermediate filaments in liquid crystal phase; and wherein the ejection of the alpha-keratin solution including alpha-keratin protofibrils and intermediate filaments in liquid crystal phase into the liquid in the collection device causes formation of one or more micron, submicron or nanometer dimension shape-memory polymeric fibers including alpha-keratin protofibrils and intermediate filaments. In some embodiments, the device may include a second motion generator couplable to the collection device, the second motion generator configured to impart rotational motion to the liquid in the collection device.

In one embodiment, a suitable iRJS device includes a reservoir for holding the alpha-keratin solution including alpha-keratin protofibrils and intermediate filaments in liquid crystal phase (alpha-keratin dope) and including an outer surface having one or more orifices for ejecting the alpha-keratin solution including alpha-keratin protofibrils and intermediate filaments in liquid crystal phase for fiber formation. The device also includes a first motion generator couplable to the reservoir that is configured to impart rotational motion to the reservoir to cause ejection of the alpha-keratin solution including alpha-keratin protofibrils and intermediate filaments in liquid crystal phase through the one or more orifices, and a collection device holding a liquid. The collection device is configured and positioned to accept the alpha-keratin solution including alpha-keratin protofibrils and intermediate filaments in liquid crystal phase ejected from the reservoir. In some embodiments, the device also includes a second motion generator couplable to the collection device, where the second motion generator configured to impart rotational motion to the liquid in the collection device to generate a liquid vortex including an air gap. The reservoir and the collection device are positioned such that the one or more orifices of the reservoir are positioned in the air gap of the liquid vortex in the collection device, and wherein the ejection of the alpha-keratin solution including alpha-keratin protofibrils and intermediate filaments in liquid crystal phase into the air gap and subsequently into the liquid of the liquid vortex in the collection device causes formation of one or more micron, submicron or nanometer dimension shape-memory polymeric fibers including alpha-keratin protofibrils and intermediate filaments.

The present invention also include one or more shape-memory polymeric fibers including alpha-keratin protofibrils and intermediate filaments prepared according to the methods of the invention, as well as shape-memory threads, shape-memory yarns and shape-memory fabrics prepared according to the methods of the invention.

The shape-memory polymeric fibers including alpha-keratin protofibrils and intermediate filaments may also be used to prepare shape-memory threads, shape-memory yarns and shape-memory fabrics using any known methods for the same. The shape-memory materials prepared according to the methods of the invention are superior to other shape-memory materials such as synthetic shape-memory materials in many aspects. By recapitulating the native hierarchical organization and architecture of natural hair, the present alpha-keratin protofibril and intermediate filament-containing fibers, threads, yarns and fabrics provide high levels of freedom of manipulating, self-healing, responsiveness to various stimuli such as moisture, and adaptability to various environments and conditions. More importantly, the materials prepared according to the methods of the current invention are biocompatible and biodegradable, therefore having great potential for massive and environment-friendly industrial production.

The shape-memory materials prepared according to the methods of current invention are smart materials and can be widely used in fields such as clothing, medical and cosmetic surgeries, drug delivery, building material production, and manufacturing of materials that require high adaptability to extreme environments.

C. Methods for Preparing Shape-Memory Structures and Objects including Alpha-Keratin via Additive Manufacturing Such as 3D Printing Because the methods of the invention for preparing an alpha-keratin solution including alpha-keratin protofibrils and intermediate filaments in liquid crystal phase maintain the alpha-helical nature of the alpha-keratin protofibrils and intermediate filaments, and undergoes nematic ordering under shear stress and space constraints, the resulting alpha-keratin solution can be used in an additive manufacturing process, such as a 3D printing process, to form a shape-memory object having a 3D printed structure. In some embodiments, a 3D printed structure printed from a print material including the alpha-keratin solution may be physically manipulated into a desired shape memory configuration or shape after printing, but before the structure is fixed (e.g., using a coagulation bath including a thiol oxidative agent such as $H_2O_2$, sodium hypochlorite (NaClO), any other hypochlorite salt, or any combination of the aforementioned.

Some embodiments provide methods of making a shape-memory object or structure via an additive manufacturing method, such as 3D printing, using any of the alpha-keratin solutions described herein in as printing material or as a printing material. For example in some embodiments, a printing material includes or is any of the alpha-keratin solutions described herein.

In one aspect, the present invention provides a method of making a shape memory object. The method includes providing an alpha-keratin solution including alpha-keratin protofibrils and intermediate filaments in liquid crystal phase, and forming a shape memory object from a material including the alpha-keratin solution via additive manufacturing.

In some embodiments, forming the shape memory object from the material including the alpha-keratin solution via additive manufacturing includes extruding the material from one or more nozzles onto a solid support in a bath while moving the one or more nozzles relative to the solid support or moving the solid support relative to the one or more nozzles in at least two dimensions, and coagulating the extruded material forming an extruded material object. The solid support is any solid structure that supplies support for the extruded material during printing, such as surface of a well, dish, or container holding a bath into which the material is extruded or a solid surface of any support within the container holding the bath. In some embodiments, the solid support and/or nozzle are moved relative to each other via a control system (e.g., a control system incorporated into a 3D printing system). In some embodiments, a 3D printing system is used to extrude the material onto the solid support. Forces during the extrusion act to align the α-helices parallel to a printing direction, which may be described as parallel to the extruded stream.

In some embodiments, the 3D printing parameters may fall in the following ranges: Temperature—from 0 to 90° C. depending on the viscosity of the printing material and the needle or nozzle used for printing; pressure—from 101 to 700 kPA depending on the viscosity of the printing material and the needle or nozzle used for printing; pluronic F127 bath concentration—from 18 to 40% m/v, which may be different for different pluoronic materials.

The bath into which the material is initially extruded at least partially coagulates the extruded material and provides additional support for the extruded material during the printing process. In some embodiments, the bath into which the material is initially extruded is a pluronic bath.

In some embodiments, the material is extruded into printing bath that supports the extruded material object and at least partially coagulates the extruded material, and then later exposed to a coagulating solution, for example, by being washed with the coagulation solution or by being soaked in the coagulation solution. In some embodiments, the coagulation solution includes $NaH_2PO_4$, $Na_2HPO_4$, $Na_2SO_4$, $CaCl_2$, $MgCl_2$ or any combination of the aforementioned.

In some embodiments, the coagulation solution includes $NaH_2PO_4$. The concentration of $NaH_2PO_4$ in the coagulation solution may be about 0.1 to about 0.7 M, about 0.2 to about 0.6 M, about 0.3 to about 0.5 M, e.g., about 0.1, about 0.125, about 0.15, about 0.175, about 0.2, about 0.225, about 0.25, about 0.275, about 0.3, about 0.325, about 0.35, about 0.375, about 0.4, about 0.425, about 0.45, about 0.475, about 0.5, about 0.525, about 0.55, about 0.575, about 0.6, about 0.625, about 0.65, about 0.675, or about 0.7 M $NaH_2PO_4$. In one embodiment, the concentration of $NaH_2PO_4$ in the coagulation solution is about 0.4 M.

In some embodiments, the coagulation solution includes $Na_2SO_4$. The concentration of $Na_2SO_4$ in the coagulation solution may be about 0.1 to about 0.7 M, about 0.2 to about 0.6 M, about 0.3 to about 0.5 M, e.g., about 0.1, about 0.125, about 0.15, about 0.175, about 0.2, about 0.225, about 0.25, about 0.275, about 0.3, about 0.325, about 0.35, about 0.375, about 0.4, about 0.425, about 0.45, about 0.475, about 0.5, about 0.525, about 0.55, about 0.575, about 0.6, about 0.625, about 0.65, about 0.675, or about 0.7 M $Na_2SO_4$. In one embodiment, the concentration of $Na_2SO_4$ in the coagulation solution is about 0.4 M.

In some embodiments, forming a shape memory object or structure from a material including the alpha-keratin solution via additive manufacturing further includes fixing a memory configuration of the extruded material structure or object (i.e., determining the original or default shape-memory shape or configuration) while the extruded material object or structure is in a desired memory shape or configuration. This fixing is by exposure to a fixing solution. In some embodiments, the fixing solution includes a thiol oxidative agent (e.g., $H_2O_2$, NaClO, any other hypochlorite salt) and one or more coagulating salts, such as $NaH_2PO_4$, $Na_2HPO_4$, $Na_2SO_4$, and $CaCl_2$. The fixing solution may include $H_2O_2$ at about 0.5 to about 1.5%, about 0.6 to about 1.4%, about 0.7 to about 1.3, e.g., about 0.5, 0.6, 0.7, 0.8, 0.9, 1, 1.1, 1.2, 1.3, 1.4, or about 1.5%. In one embodiment, the fixing solution includes about 1% $H_2O_2$.

In some embodiments, the same coagulating salt is used in the coagulating solution as in the fixing solution. In some embodiments, a different coagulation salt is used in the coagulation solution than in the fixing solation. In some embodiments concentrations of the coagulation salt or salts are the same in the coagulation solution as in the fixing solution. In some embodiments, concentrations of the coagulation salt or salts are different in the fixing solution than in the coagulation solution.

In some embodiments, the fixing solution includes $NaH_2PO_4$. The concentration of $NaH_2PO_4$ in the fixing solution may be about 0.1 to about 0.7 M, about 0.2 to about 0.6 M, about 0.3 to about 0.5 M, e.g., about 0.1, about 0.125, about 0.15, about 0.175, about 0.2, about 0.225, about 0.25, about 0.275, about 0.3, about 0.325, about 0.35, about 0.375, about 0.4, about 0.425, about 0.45, about 0.475, about 0.5, about 0.525, about 0.55, about 0.575, about 0.6, about 0.625, about 0.65, about 0.675, or about 0.7 M $NaH_2PO_4$. In one embodiment, the concentration of $NaH_2PO_4$ in the fixing solution is about 0.4 M.

In some embodiments, the fixing solution includes $Na_2SO_4$. The concentration of $Na_2SO_4$ in the fixing solution may be about 0.1 to about 0.7 M, about 0.2 to about 0.6 M, about 0.3 to about 0.5 M, e.g., about 0.1, about 0.125, about 0.15, about 0.175, about 0.2, about 0.225, about 0.25, about 0.275, about 0.3, about 0.325, about 0.35, about 0.375, about 0.4, about 0.425, about 0.45, about 0.475, about 0.5, about 0.525, about 0.55, about 0.575, about 0.6, about 0.625, about 0.65, about 0.675, or about 0.7 M $Na_2SO_4$. In one embodiment, the concentration of $Na_2SO_4$ in the fixing solution is about 0.4 M.

In some embodiments, the fixing solution is formed by adding a fixing agent, such as a thiol oxidative agent like $H_2O_2$, NaClO, any other hypochlorite salt, to the coagulating solution.

In some embodiments the extruded material object is physically manipulated into the desired memory shape prior to fixing, provided for complex shape-memory structures in which micro-scale structure is controlled through control during extrusion or printing and macro scale structure is modified through physical manipulation.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. Moreover, due to biological functional equivalency considerations, some changes can be made in protein structure without affecting the biological or chemical action in kind or amount. These and other changes can be made to the disclosure in light of the detailed description. All such modifications are intended to be included within the scope of the appended claims.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

EXAMPLES

The following examples are set forth as being representative of the present disclosure. These examples are not to be construed as limiting the scope of the present disclosure as these and other equivalent embodiments will be apparent in view of the present disclosure, figures and accompanying claims.

In animal hairs, the shape-memory effect of keratin is due to the paired configuration of α-helices into a coiled-coils architecture, arrangement which offers the right geometry allowing for their continuous transition into β-sheets under load (FIG. 1A). Continuity of the physical transition through all length scales is ensured as the coiled-coils motifs are anisotropically aligned along the hair axis and further self-assembled to form fibrillar structures at different levels of hierarchy, from the protofibrils to the intermediate filaments and up to the macrofibrils (FIG. 1A). The latter are embedded in a more amorphous keratin matrix, which is held by disulfide bonds and stabilizes the whole hair structure. Under load, the keratin α-helix secondary structure in its coiled-coils architecture is known to rearrange into β-sheet through a continuous crystal phase transition, which is reminiscent of the martensitic transformation enabling the SM effect in metal alloys.

Here, the α-helix-to-β-sheet transition was exploited as an actuation mechanism to design biomimetic fibrous materials displaying the shape-memory effect with water as trigger. To engineer a SM material based on the α-helix-to-β-sheet transition, recapitulation of the native organization of α-helices was achieved by first targeting the retainment of the fibrillar structure of keratin during its extraction from the wool source. The anisotropic order of the coiled-coils within the material obtained applying shear forces to impose the alignment of keratin fibrils during the fabrication process.

An example method extracted keratin from animal hairs and produced a solution of the protein, with the protein retaining its hierarchical structure up to the protofibrillar level in solution. Keratin protofibrils in the solution were shown to pre-organize in a nematic phase under shear stress and space constraint, a property which is additionally tuned by inducing further self-assembly of the protein via charge screening effect. The preorganization of the keratin protofibrils enabled fabrication of anisotropic fibers with keratin coiled-coils domains aligned along the fiber axis, thus enabling shape memory in fibers formed from the solution. Besides the scalable production of mechanically stable fibers, the unique chemical and rheological properties of the keratin solution also enabled fabrication of a fibrous composite material and a 3D printed structure, proving the shape memory effect to be extendable from the 1D to the 3D.

Example 1: Non-Denaturing Extraction of Alpha-Keratin Crystals Including Alpha-Keratin Intermediate Filaments (KIFs) and Spinning Dope Preparation A method was developed to prepare a spinnable dope or printing material containing alpha-keratin proteins in liquid crystal phase in order to preserve the native alpha-helical architecture of alpha-keratin, thus, allowing the reconstitution of the original protein hierarchical organization (keratin protofibrils and intermediate filaments) in the de novo spun fibers for use to prepare bio-compatible shape-memory polymeric fibers, threads, yarns, and fabrics or in de novo printed structures or objects.

Figure 1B:
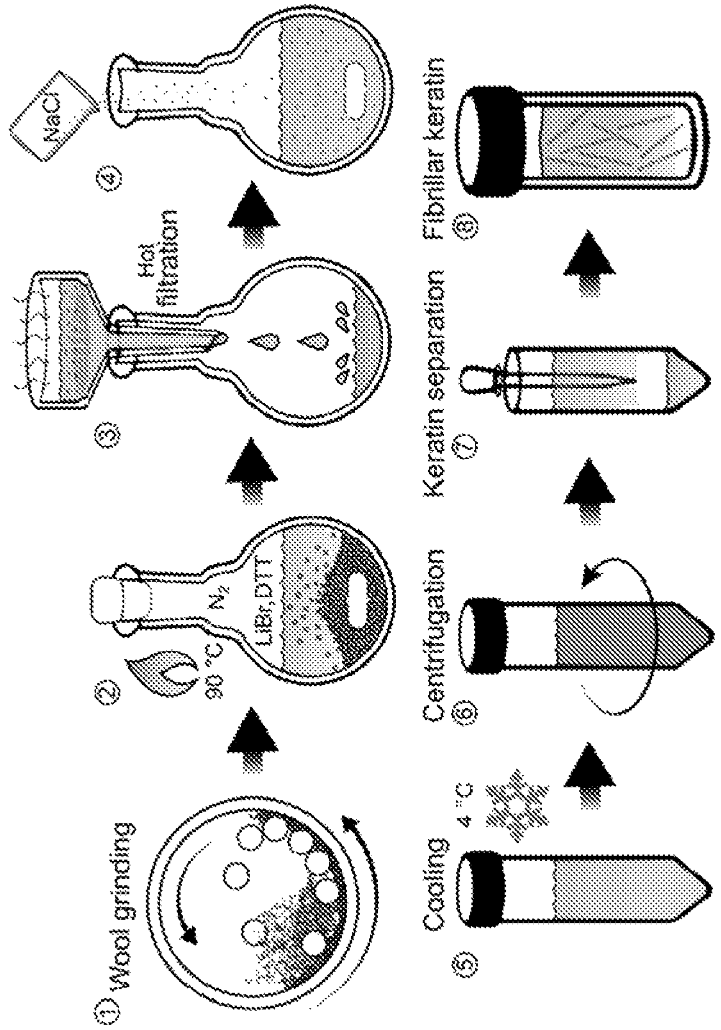
FIG. 1B schematically depicts a method to obtain fibrillar keratin in solution from wool in accordance with some embodiments. In step 1, clean wool is ground using a planetary ball mill to obtain a fine powder having a diameter of the powder particles in the micron range. In step 2, keratin is obtained in solution by suspending the wool powder in a LiBr and dithiothreitol (DTT) water solution and allowing it to react at high temperature, under stirring and nitrogen environment. Insoluble wool residues are removed by hot filtration in step 3. To promote the phase separation of keratin from the extracting medium, NaCl is first added in step 4, and afterwards the solution stored at low temperature (step 5). Macroscopic phase separation is obtained via centrifugation in step 6 and the fibrillar keratin phase finally collected in step 7 and stored at 4° C. for further uses (step 8).

The method for extraction of the keratin from wool avoided harsh conditions that would cause protein denaturation, and instead helped solubilize the keratin crystalline domain by decreasing its melting temperature. This was achieved by using lithium bromide (LiBr), a salt which is able to induce a reversible solid-to-liquid phase transition of keratin in water by weakening its hydrogen bonds. Anisotropic LiBr was chosen to perform a non-denaturing extraction of alpha-keratin from wool. Breaking down the dense disulfide network of the hair matrix component is another requirement to set the fibrous keratin free from the hair structure and this step was addressed by using 4-dithiothereitol (DTT) (FIG. 1B). DTT is a known reducing agent that catalyzes the reversible cleavage of the disulfide bond by yielding two sulfhydryl moieties which are prompted to reform the native disulfide bridge only in oxidative conditions. As shown in FIG. 1B, keratin was extracted by treating ground wool with an extraction medium consisting of a water solution of LiBr and DTT, followed by hot filtration to remove insoluble keratin residues. Unlike conventional methodologies relying on dialysis to purify and concentrate the protein solution, at this step, keratin was isolated from the extraction medium via liquid-liquid phase separation. Indeed, at room temperature, keratin separates from the extracting medium in a form of a heavier liquid phase. Enhancement of phase separation was triggered upon NaCl addition and further storage at low temperature. The keratin liquid phase was finally collected after centrifugation. This last step of the protocol enabled the isolation of a high concentrated (45% w/v) and thermodynamically stable keratin solution.

Materials

All reagents were commercially available and used without further purification unless otherwise stated. Mohair wool was purchased from R. H. LINDSAY COMPANY, while lithium bromide (LiBr), hydrogen peroxide ($H_2O_2$), sodium sulfate ($Na_2SO_4$) and 1,4-dithiothreitol (DTT) were purchased from Sigma Aldrich. Dialysis cassette Slide-A-Lyzer™ with a cutoff of 3.5 KD (0.1-0.5 mL) were purchased from Thermo Fischer Scientific.

Wool Preparation Prior to Extraction

Wool was first washed with ethanol for 40 hours using a continuous Soxhlet extraction system, rinsed with water, and allowed to dry at room temperature. Successively, wool fibers were manually cut into shorter segments (approximately 5 mm) and ground to micron-size particles using a Retsch PM100 planetary ball mill. Specifically, 20.5 g of cut wool was placed in a 250 mL stainless steel jar together with stainless steel balls (90 ml, 5 mm ø) and allowed to grind at 450 rpm for 5 minutes and then left to settle for 20 minutes. The process was repeated several times for a total of 3 hours. FIG. 2 is a scanning electron micrograph of the wool powder that was produced showing that the average size of the wool particles was about 10 μm across.

Keratin Extraction and Dope Preparation

Under a $N_2$ atmosphere, wool powder (9.5 g) was suspended in a water solution (150 mL) of lithium bromide (8 M) and DTT (0.15 M), and the reaction conducted at 90° C. during vigorous stirring for 40 hours. Afterwards, wool residue was collected by hot filtration under negative pressure and the solution allowed to cool down to room temperature.

NaCl (3.75 mg, 32 mg/mL) was added portion wise under stirring until a two-phase solution including a first alpha-keratin solution which included alpha-keratin protofibrils and intermediate filaments in liquid crystal phase and a second solution including the remaining salt was formed. The two-phase solution was then placed at 4° C. for 6 hours to obtain complete separation of the phases.

The alpha-keratin solution, which included alpha-keratin protofibrils and intermediate filaments in liquid crystal phase, was separated from the solution including the remaining salt via centrifugation (3000 rpm, 4° C.) to obtain a spinnable keratin dope, which was also used as a printing material (10.31 mL) (FIG. 4A).

The concentration of alpha-keratin in the dope was calculated by isolating the keratin via dialysis against water (3×4 mL) for 2 days followed by dehydration via freeze drying. The dope contains about 45% $_{w/v}$ of keratin with a total yield of about 38% from the starting material.

It is noted that, when a solution including LiBr at a concentration lower than 6 M was used, there was a dramatic drop in alpha-keratin yield, and, for concentrations of LiBr higher than 8 M, a higher amount of keratin was extracted but the dope required further processing in order to be suitable for spinning.

It should also be noted that when the concentration of DTT was higher than 150 M, there was no change in extraction yield and for concentrations lower than 150 M, instability of the dope towards oxidation was observed.

Example 2: Structural Investigation of Keratin in the Spinnable Dope

Figure 3A:
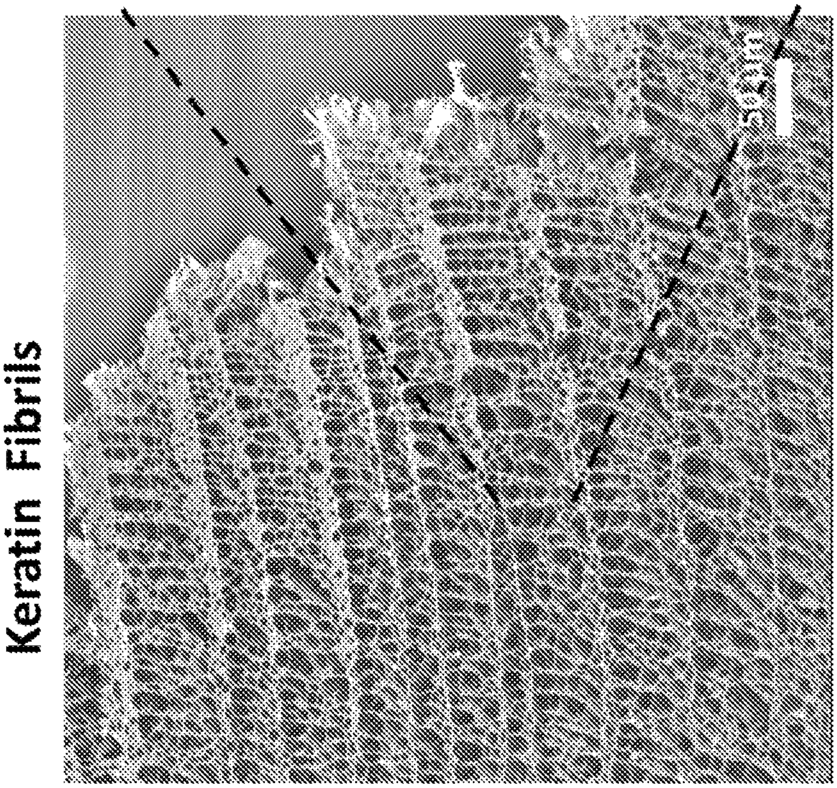
FIG. 3A is a scanning electron micrographs (SEM) image of alpha-keratin intermediate filaments obtained from the alpha-keratin solution (e.g., dope) prepared as described herein that was freeze dried and dialyzed to obtain the alpha-keratin present in the solution.
Figure 3B:
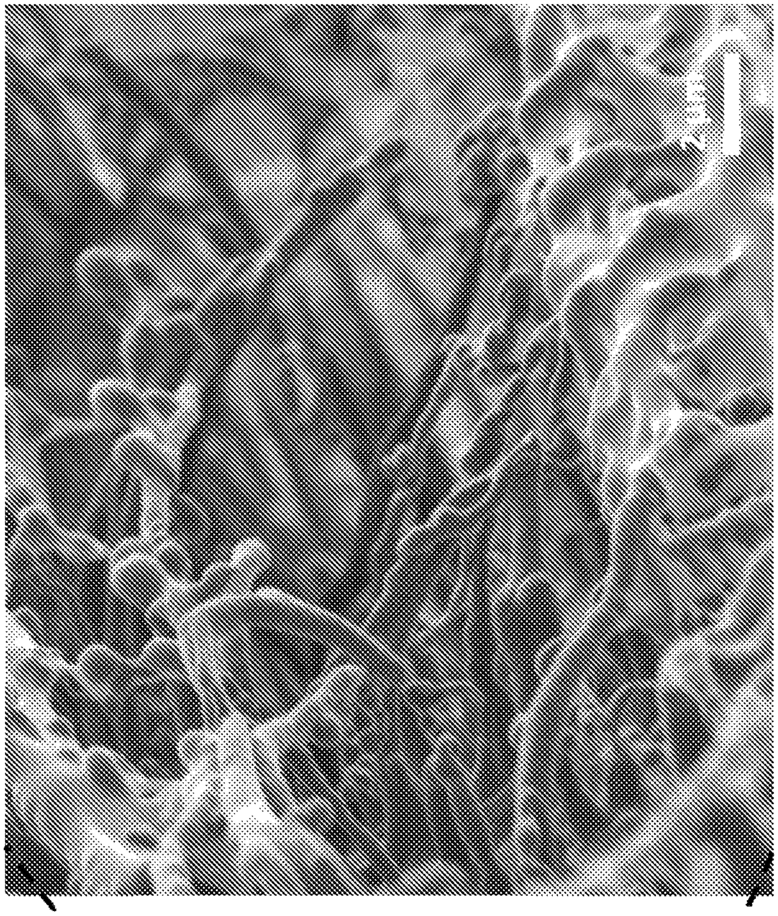
FIG. 3B is a detail of the image in FIG. 3A.
Figure 3C:
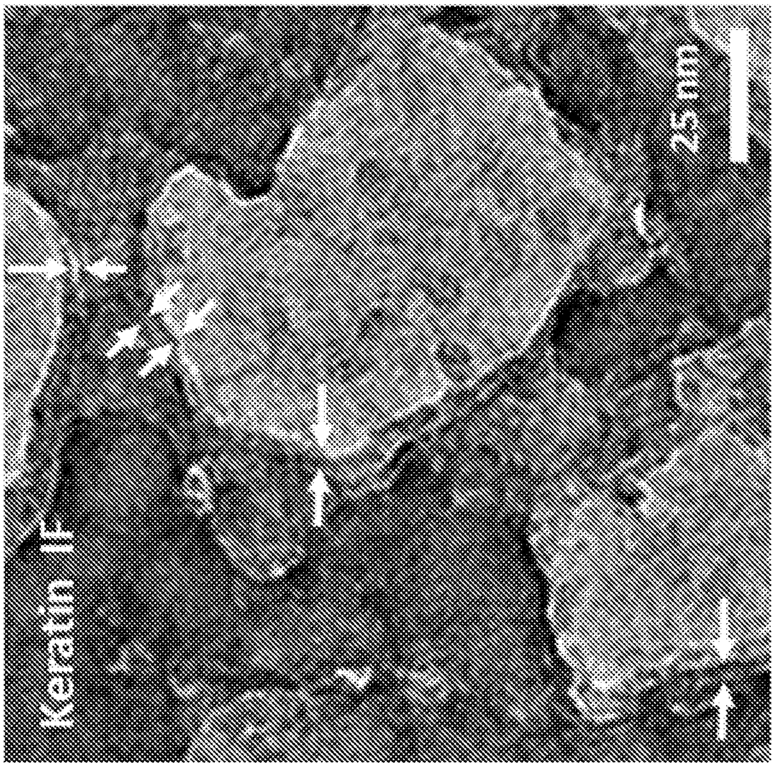
FIG. 3C is a transmission electron micrograph (TEM) of alpha-keratin intermediate filaments obtained from a 20× diluted solution of an alpha-keratin dope prepared using a method employing an 8 M LiBr water solution, as described in the appended examples.

The efficacy of the extracting protocol in preserving the keratin hierarchical organization was then assessed by SEM and TEM analysis (see FIGS. 3A-3C). The transmission electron micrograph obtained from a diluted sample of the extracted keratin solution shows the presence of a continuous layer characterized by a finger print pattern with striations of ~3 nm in width, in line with the average diameter of protofibrils (FIG. 3C). To avoid structural artifacts due to both surface absorption induced packing or staining defects, and to investigate the solution state of keratin assemblies, the same sample was also subjected to Cryo-TEM analysis. A cryogenic technique avoided the drying step for the sample preparation, thus allowed for the investigation of the keratin assemblies close to the dope conditions. The cryo-TEM images FIGS. 4B and 4C show the presence of bundles up the micron range in length and with a varying width maximum value of approximately 10 nm. The detail in FIG. 4C elucidates the internal architecture of the bundles to have a repetitive regular substructure of fibrils with a consistent width of 3 nm. When compared to the native structure of animal hair, these structural features suggest the presence of the intermediate filaments retained in their inner organization. Further details are provided below.

Scanning Electron Microscopy (SEM) Sample Preparation and Analysis

Samples were prepared from the spinnable dope prepared in Example 1 by freeze drying keratin obtained from dialysis of the dope, deposited on a SEM stub (12.5 mm ø) covered with carbon tape and successively sputter coated with Pt/Pd (10 nm thickness) using an EMS 200T D dual sputter coater. SEM micrographs were taken using a Zeiss Ultra Plus Field Emission Scanning Electron Microscope with an electric high tension (EHT) of 2 kV and a SE2 detector.

FIG. 3A is a scanning electron micrograph of the keratin present in the dope and FIG. 3B is a magnification of an area in FIG. 3A. These Figures demonstrate the presence of micron-sized fibrils obtained through a self-assembly process of the keratin present in the dope upon dilution of the keratin dope via dialysis. As keratin filaments are prone to fibrillate upon dilution of the LiBr, FIG. 3B confirms that that the method of keratin extraction using LiBr is able to maintain the alpha-helical nature of the keratin.

Transmission Electron Microscopy (TEM) Sample Preparation and Analysis

Samples were prepared from a 20× diluted solution of the keratin dope prepared as described in Example 1. A standard negative staining protocol using uranyl acetate (1%$_{w/v}$) and carbon film coated 400 mesh Cu EM grids (Electron Microscopy Sciences) was used to image the samples. TEM micrographs were taken using a FEI Tecnai equipped with a 200 kV Schottky FEG.

FIG. 3C is a TEM micrograph showing the presence of nanometer fibrils in the size range of keratin intermediate filaments and tetramers (see, e.g., FIG. 1A), thereby demonstrating the presence of keratin in its native hierarchical structure as liquid crystal phase in the dope.

Cryo-Transmission Electron Microscopy (Cryo-TEM) Sample Preparation and Analysis Samples were prepared from a 20 μL drop of a 20× diluted solution of the keratin dope prepared as described in Example 1, deposited on a Quantifoil "holey" grids R 2/1 Cupper. The cryofixation step was carried out with a Gatan Cryoplunge 3 system. Cryo-TEM micrographs were taken using a FEI Tecnai Arctica CryoTEM with Autoloader.

FIG. 4B is a cryo-TEM micrograph of the keratin dope and FIG. 4C is an enlargement of one area in FIG. 4E. These micrographs clearly show the presence of nanometer fibrils in the size range of 10 nm, consistent with the features of alpha-keratin and demonstrating the presence alpha-keratin protofibrils and intermediate filaments in liquid crystal phase in the dope and the successful implementation of the non-denaturing method to extract alpha-keratin from animal hair and formulate a spinnable dope as described in Example 1.

Figure 5:
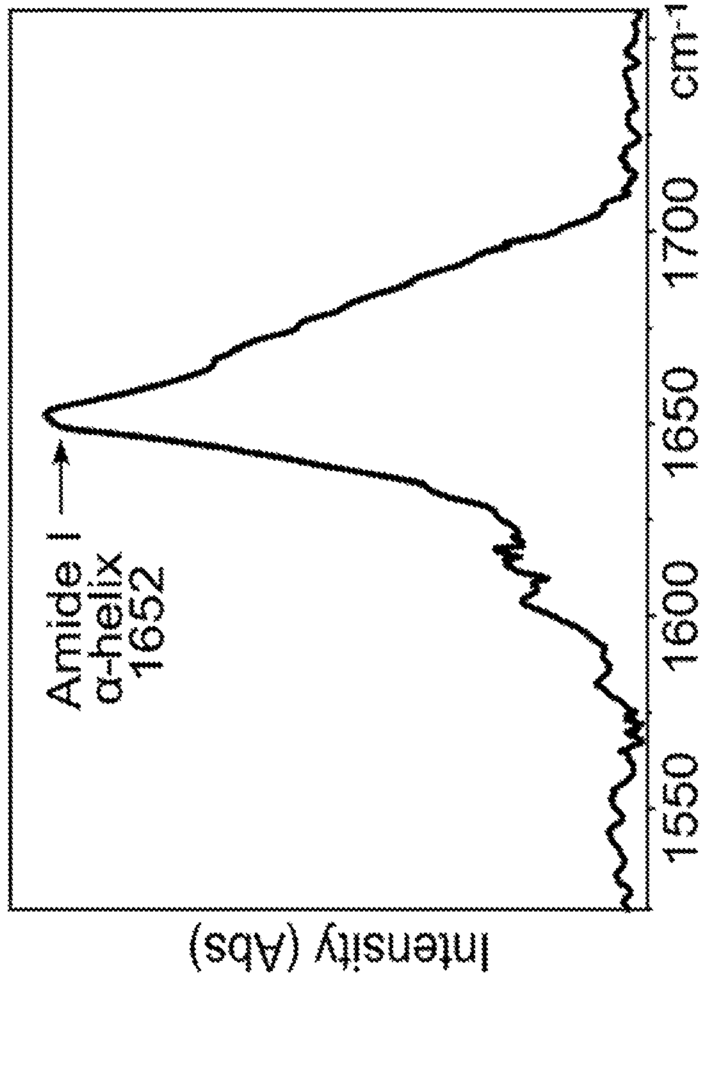
FIG. 5 is graph of results of Raman spectroscopy of extracted and purified keratin. The band at 1652 $cm^{-1}$ demonstrates retention of the α-helix secondary structure after extraction.

Additional chemical and structural investigation of the extracted keratin solution was carried out to assess the keratin α-helix secondary structure and the presence of higher-level hierarchical superstructures. Deconvolution of Raman spectrum obtained from a diluted sample of the extracted keratin supports the presence of the α-helix motif by showing sharp peak of the amide I at 1652 cm-1 (FIG. 5).

Figure 6B:
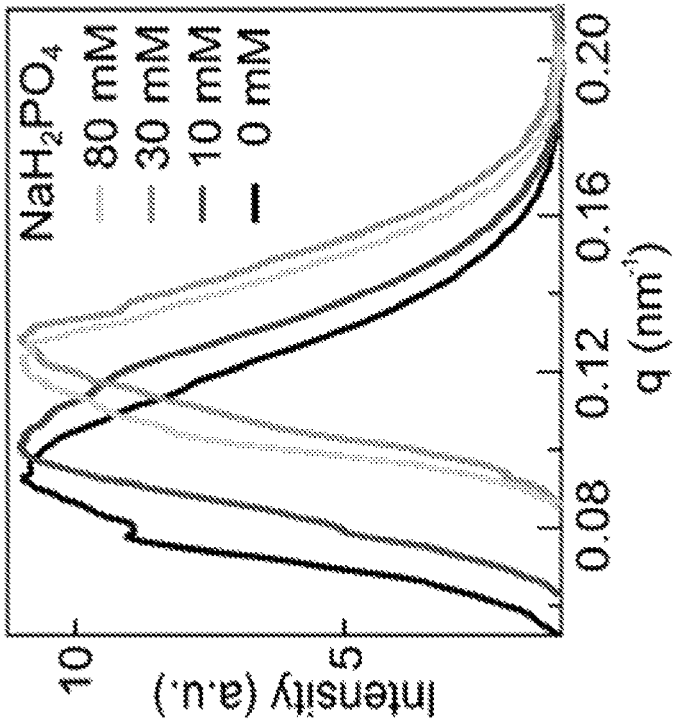
FIG. 6B is a graph of background subtracted SAXS profiles of the keratin solution showing a shift towards higher q with increasing concentration of $NaH_2PO_4$, and thus tighter packing of the keratin nematic phase.
Figure 6A:
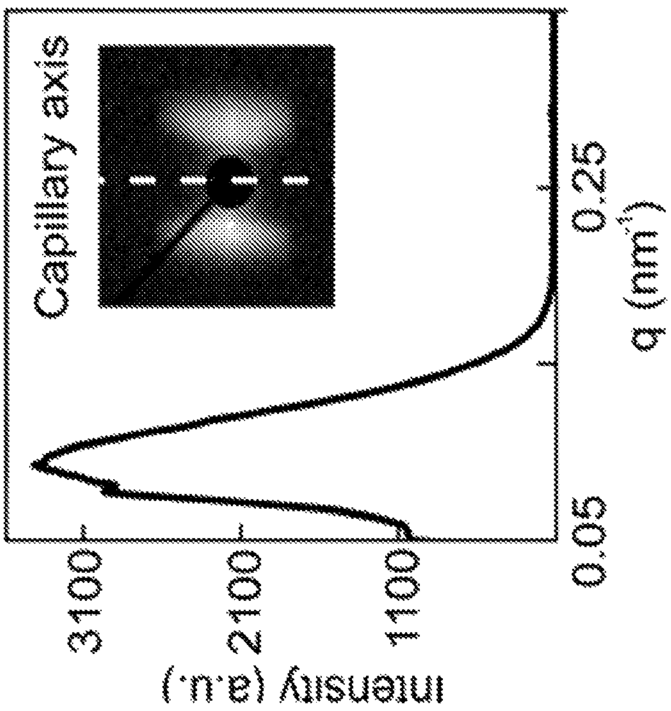
FIG. 6A is a graph of small angle x-ray scattering (SAXS) profile data obtained from the extracted keratin solution inside a quartz capillary (1.5 mm diameter) and related 2D SAXS pattern (inset), both indicating the nematic phase ordering of keratin under shear and space constraints.
Figure 6C:
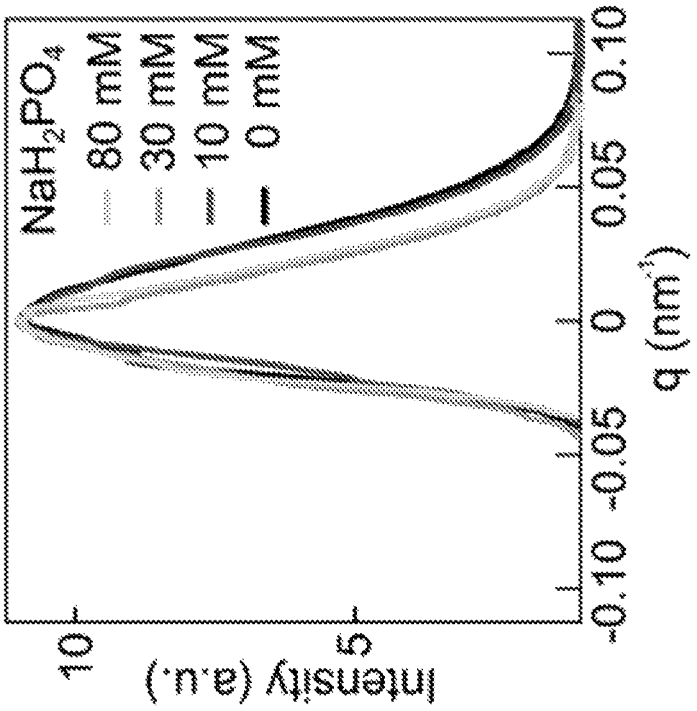
FIG. 6C is a graph of the background subtracted SAXS profiles of the keratin solution in which the different profiles have been shifted such that the maximum appears at the same q value for each to illustrate the peak narrowing with increasing concentration $NaH_2PO_4$, and, thus enhancement of the keratin domains alignment along the capillary axis.
Figure 6D:
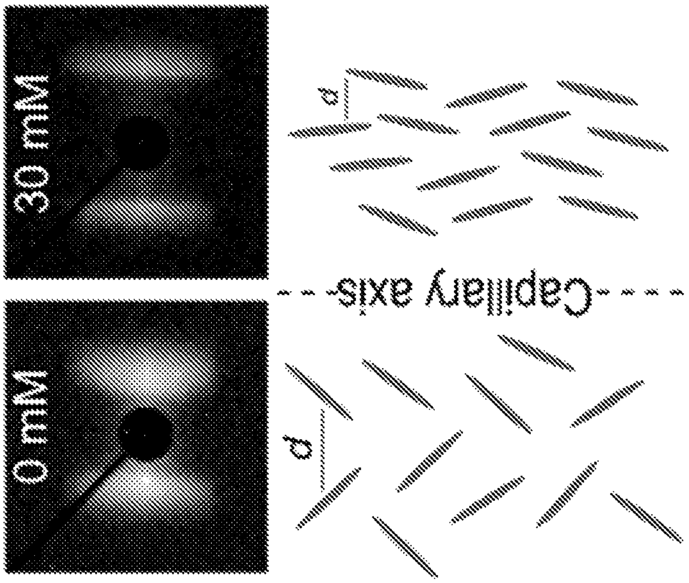
FIG. 6D schematically depicts ordering of the keratin assemblies along the capillary axis upon addition of $NaH_2PO_4$ (bottom portion) and includes 2D SAXS scattering patterns of the keratin solution with and without $NaH_2PO_4$ (30 mM) (top portion), thus showing the enhancement in alignment upon addition of the kosmotropic salt.

Having keratin proteins in their native hierarchical organization facilitates the anisotropic orientation of the α-helices from the molecular level up to the macroscopic scale during the material fabrication process. This point was further proved when the keratin fibrillar assemblies were found to organize themselves into a nematic phase under shear stress and space constraints. This was initially deduced by synchrotron small angle X-ray scattering analysis carried out on a sample of the keratin solution prepared in a quartz capillary (FIG. 6A). During the analysis, the capillary was placed perpendicular to the X-ray beam and with its longitudinal axis parallel to the meridian axis of the detector. The scattering pattern shows a broad and anisotropic signal at low value of q (0.093 nm-1) that was attributed to a nematic phase of the keratin fibrillar assemblies. The equatorial nature of the scattering pattern suggests the keratin domains to be preferentially oriented parallel to the capillary axis, with the lattice size parameter d associated to their average distance (FIG. 6A, inset). The nematic ordering of the keratin protofibril likely resulted from the shear stress generated at the capillary wall proximity during sample preparation and was further stabilized by the space constraint. In this scenario, enhancement in rigidity and stiffness of the keratin fibrillar assemblies was expected to lead to higher degree of order of the nematic phase. This enhancement in rigidity and stiffness was achieved by treating the keratin dope with sodium phosphate ($NaH_2PO_4$), a kosmotropic salt which is known to promote protein crystallization by charge screening effect. As depicted in FIG. 6B, the addition of sodium phosphate caused a peak shift towards higher value of the scattering vector q. The lattice size d was calculated for the different concentrations of $NaH_2PO_4$ and it exhibited a decrease in value from 67 nm to 48 nm, up to a saturating concentration of kosmotropic salt beyond 30 mM. This trend is in line with a tightening process involving the nematic phase packing and induced by charge screening. Upon addition of the kosmotropic salt, narrowing of the equatorial scattering pattern and consequent sharpening of the scattering peak were also observed. This demonstrated that the keratin domain alignment was increased along the capillary axis with addition of the kosmotropic salt (FIG. 6C and FIG. 6D).

Figure 6E:
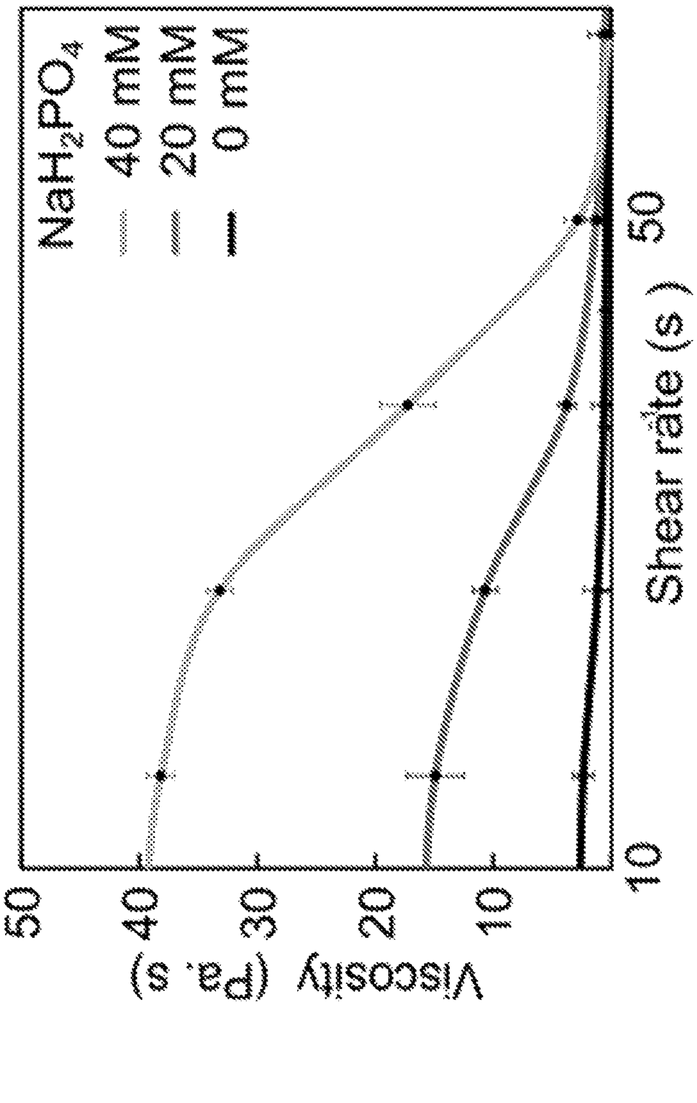
FIG. 6E is a graph of rheology measurements of the keratin solution showing an increase in viscosity and shear thinning with increasing concentration of $NaH_2PO_4$.
Figure 6F:
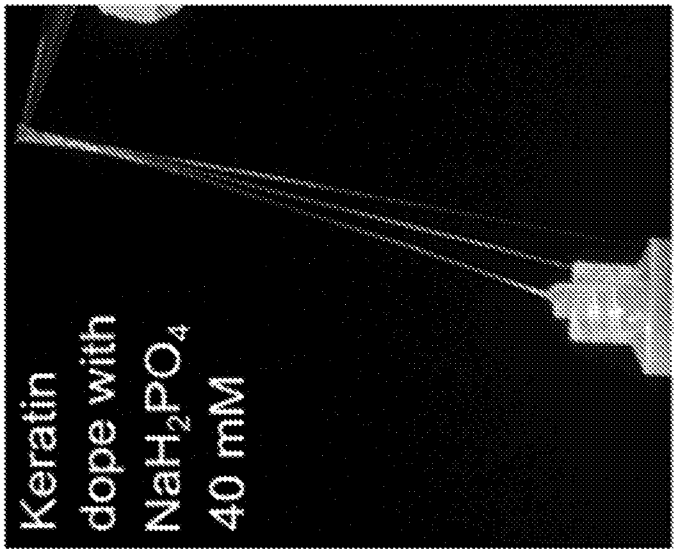
FIG. 6F is a photographic image of a fiber directly drawn from a keratin solution containing $NaH_2PO_4$ in 40 mM concentration.

Rheology measurements were carried out to further investigate the preorganization of keratin in solution under shear stress and in the presence of $NaH_2PO_4$. At low shear rates, an increase in viscosity was observed at higher sodium phosphate concentrations (FIG. 6E). The change in physical property of the dope is attributed to an enhancement in the aggregation degree of keratin domains and triggered by the charge screening effect induced by $NaH_2PO_4$. This conclusion is further demonstrated by the SAXS data showing a tighter packing of the keratin filaments upon addition of the kosmotropic salt. At higher shear rates, the keratin dope shows a well-defined shear thinning behavior indicating alignment of the keratin filaments, thus organization of the latter into a nematic phase under shear stress. Interestingly, steeper slopes were observed upon increase of $NaH_2PO_4$ concentration, thus indicating higher degree of order of the nematic phase induced by charge screening behavior which is in agreement with the increase in orientational order parameter found in SAXS. At $NaH_2PO_4$ concentration of 40 mM, the keratin dope showed desirable viscoelastic properties suitable for spinning, as fibers could be directly formed by simply pulling the protein with tweezers (FIG. 6F).

Example 3: Wet-Spinning of Keratin Fibers

Keratin fibers were wet-spun using $NaH_2PO_4$ as a coagulant and hydrogen peroxide as a thiol oxidative agent to form disulfide bridges fixing a memory shape or configuration of the fiber. The wet spinning platform enabled both coagulation and cross-linking to occur while stretching the fiber. Increasing drawing speed resulted in a higher degree of keratin intermediate filament alignment in the polymeric fibers so produced together with an enhancement of both Young's modulus in the resulting fibers and degree of α-helix to β-sheet transformation in the resulting fibers when load is applied.

Figure 7A:
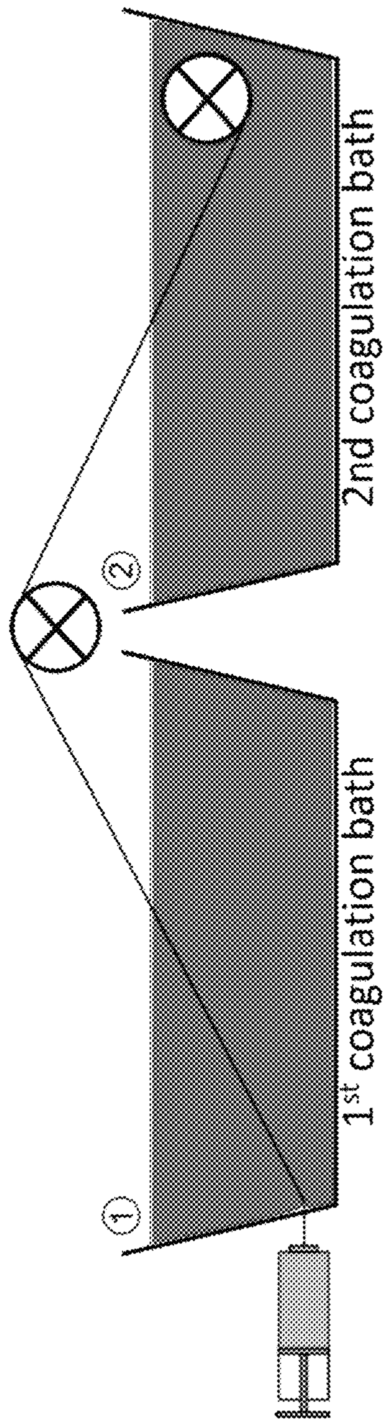
FIG. 7A schematically depicts an exemplary wet-spinning system used for the preparation of polymeric fibers including alpha-keratin protofibrils and intermediate filaments from the alpha-keratin solution including alpha-keratin protofibrils and intermediate filaments in liquid crystal phase (alpha-keratin dope) extracted from hair (e.g., wool) in accordance with some embodiments.
Figure 7B:
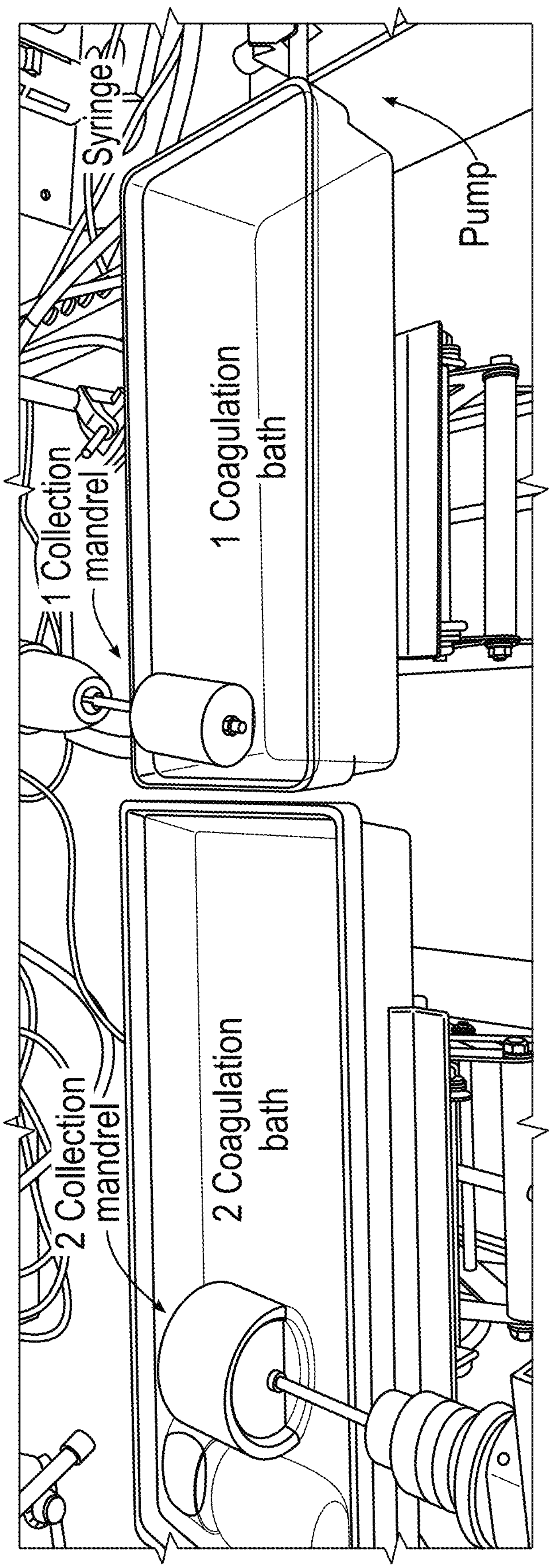
FIG. 7B is an image of a wet-spinning platform used to produce keratin fibers in an example. The platform includes syringe pump and two coagulation baths placed in series with independent polytetrafluoroethylene (PTFE) collectors. At room temperature, the keratin dope is infused/extruded at an infusion rate (e.g., 10 μL/min) into the first coagulation bath (e.g., containing a water solution of $NaH_2PO_4$ (0.4 M)). A nozzle (e.g., a 27 gauge needle) is used for the infusion/extrusion. Fibers are collected after the first coagulation bath and continuously drawn into the second coagulation bath (e.g., containing a water solution of $NaH_2PO_4$ (0.8 M) and $H_2O_2$ (1%)).

As depicted in FIGS. 7A-7B, the exemplary wet-spinning system included of a syringe pump and two coagulation baths placed in series with independent polytetrafluoroethylene (PTFE) collectors, allowing a controlled stretching of the fibers during the spinning process.

Figure 8A:
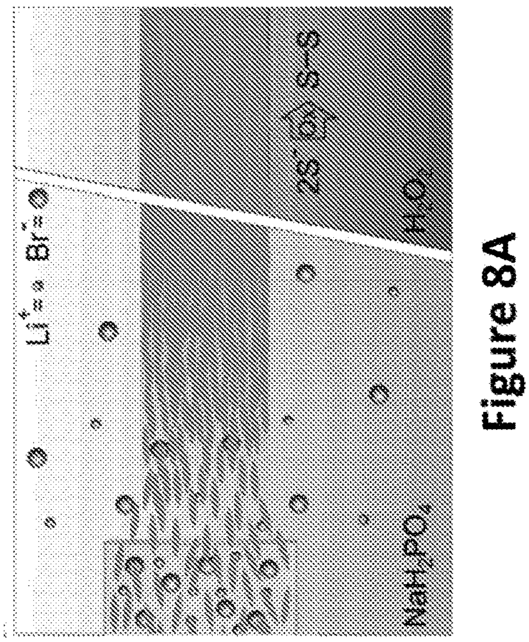
FIG. 8A schematically depicts the coagulation of an infused/extruded stream and transition from the keratin nematic phase to an anisotropic fiber under strain in an example method. In the first coagulation bath, keratin self-assembly is triggered by the LiBr outer diffusion and $NaH_2PO_4$-induced charge screening effect as depicted in the image on the left. In the second coagulation bath, the coagulated fiber undergoes reconstitution of the disulfide covalent network via $H_2O_2$-induced oxidation as depicted in the image on the right.
Figure 8B:
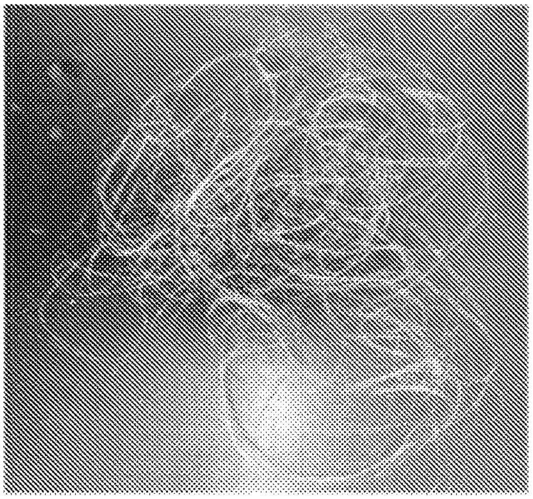
FIG. 8B is photographic image of a continuous keratin fiber about 100 m long.

Under shear force, the nematic phase organization of protofibrils was used as template to induce the alignment of the coiled-coils via extrusion and thus production of fibers potentially showing shape-memory properties (FIG. 8A). The anisotropic orientation of the coiled-coils along the fiber axis is desired as it ensures maximization of the α-helix unfolding under axial strain. Thus, the reconstitution of the fiber was via using a wet spinning platform and employed a) protofibrils self-assembly through a liquid-to-solid phase transition and b) the reconstitution of the disulfide network connecting the fibrillary structure and feasible under oxidative conditions. The liquid-to-solid equilibrium shift was addressed by using a water solution of the $NaH_2PO_4$ salt as antisolvent, thus allowing for both the outer diffusion of LiBr from the extruded keratin dope and further self-assembly of the protein via charge screening induced by the kosmotropic salt. The restoration of the disulfide covalent network was via oxidative activity of a thiol oxidative agent, specifically hydrogen peroxide ($H_2O_2$), on the cysteine thiol group. To enable the complete coagulation of the protein before forming the disulfide covalent network, the two reaction steps were located in different and sequential baths, because the $H_2O_2$-assisted oxidation occurs as a fast kinetic reaction (FIG. 8B). Taking into account the effect of sodium phosphate on enhancing the protofibrills preorganization in solution, and thus the rheological properties of the fluid, fibers were spun from a keratin dope by extruding/infusing a stream of dope into a first coagulation bath including an aqueous solution of $NaH_2PO_4$ at 0.4 M thereby forming a fiber, and continuously delivering the fiber into the second bath containing a water solution of $NaH_2PO_4$ (0.8 M) and $H_2O_2$ where it was collected. The high concentration of keratin in the dope confers robustness to the fiber during the coagulation process, thus allowing for a flexible and reliable fiber spinning. As a result, single and homogeneous fibers up to 100 meters in length could be produced (FIG. 8B). For the same reason, high drawing rates could also be applied during spinning, enabling the fiber diameters to reach values of 10 μm (FIG. 8B).

Figure 8C:
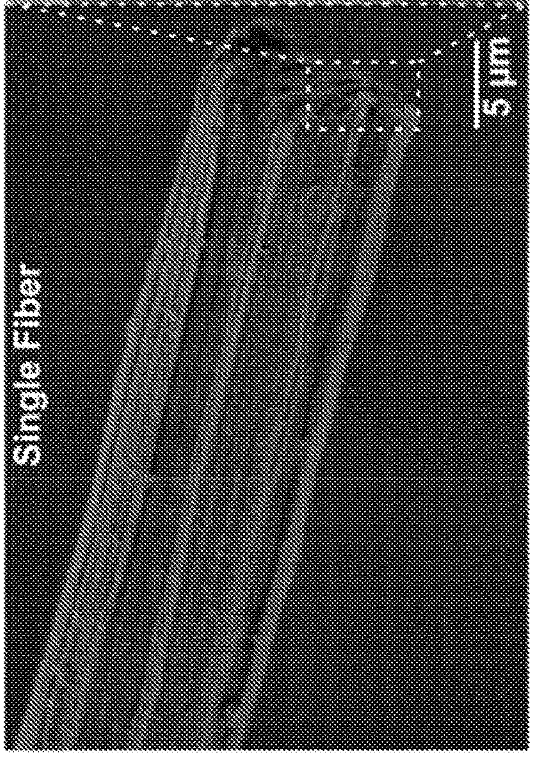
FIG. 8C is an SEM micrograph of the end of the keratin fiber showing its fibrillar structure.
Figure 8D:
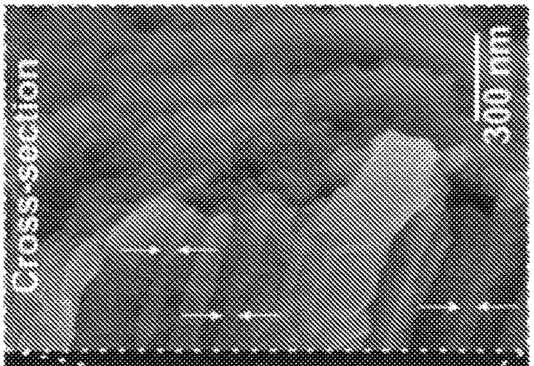
FIG. 8D is a detail of the SEM micrograph of FIG. 4C, showing the fibrillar structure of the fiber core.
Figure 9B:
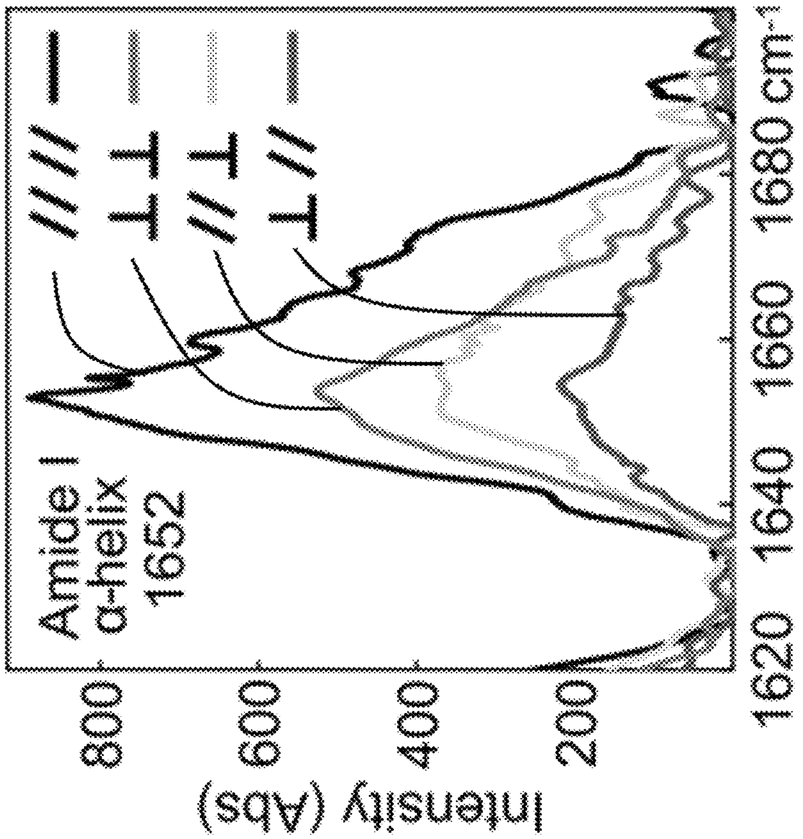
FIG. 9B includes graphs of data from polarized Raman spectroscopy in the amide I region (1620-1700 cm-1) of a single keratin fiber oriented parallel to both laser and analyzer (black, // //), perpendicular to both laser and analyzer (dark gray, ⊥⊥), parallel to the laser and perpendicular to the analyzer (light gray, // ⊥) and perpendicular to the laser and parallel to the analyzer (medium gray, // ⊥). The highest Raman intensities being found for parallel orientations of the fiber respect to the laser for both cross and non-cross combinations (black and dark gray) is consistent with alignment of the α-helix along the fiber axis.
Figure 9A:
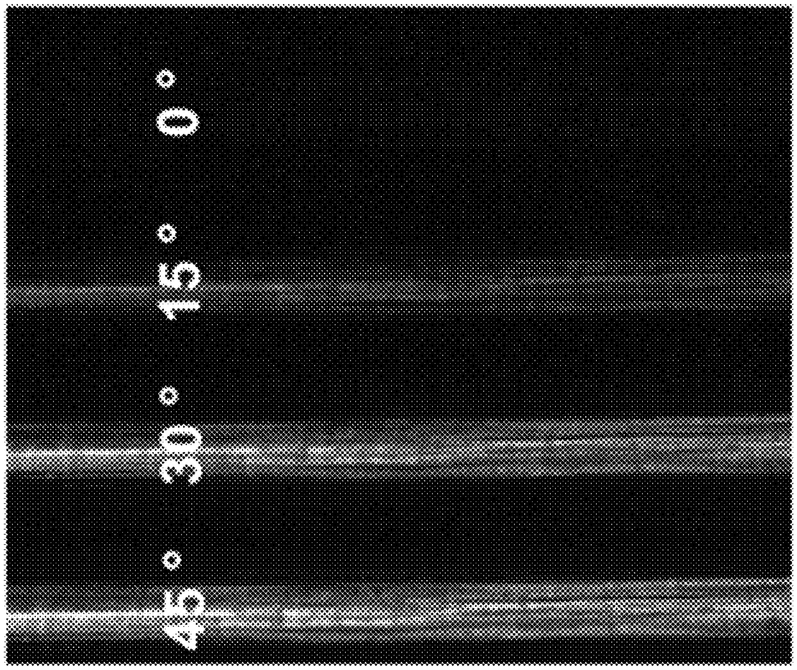
FIG. 9A is a polarized light microscopy image showing anisotropic birefringence of the keratin fiber.

Successively, spun fibers were kept in the second coagulation bath for 1 hour, washed with water and allowed to dry at room temperature. FIG. 8C depicts a single exemplary keratin polymeric fiber including alpha-keratin intermediate filaments that was prepared using this wet-spinning system. Polarized optical microscopy demonstrated the anisotropic nature of the fiber core by showing its birefringence behavior with a maximum of the transmitted light intensity at 45° (FIG. 9A). The molecular orientation of the α-helices within the fiber was investigated by following the change in intensity of the amide I signal (C═O stretching mode) during a polarized Raman spectroscopy experiment. In case of both the cross and non-cross combinations of the laser and the analyzer, the highest Raman intensities are observed when the fiber is oriented parallel to the laser (FIG. 9B). This trend suggests the C═O bond, and thus the α-helices to be preferentially aligned along the fiber axis.

Figure 9C:
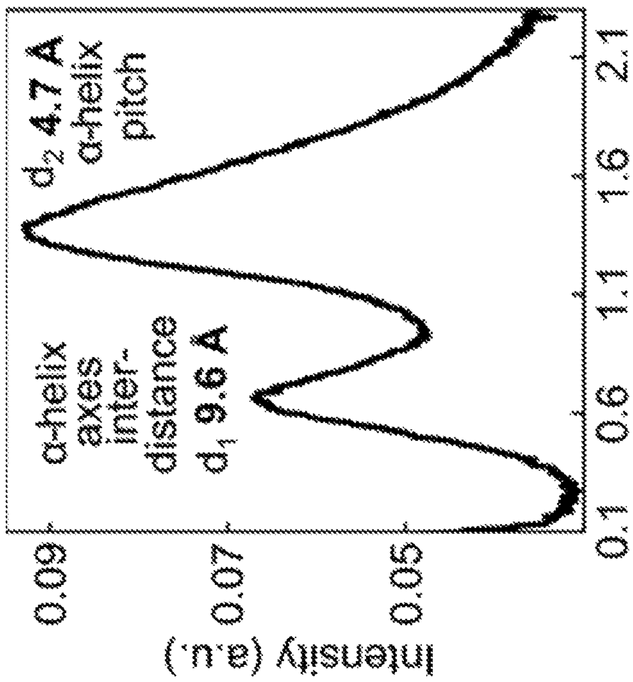
FIG. 9C is a WAXS scattering profile obtained from a bundle of keratin fibers oriented perpendicular to the x-ray beam and parallel to the meridian axis of the detector. The scattering signals at 4.7 and 9.6 Å belong to the α-helix pitch projection and spacing between adjacent α-helix axes, respectively.
Figure 9D:
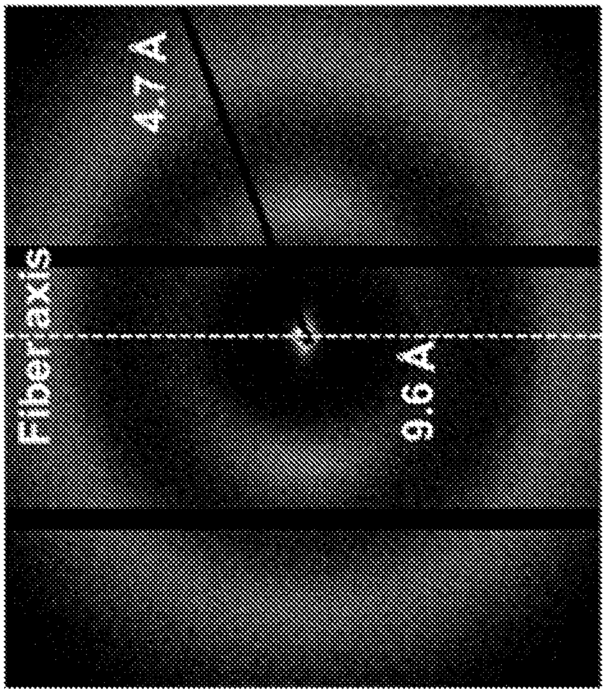
FIG. 9D is a 2D WAXS scattering pattern showing the anisotropic and equatorial signal of the α-helix axes inter-distance, thus suggesting the aligned orientation of the coiled-coils parallel to the fiber axis. The black bars are non-detecting areas corresponding to the gaps between the detector plates.
Figure 9E:
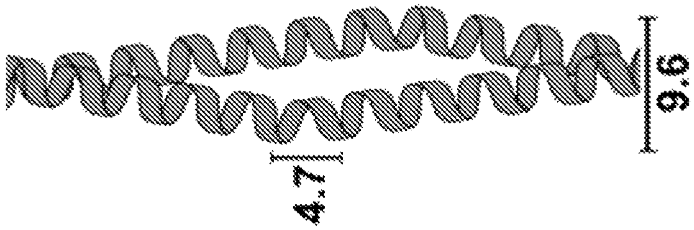
FIG. 9E schematically depicts the coiled-coils arranged along the fiber axis, the α-helix pitch projection of 4.7 Å, and the spacing between adjacent α-helix axes of 9.6 Å.
Figure 10:
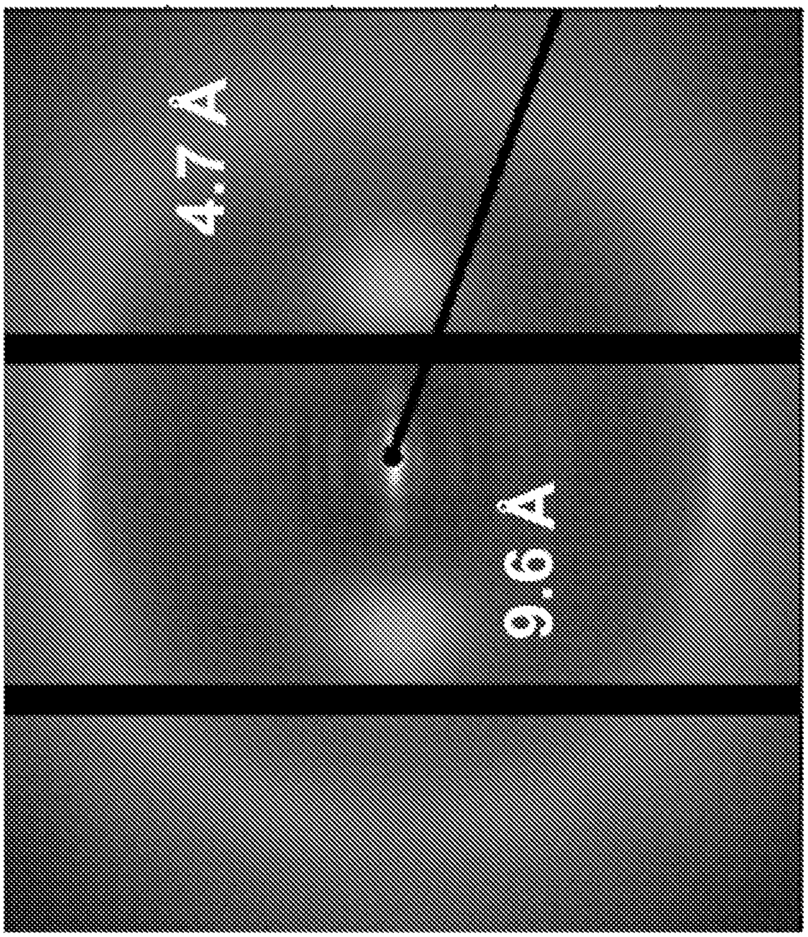
FIG. 10 is an image of a wide angle x-ray scattering pattern obtained from a bundle of wool hairs oriented perpendicular to the x-ray beam and parallel to the meridian axis of the detector for comparison with scattering patterns from the spun fibers. The 2D WAXS scattering pattern shows the equatorial signal of the α-helix axes inter-distance, and the meridian reflection at 4.7 belonging to the α-helix pitch projection. The black bars are non-detecting areas corresponding to the gaps between the detector plates.
Figure 11A:
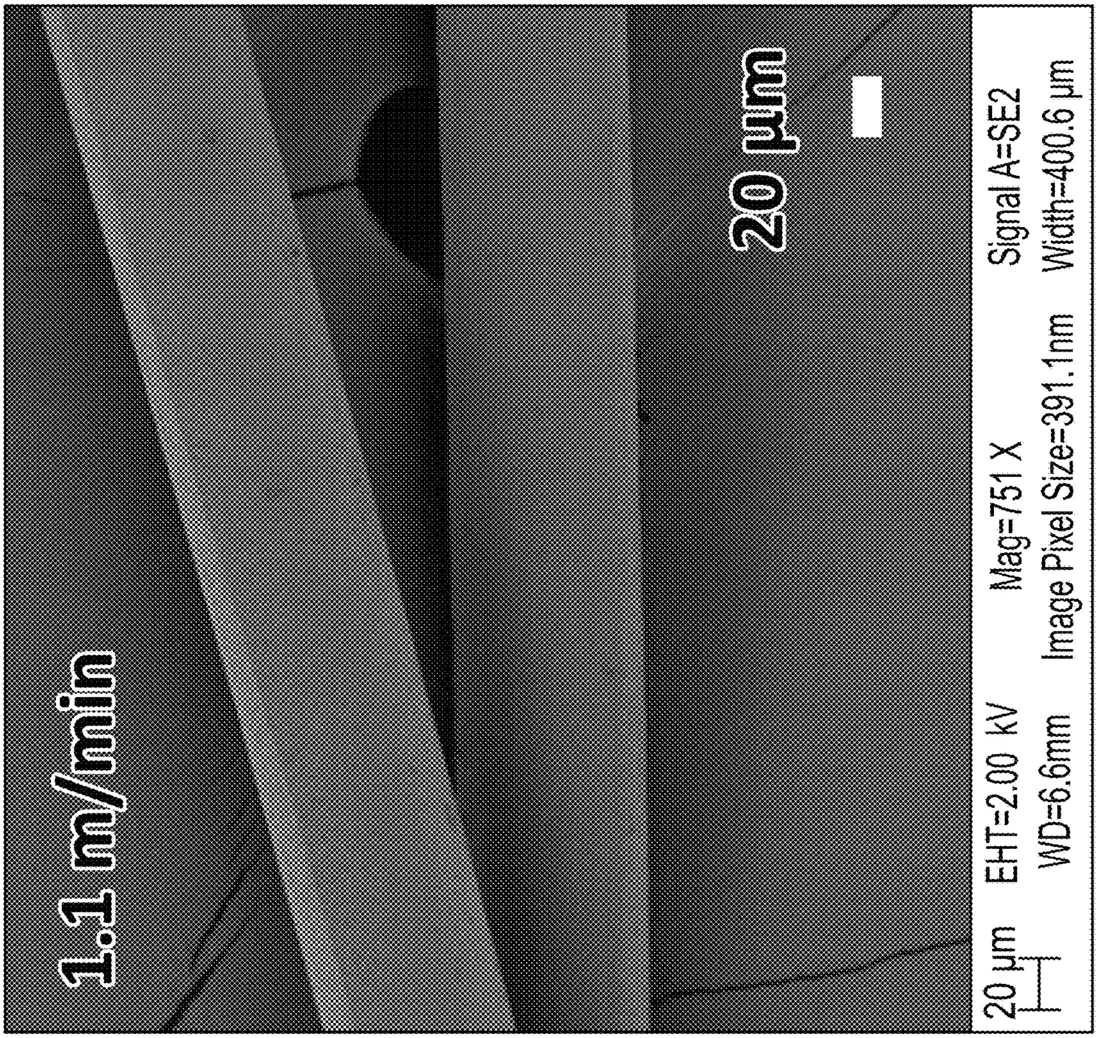
FIGS. 11A-11H are scanning electron micrograph (SEM) images of keratin polymeric fibers including alpha-keratin protofibrils and intermediate filaments prepared using the alpha-keratin solution including alpha-keratin protofibrils and intermediate filaments in liquid crystal phase (alpha-keratin dope) extracted from wool as described in Example 1, which were drawn using the wet-spinning system depicted in FIGS. 7A and 7B for different drawing speeds. The micrographs show the drawing-speed dependence of fiber diameter size. The diameters of fibers decrease from ≅50 μm to ≅15 μm in response to the increasing drawing-speed from 1.1 m/min to 9.9 m/min. Specifically.
Figure 11B:
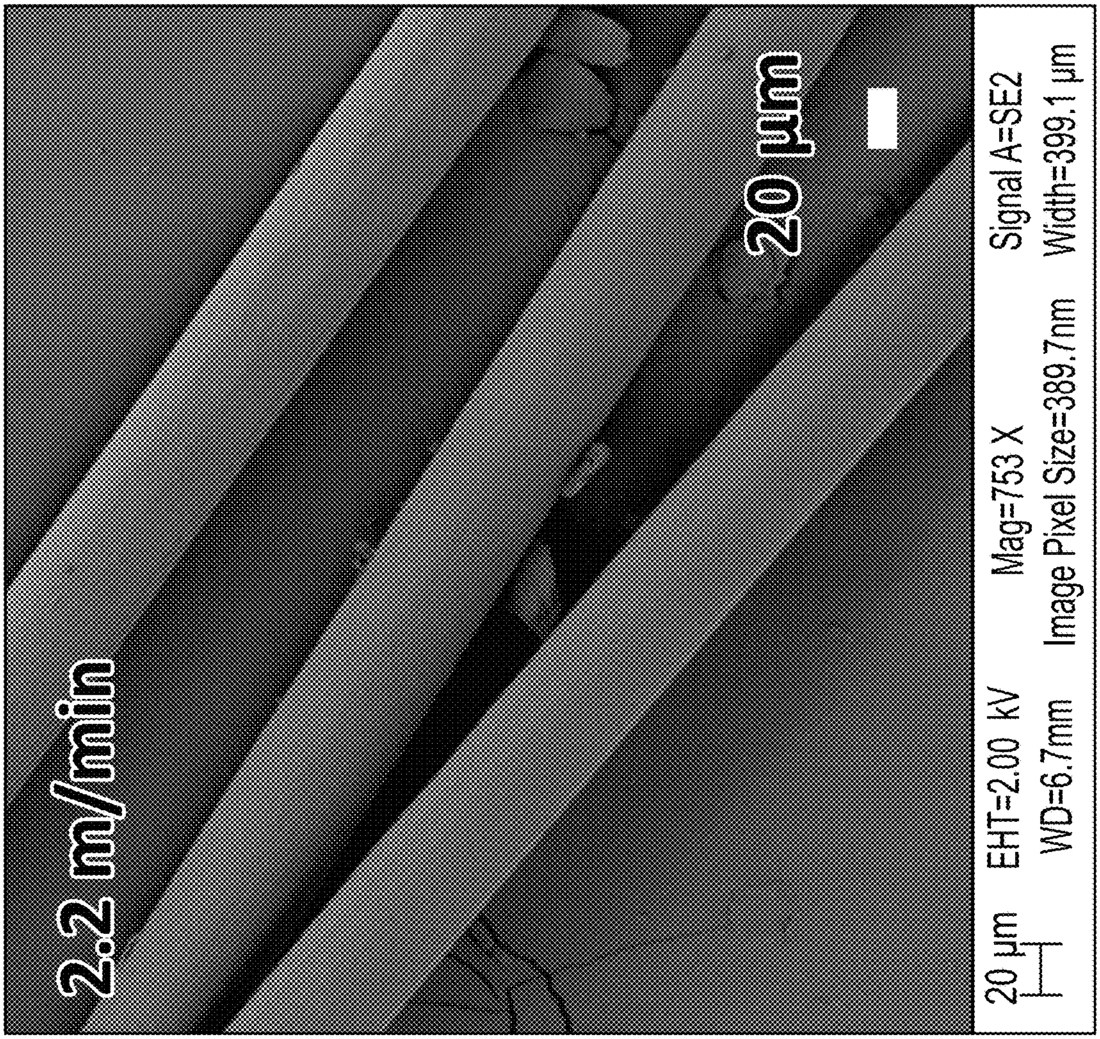
Figure 11C:
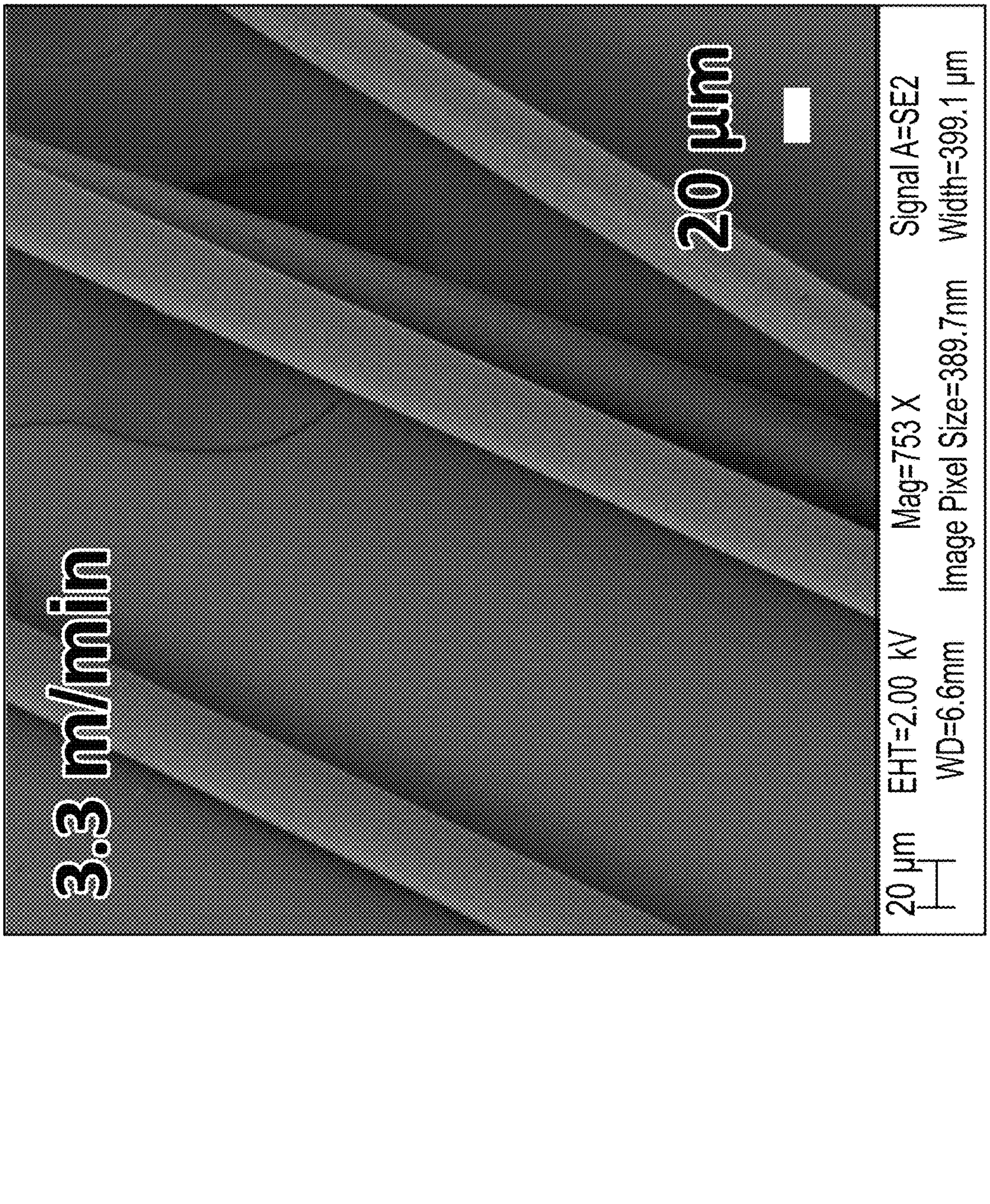
Figure 11D:
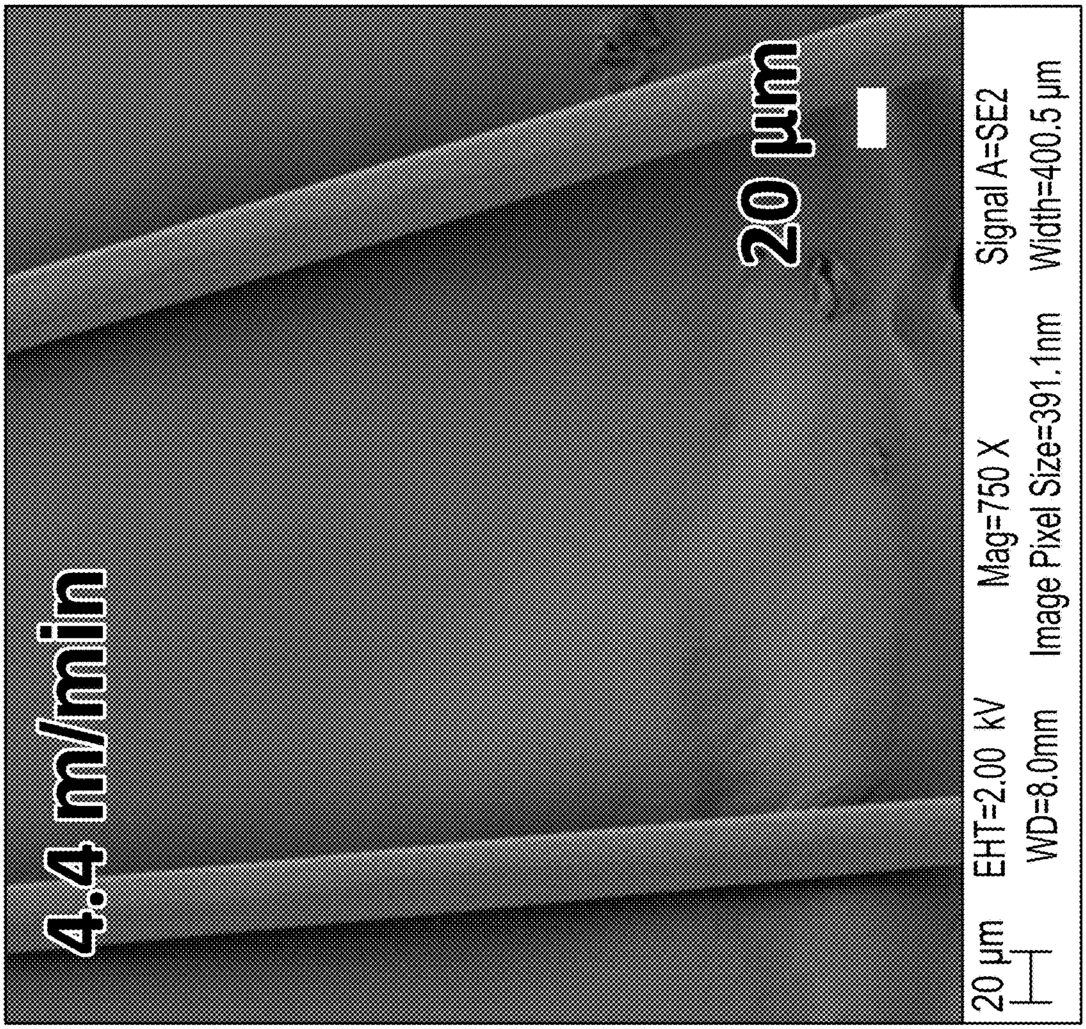
Figure 11E:
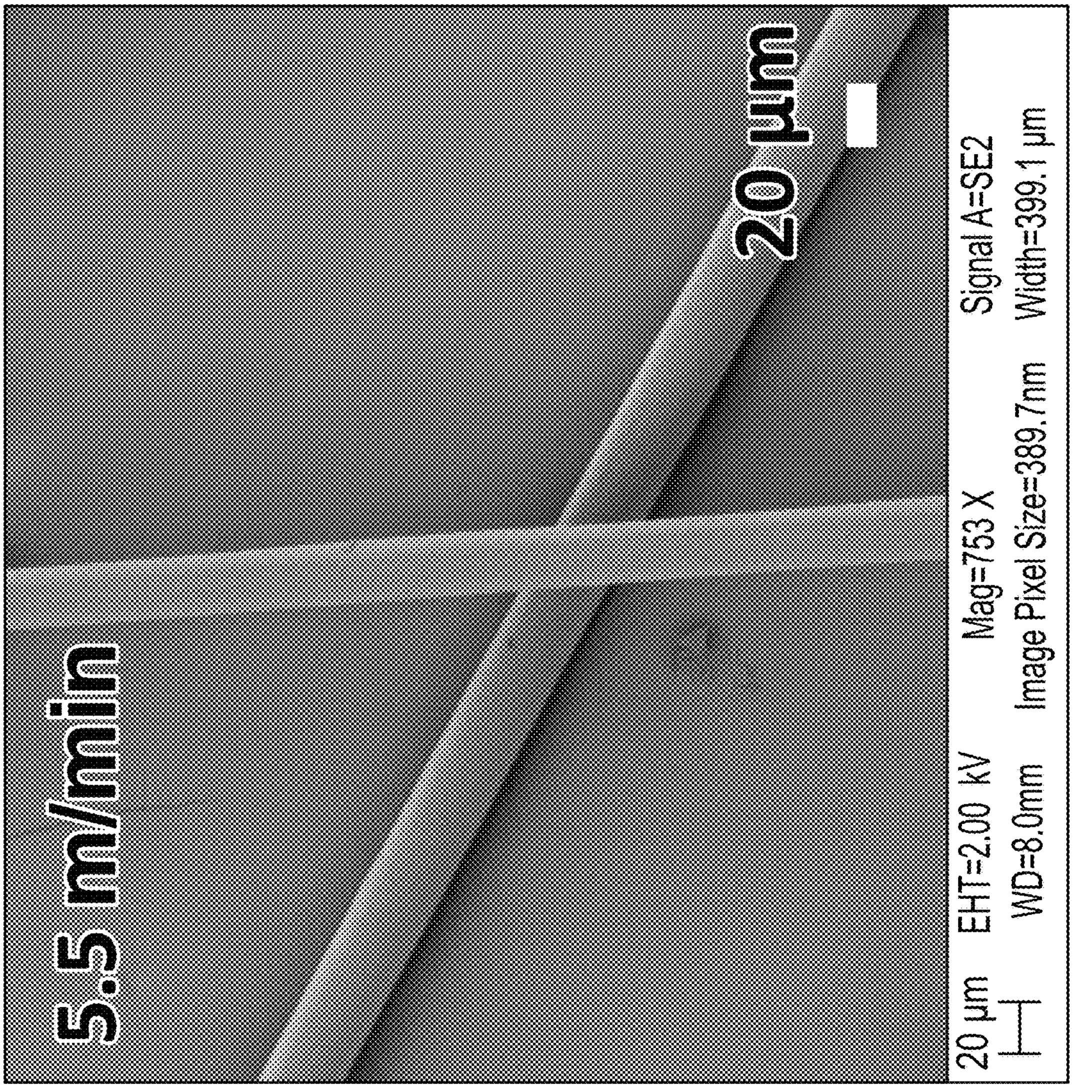
Figure 11F:
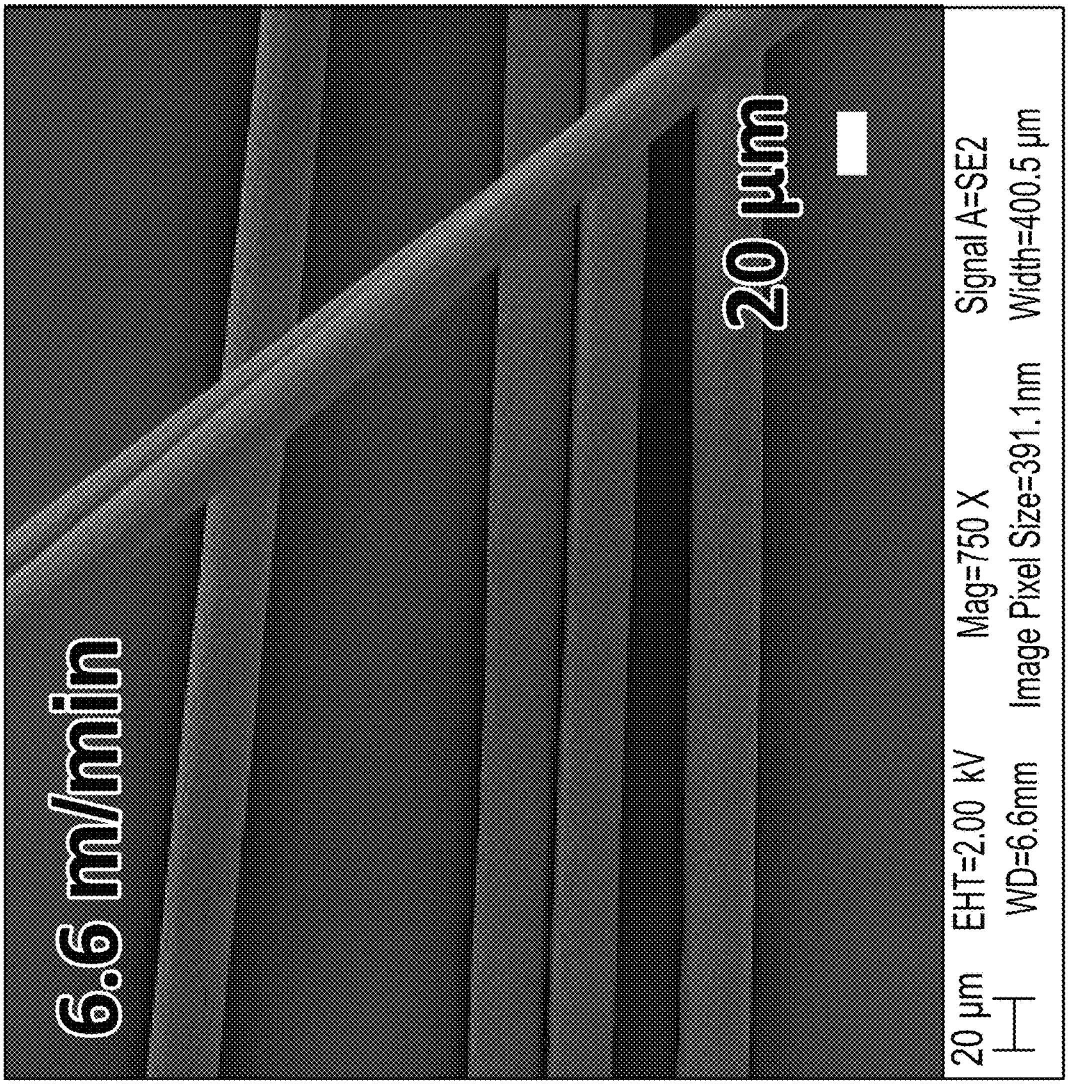
Figure 11G:
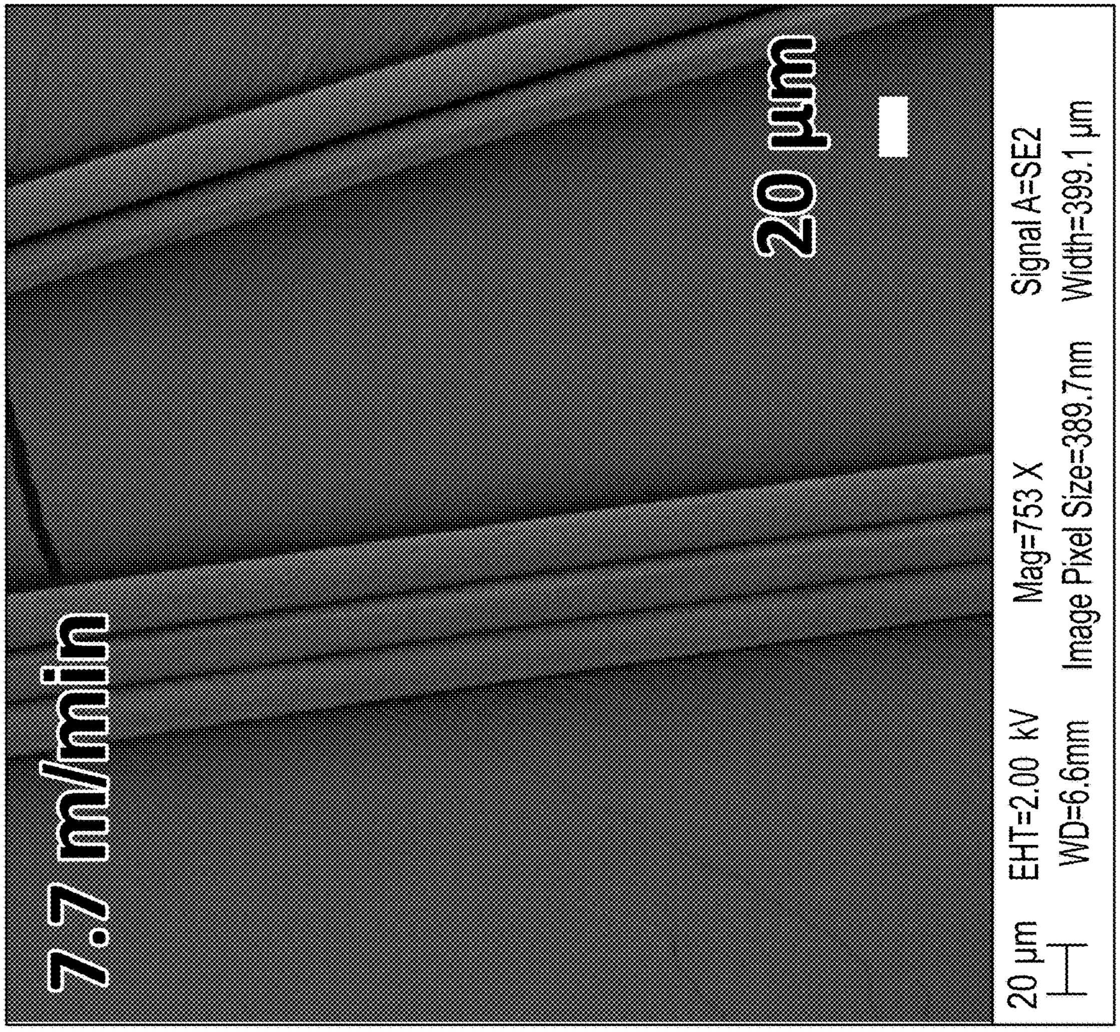
Figure 11H:
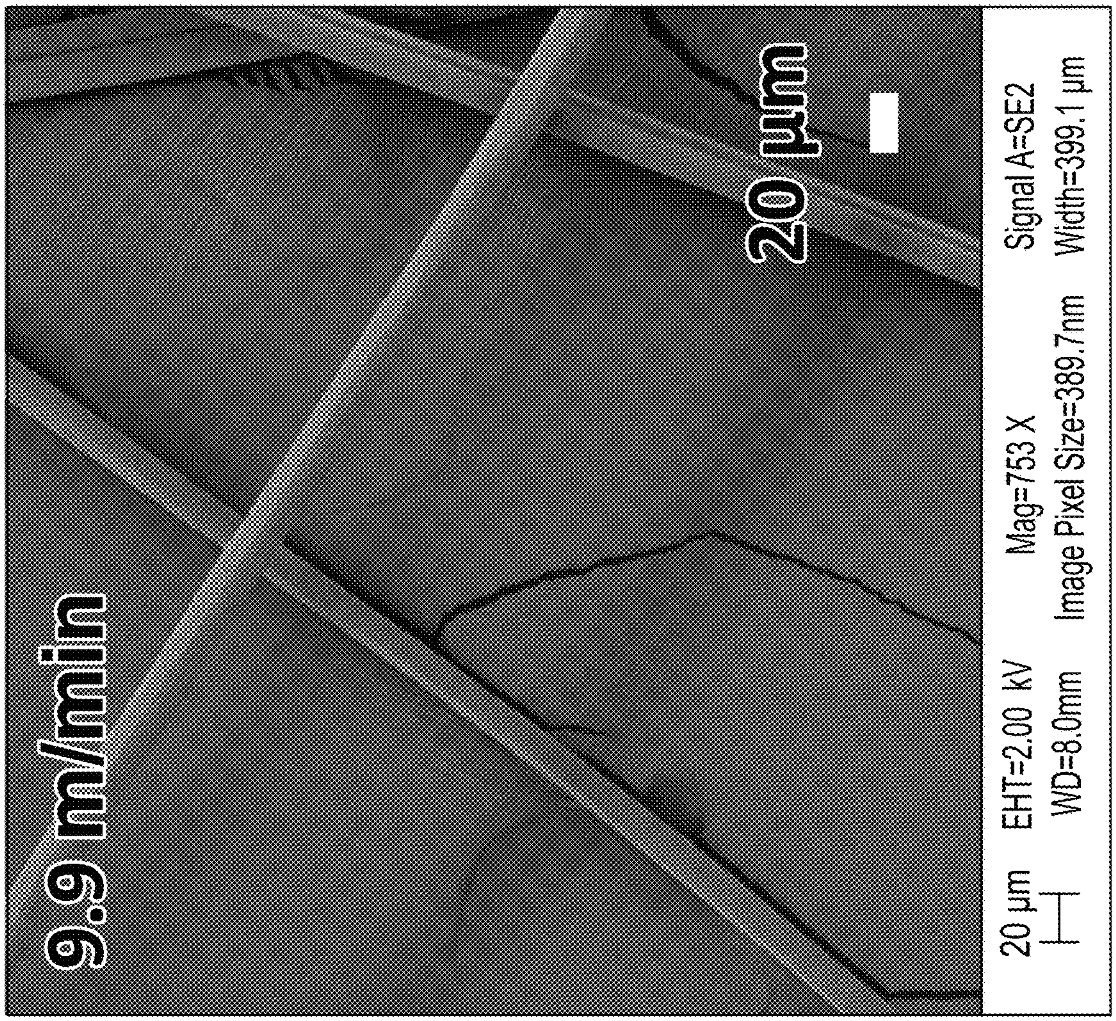

In addition to optical microscopy and polarized Raman spectroscopy, wide angle X-ray scattering (WAXS) analysis was carried out to demonstrate the preferential mono-directional orientation of the α-helices within the fiber and, most importantly, their preserved arrangement in coiled-coil motifs. The measurement was carried out on a bundle of fibers oriented perpendicular to the X-ray beam and with the main fiber axis parallel to the meridian axis of the detector. The obtained diffraction pattern shows reflections corresponding to periodicities of 4.7 Å and 9.8 Å (FIG. 9C). Both signals showed typical structural features of the keratin coiled-coils, more specifically, arising from the average extension of the helical pitch (4.7 Å) and the spacing between the axis of adjacent α-helices (9.8 Å), respectively. This was also confirmed by comparing the 2D WAXS scattering pattern of the spun fiber with the one obtained from the wool used as keratin source. More importantly, the 2D scattering pattern reported in FIG. 9D shows the signal at 9.8 Å to be anisotropic and equatorial, thus suggesting the alignment of the coiled-coils to be oriented predominantly along the fiber axis. The presence of the coiled-coil structural motif and its anisotropic orientation along the fiber axis are essential to ensure the right reciprocal vicinity of the two α-helix, allowing for their continuous transformation into a β-sheet. However, reflection at 4.7 Å doesn't show the typical narrow and weak anisotropic feature found in the native wool hair, a fact which is probably due to a less ordered organization of the coiled-coils in the regenerated fiber compared to the native architecture (FIG. 10).

Example 4: Characterization of Fiber Diameters

Samples of spun fibers were prepared as described in Example 3 and imaged using a Zeiss Ultra Plus Field Emission Scanning Electron Microscope with an electric high tension (EHT) of 2 kV and a SE2 detector.

FIGS. 11A-11H are SEM micrographs showing the drawing-speed dependence of fiber diameter size. The diameters of fibers decrease from ≅50 μm to ≅15 μm in response to the increasing drawing-speed from 1.1 m/min to 9.9 m/min.

Figure 12A:
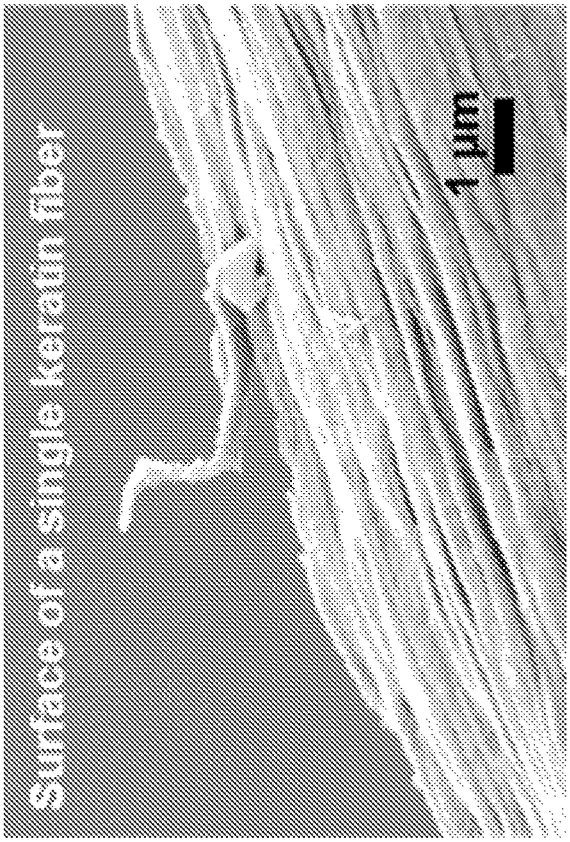
FIG. 12A is a scanning electron micrograph (SEM) image of a surface of a single keratin polymeric fiber prepared using the alpha-keratin solution including alpha-keratin protofibrils and intermediate filaments in liquid crystal phase (alpha-keratin dope) extracted from wool as described in Example 1 that was drawn using the wet-spinning system depicted in FIGS. 7A and 7B. The image shows the fibrillar structure of the fiber with a parallel orientation of the fibrils to the main axis of the fiber, similar to native animal hair.
Figure 12B:
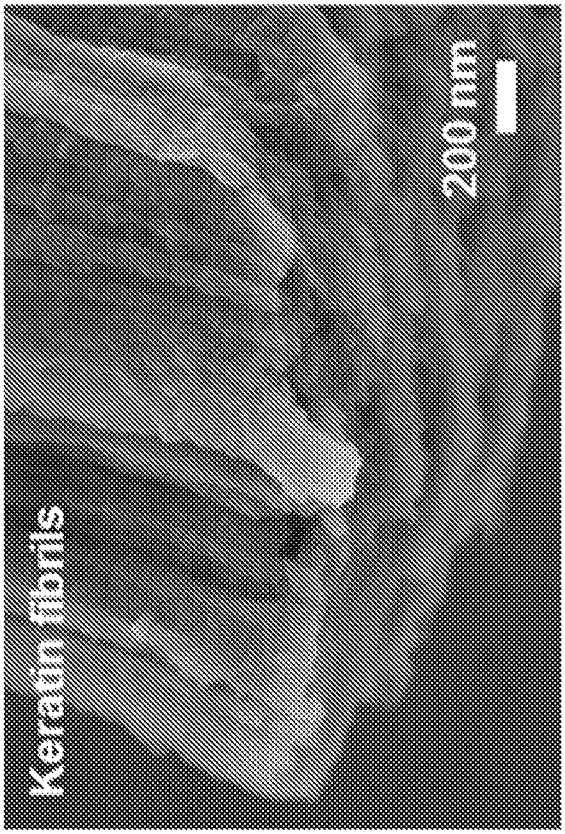
FIG. 12B is a scanning electron microscopy (SEM) of an end of a single keratin polymeric fiber prepared using the alpha-keratin solution including alpha-keratin protofibrils and intermediate filaments in liquid crystal phase (alpha-keratin dope) extracted from wool as described in Example 1 that was drawn using the wet-spinning system depicted in FIGS. 7A and 7B. The image also shows the fibrillar structure of the fiber with a parallel orientation of the fibrils to the main axis of the fiber, similar to native animal hair.

FIGS. 12A and 12B are SEM images of the fiber surface and fiber cross-section, respectively, of exemplary keratin polymeric fibers prepared as described in Example 3 and show a fibrillary structure with a parallel orientation to the main fiber axis (FIGS. 12A-12B). This provides evidence of the hierarchical organization of the KIF within the fiber, similar to the native animal hair. The anisotropic orientation of KIF in the keratin polymeric fibers so produced is a crucial feature of the keratin polymeric fibers if they are to recapitulate the shape-memory property found in natural animal hair.

Example 5: Mechanical Characterization of Keratin Fibers

The effect of changes in drawing speed on the alignment of KIF within the fiber was evaluated by stress-strain mechanical tests. Higher values of Young's modulus were expected for thinner fibers obtained at higher drawing speeds. Changes in the stress-strain profile were also expected with an α-helix to β-sheets phase transition happening at lower strain for fibers obtained at higher drawing speed.

Samples were prepared according to ASTM D3822, by using acrylic tensile test frames with 25 mm gauge and attaching the single fiber with epoxy resin. Single fibers were tested using Instron 5566 tensile tester equipped with a 2525 Series Drop-through 10 N load cell and pneumatic grips.

Figure 13:
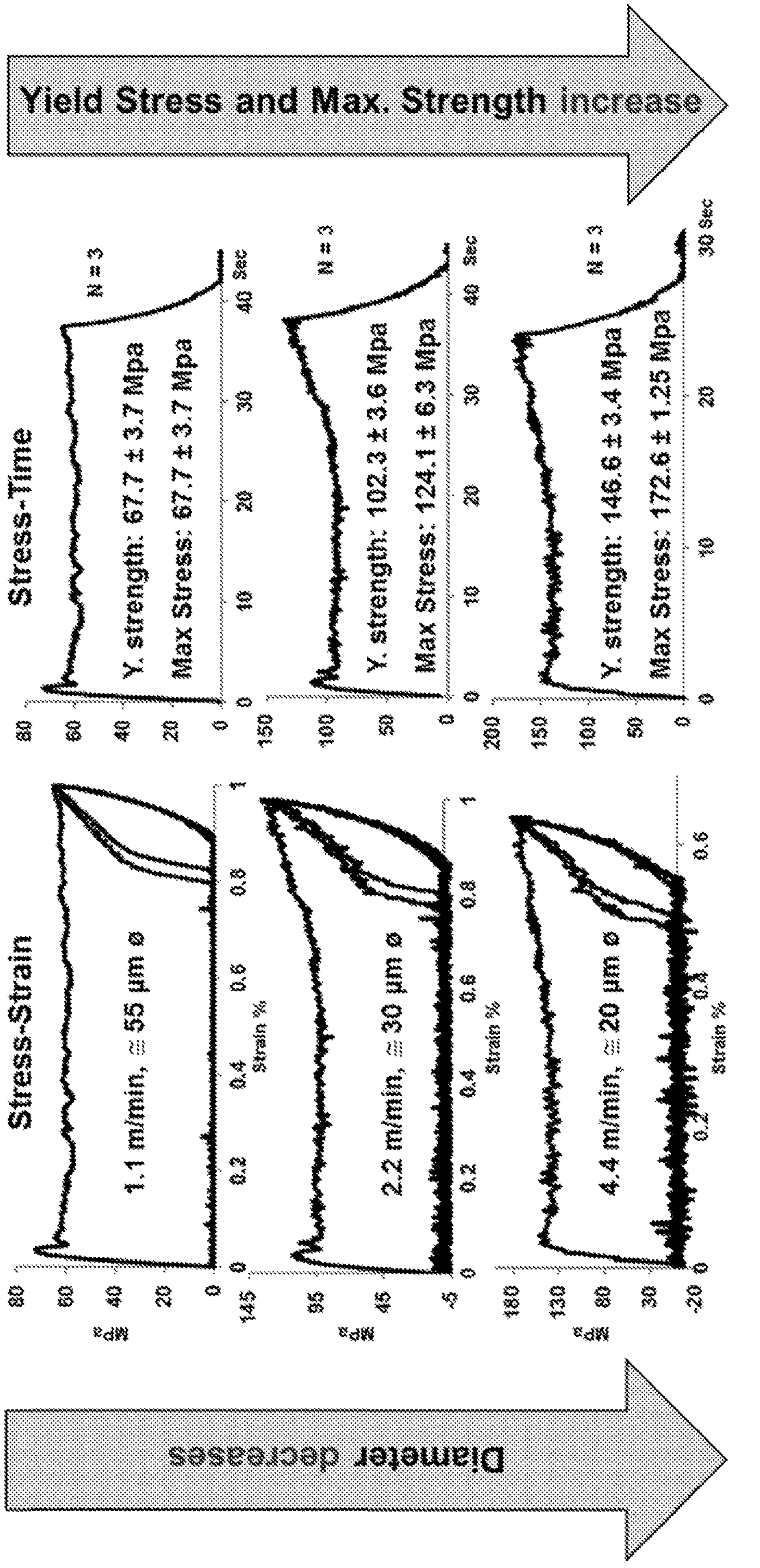
FIG. 13 includes graphs of stress versus strain and stress versus time for fibers drawn at different speeds illustrating the effect of drawing speed on the tensile modulus and, thus, the alignment of keratin intermediate filaments in keratin polymeric fibers drawn from the alpha-keratin solution including alpha-keratin protofibrils and intermediate filaments in liquid crystal phase (alpha-keratin dope) extracted from wool as described in Example 1 using the wet-spinning system depicted in FIGS. 7A and 7B.

As shown in FIG. 13, unexpectedly, a dramatic increase of Young's modulus from 67.7±3.7 Mpa to 172.6±1.25 Mpa is observed upon decrease of diameter size from 55 to ≅20 μm. Furthermore, after an initial plateau due to the unfolding of the α-helix coils present in the keratin polymeric fibers, stress increases due to the formation of β-sheets domains, and this occurs at lower strain in the case of keratin polymeric fibers having a diameter of about 20 μm obtained at 4.4 m/min on drawing speed.

Figure 14A:
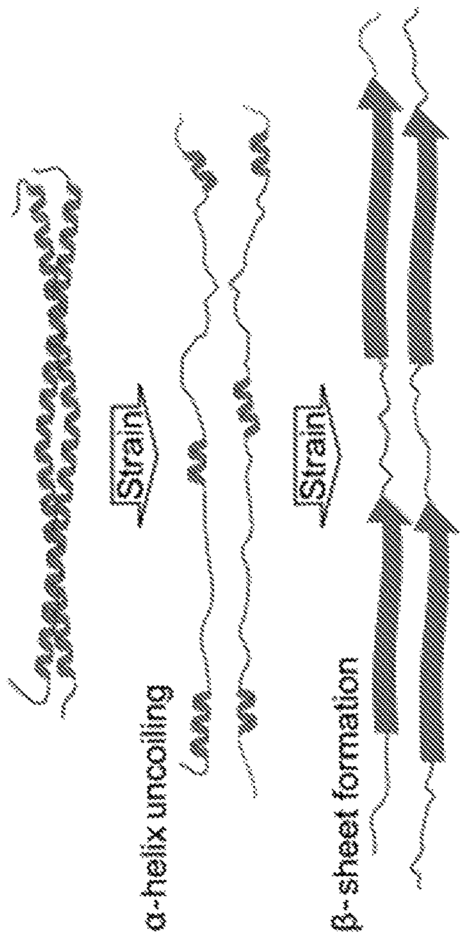
FIG. 14A schematically depicts keratin protein secondary structure rearrangement during the $\alpha$-helix-to-$\beta$-sheet transition under strain.
Figure 14B:
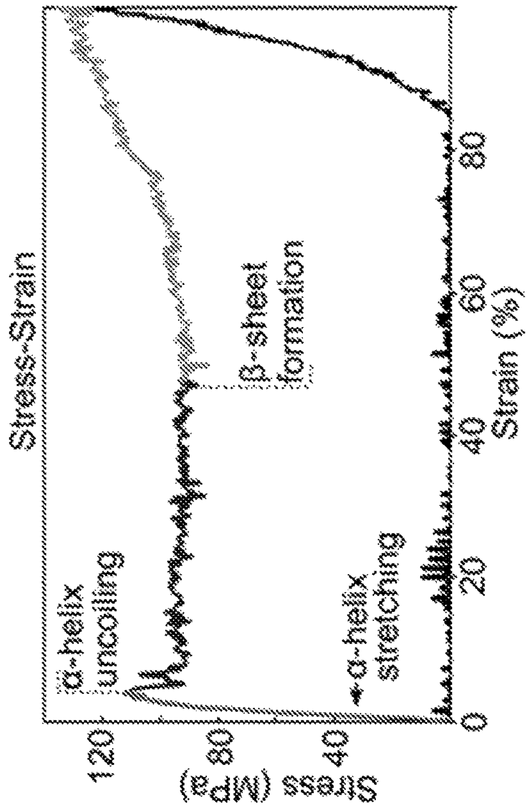
FIG. 14B is a graph of stress versus strain for a single keratin fiber showing the three typical regions describing the $\alpha$-helix-to-$\beta$-sheet transition as function of strain.
Figure 14C:
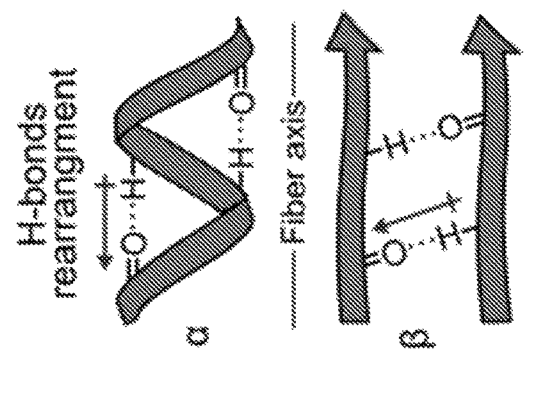
FIG. 14C schematically depicts the hydrogen bond network responsible for the formation of the keratin secondary structures and the change of the bond orientations within the fiber as keratin rearranges from the $\alpha$ to $\beta$ structure.

The mechanical properties of the fibers were then investigated to assess the occurrence of the α-helix-to-β-sheet transition when subjected to uniaxial stretch. Upon stretching, the α-helices first undergo an unraveling process leading to the formation of random coils (FIG. 14A). As the peptide chains align along the stretching vector, the new peptide arrangement allows for the β-sheet formation. In the case of animal hairs, this stress-induced conformational transformation of the protein secondary structure gives typical stress-strain profile, which was also observed in the fabricated fibers (FIG. 14B). Indeed, the mechanical test carried out on single keratin fibers shows an initial elastic region up to ~5% strain (Gray region on the left). As the strain increases, the helical structure undergoes the unfolding process leading to the yielding region (middle region), characterized by a constant yield stress of 96.1±3.1. In this region, the helices uncoil, and the peptide chains start aligning parallel to each other along the fiber axis. As the strain further increases, the uncoiled keratin peptide chains can form hydrogen bonds with the adjacent ones, thus stabilizing their stretched geometry through the formation of β-sheets (FIG. 14C). This β-sheet forming region (region to the right in FIG. 14B) is characterized by a strain hardening about 50% of strain, as the applied load is not only dissipated by the disruption of the coiled coils, but also carried by the stretching of the β-sheets (Cyan region). Because the load was removed at 100% of strain, the fiber shows a plastic strain of 85%. This behavior demonstrates the entrapment of the keratin unfolded chains into the new β-sheet metastable state.

Figure 14D:
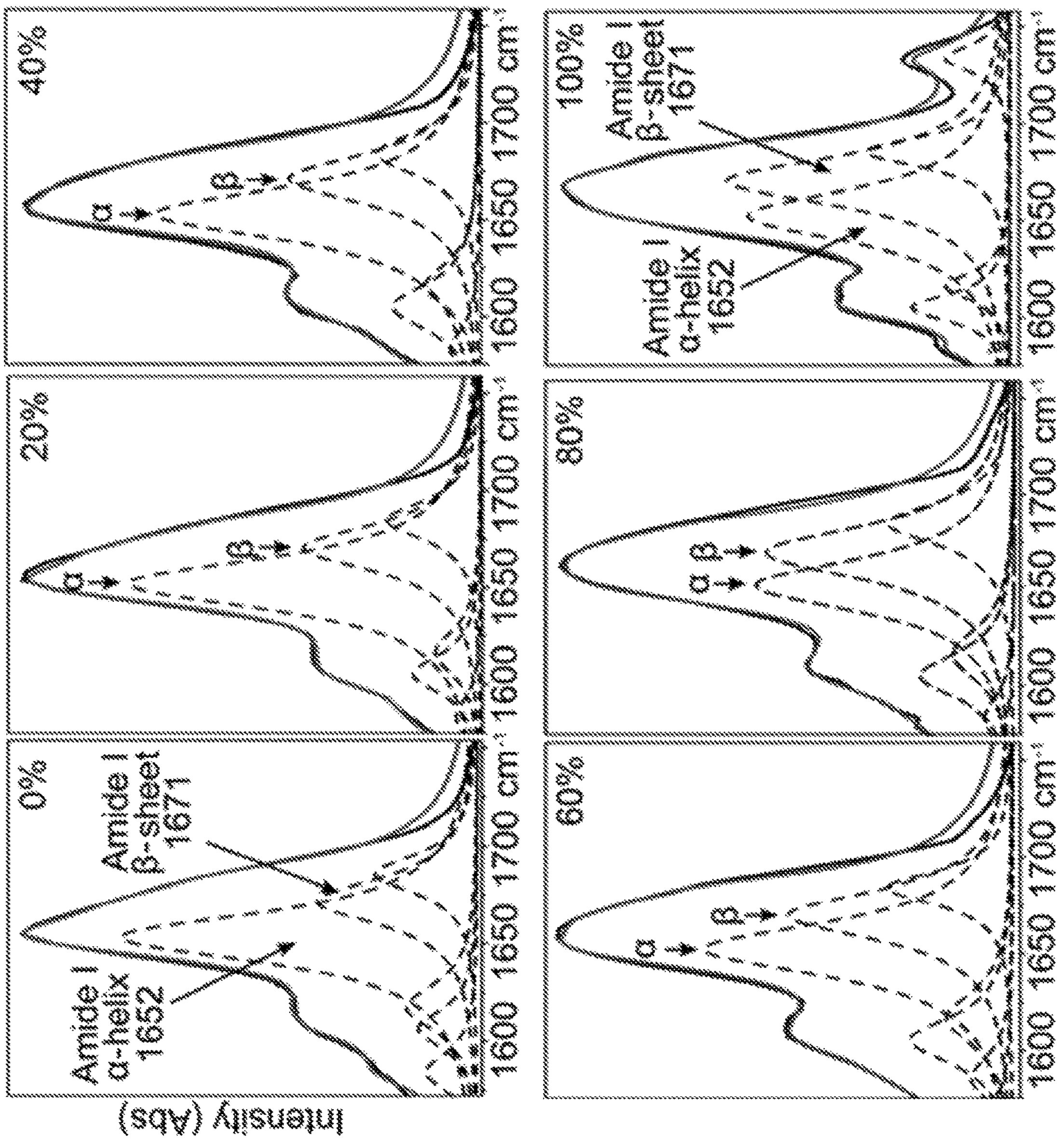
FIG. 14D includes graphs of Raman spectroscopy of a single keratin fiber under different amounts of strain showing the transition from $\alpha$-helix-to-$\beta$-sheet with increasing strain, with bands at 1652 and 1671 $cm^{-1}$ corresponding to the $\alpha$-helix and $\beta$-sheet structures, respectively. The mostly overlapping black solid line and gray solid line represent the experimental and the sum of the calculated peaks, respectively, while the dashed lines belong to the single calculated peaks.

The rearrangement of the peptide chain induced by the transition between the two protein secondary structures is known to cause a shift in the Raman spectrum of the amide I vibrational resonance from 1652 to 1671 cm-1, corresponding to the α-helix and β-sheet structures, respectively. This allowed for the following of the α-helix-to-β-sheet transition during fiber stretching. As shown in FIG. 14D, the amide I peak maximum shifted towards higher frequencies upon increase of strain. Deconvolution of the peak supports the increase of the β-sheet band over decrease of the α-helix one. Integration of the two peak areas suggests that at 100% of strain, roughly half of the coiled coils are stretched and stabilized into β-sheets under load. The incomplete conversion of the α-helix to β-sheet demonstrates the presence of the hysteresis loop in the stress-strain profile, indicating a phase transition between the two protein conformations.

Figure 15A:
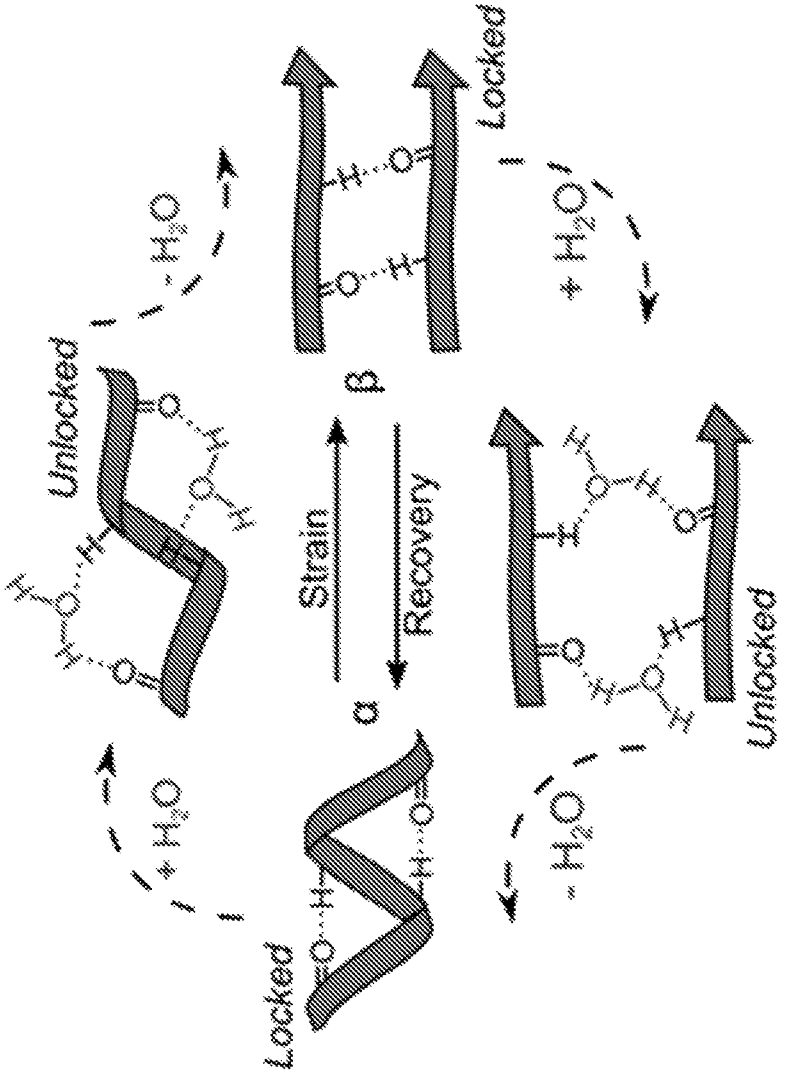
FIG. 15A schematically depicts the water-triggered shape memory mechanism based on the disruption of the hydrogen bonds network allowing for reversible interconversion between $\alpha$-helix and the $\beta$-sheet structures.

The kinetic stability of the deformed shape of the fiber trapped in β-sheet phase is due to the high activation energy necessary to break the interchain hydrogen bonds hampering the equilibration towards the more thermodynamically stable original shape (α-helix). To this point, the ability of the keratin fiber to potentially regain its original shape and render the SM effect arises from the reversible transition between α-helix and β-sheet feasible under thermodynamic equilibrium. Water can weaken the hydrogen bonds and facilitate the protein structural rearrangement. Therefore, the fibers exhibit a shape memory cycle where the hydrogen bonding network functions as locking mechanism ensuring the fixity of the deformed shape, while water can act as stimulus to facilitate the fiber deformation and allow for the recovery of its original shape (FIG. 15A).

Figure 15B:
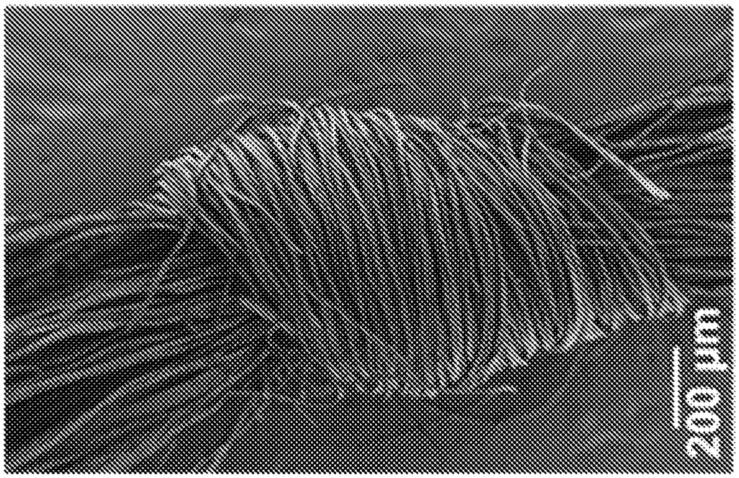
FIG. 15B is an SEM image showing a keratin fiber yarn with a knot in the yarn.
Figure 15C:
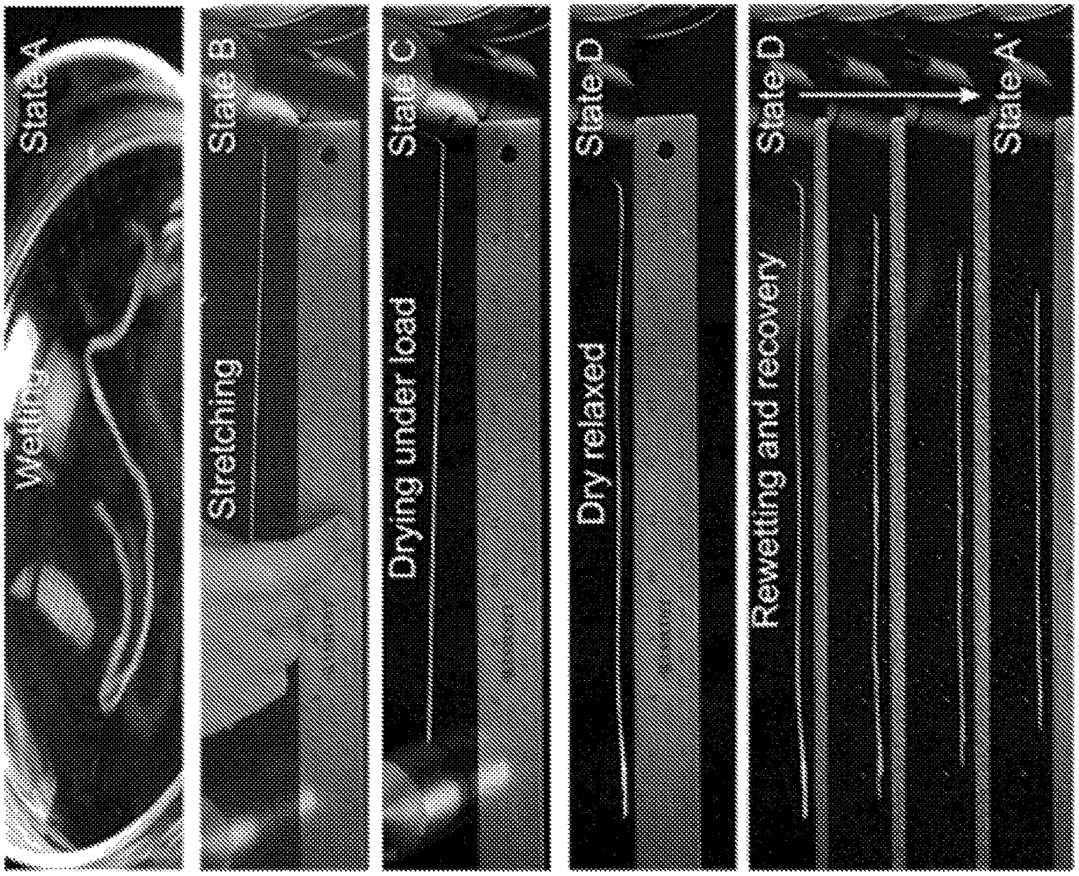
FIG. 15C includes images of the water-triggered shape memory behavior of the keratin fiber yarn. For clarity purposes, each state of the yarn during the process is labeled as follows: wet and relaxed (state A), wet under load (state B), dry under load (state C), dry and relaxed after stretch (state D), and wet and relaxed after recovery (state A').
Figure 15D:
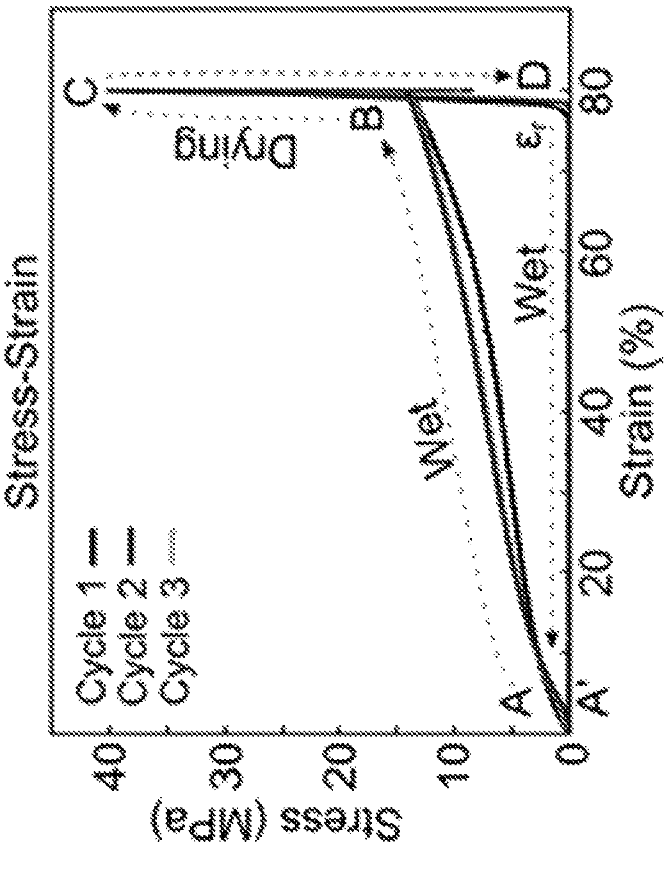
FIG. 15D is a stress-strain plot of a keratin fiber yarn undergoing multiple water-triggered shape transitions with transition state labels as described above with respect to FIG. 15C.
Figure 15E:
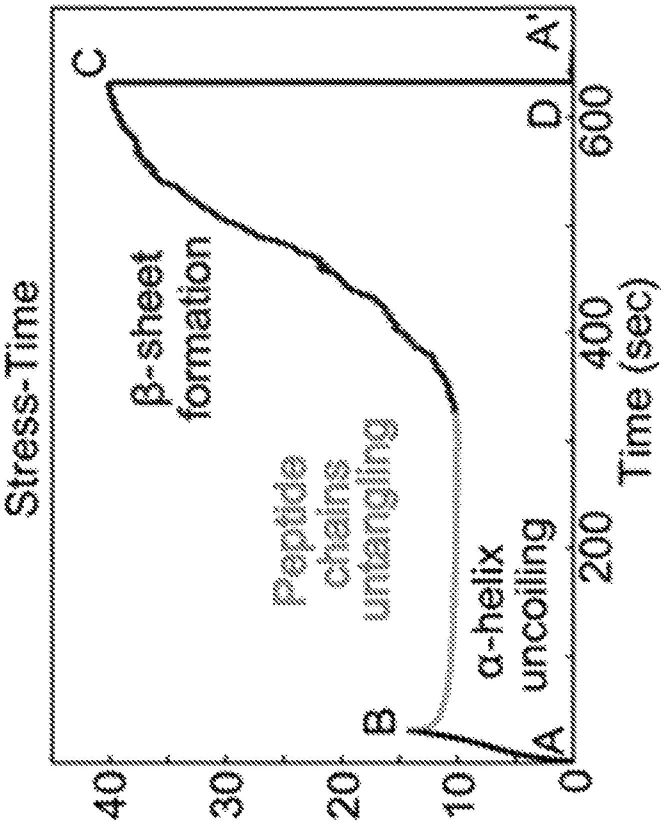
FIG. 15E is a representative stress-time plot of the full cycle with transition state labels as described above with respect to FIG. 15C.

This concept was tested on a bundle of keratin fibers of same diameter size (~30 micron) kept together by two knots formed at the edges (FIG. 15B). The fiber bundle was wetted in deionized water for few seconds (state A), manually stretched in the air while still in wet state (state B) and kept under load at room temperature for 10 minutes for the fiber to dry (state C) (FIG. 15C). When weights were removed to allow the yarn to relax, no visible change in length between the stretched and relaxed form was observed by naked eyes (state D). The ability of the yarn to recover its original length was then proved by applying nebulized deionized water. Indeed, shrinking of the fibers led to reshaping of the yarn to its original length only in few seconds (state A'). Quantification of the yarn ability to retain the deformed length (fixity yield) and regain the original dimensions were possible by carrying out the same procedure on an electromechanical test machine that monitors the stress strain level. This also provided mechanistic insights in the role of water in affecting the keratin secondary structure rearrangement and ultimately the mechanical stability of the fibers. As shown in the stress strain plot (FIG. 15D), the presence of water causes a decrease in tensile stress during the stretching step from state A to state B. Compared to the dry fiber (FIG. 14B), the stress-strain profile also changes, by showing a more gradual transition among the elastic, yielding and post-yielding regions. These two findings demonstrate effects of water in partially breaking the intermolecular hydrogen bonds while stretching and thus facilitating the keratin chains rearrangement when load is applied. After stretching, the fiber was allowed to dry under load through a holding step to reach state C. This phase was characterized by an overall increase of stress, which can be visualized on the stress-strain plot as a sharp spike. By following the increase of stress over time, it has been shown that, from the wet to the dry state, the fiber undergoes a first viscoelastic relaxation (FIG. 15E), which is followed by a sudden stiffening of the fibers (FIG. 15E). While the first relaxation lapse was attributed to a delayed uncoiling of the α-helices under load, the sudden stiffening matches with the crystallization process leading to β-sheets formation as the water evaporates enabling the hydrogen bonds to reform. As the load was finally released, the yarn retained ~94% of its deformation, defined as fixity yield (Rf), which was calculated as the ratio between the total strain applied (εtot=80%) and the residual strain (εr~77%). Water was then again applied to trigger recovery of the original length, thus bringing the yarn to a new initial state A'. As additional stress-strain cycles were repeated, no residual plastic deformation was noticed as states A and A' lay on the same starting coordinates of the plot, demonstrating the recovery efficiency of the shape memory yarn of about 100%. Moreover, the first, second cycle and third cycles share very similar features in terms of fixity yield, demonstrating the preservation of the mechanical properties of the material.

Example 6: α-helix to β-sheet Transition of Keratin Fibers Under Load and in Wet Condition The α-helix to β-sheet transition under load can be enhanced in wet conditions, as was detected using Raman spectroscopy, by monitoring the amide II peak shifting from 1652 to 1671 $cm^{-1}$.

Shape-memory keratin polymeric fibers including alpha-keratin intermediate filaments prepared as described above were mounted on a custom made stretcher, which was placed in a petri dish filled with water (23° C.) fitting the room between the microscope holder and microscope lenses. Raman spectra were recorded with a XploRA Hyperspectral Darkfield Raman Microscope using a 785 nm excitation laser.

Figure 16A:
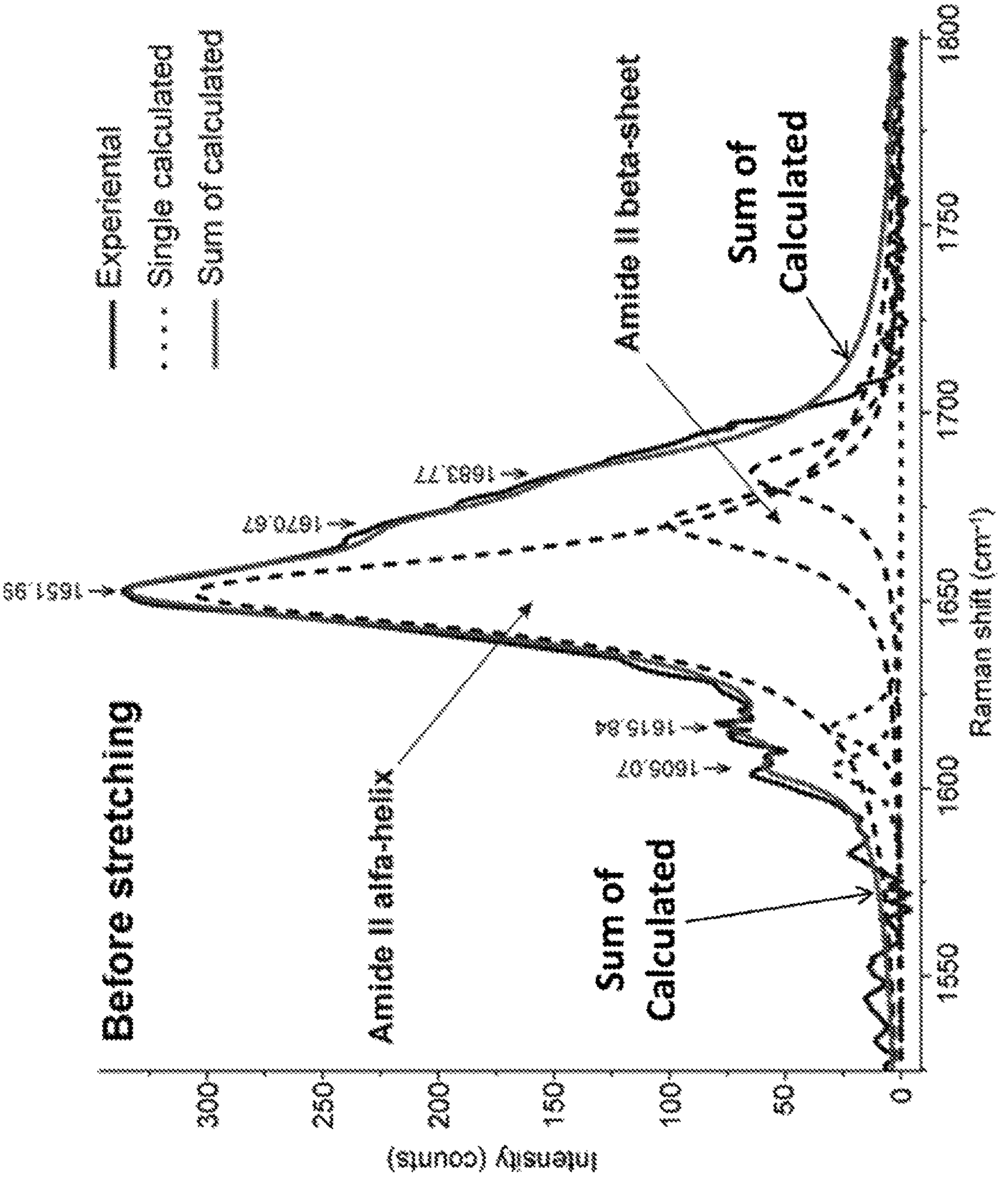
FIG. 16A is a Raman analysis graph of a keratin polymeric fiber prepared using the alpha-keratin solution including alpha-keratin protofibrils and intermediate filaments in liquid crystal phase (alpha-keratin dope) extracted from wool as described in Example 1 before stretching.
Figure 16B:
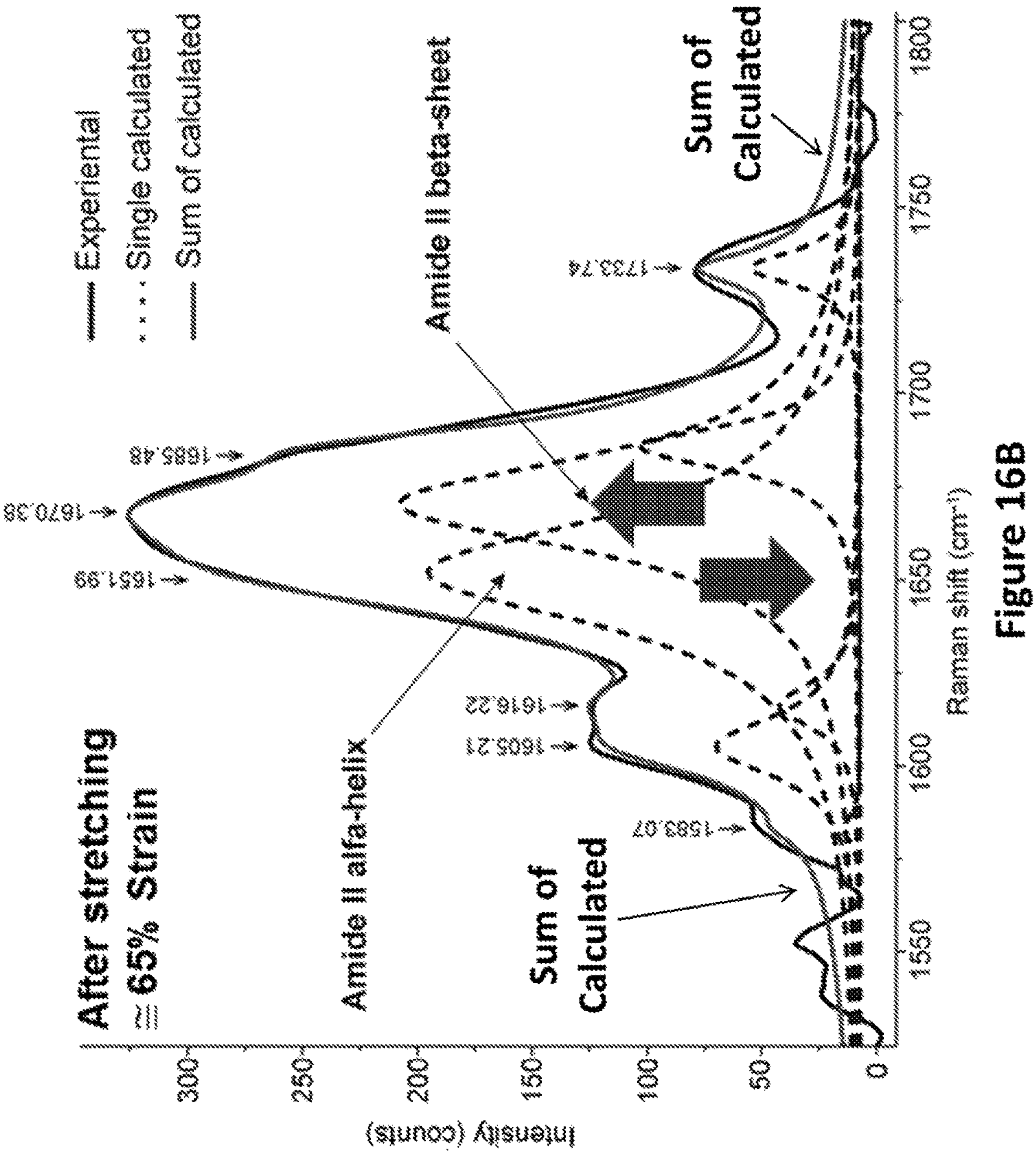
FIG. 16B is a Raman analysis graph of a keratin polymeric fiber prepared using the alpha-keratin solution including alpha-keratin protofibrils and intermediate filaments in liquid crystal phase (alpha-keratin dope) extracted from wool as described in Example 1 that was drawn using the wet-spinning system depicted in FIG. 7B after stretching. Comparing the graph in FIG. 8A with the graph depicted in FIG. 8B demonstrates the $\alpha$-helix to $\beta$-sheet transition of the fiber under applied load.

FIG. 16A is a Raman spectrum obtained from the keratin polymeric fibers before stretching and FIG. 16B is a Raman spectrum obtained from the keratin polymeric fibers after stretching. The black solid lines in the graphs represent the experimental Raman spectrum where the max absorption at 1651.99 shifts to 1670.38 $cm^{-1}$, indicating an α-helix to β-sheet transition under load. The deconvoluted spectra (sum of calculated and shown as dark gray solid lines) match the experimental ones and the dotted lines as indicated show a ≅45% of conversion of the α-helix into β-sheet at approximately 65% of strain (FIGS. 16A and 16B).

Example 7: Water-Triggered Shape-Memory Effect of a Keratin Fiber Bundle

Under load, a water-responsive shape-memory fiber will undergo plastic deformation when in contact with water and retain its deformation in the dry state when the load is removed. When re-exposed to water, the fiber regains its initial form.

Shape-memory keratin polymeric fibers including alpha-keratin intermediate filaments used for the tensile tests were prepared as described in the previous Examples, and a fiber bundle instead of a single fiber is tested. The experiment was performed using an Instron 5566 tensile tester with the previously described setup.

Figure 17A:
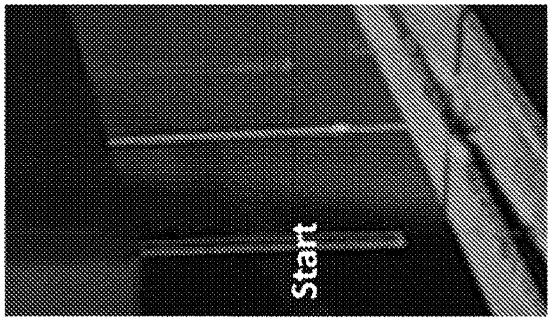
FIG. 17A is a photographic image of a keratin polymeric fiber prepared using the alpha-keratin solution including alpha-keratin protofibrils and intermediate filaments in liquid crystal phase (e.g., the alpha-keratin dope) extracted from wool as described in Example 1 that was drawn using the wet-spinning system depicted in FIGS. 7A and 7B prior to exposure to water to trigger the shape-memory deformation.
Figure 17E:
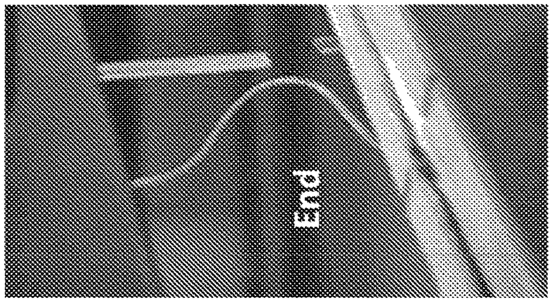
FIG. 17E is a photographic image of the keratin polymeric fiber of FIG. 17A after water triggered deformation.
Figure 17B:
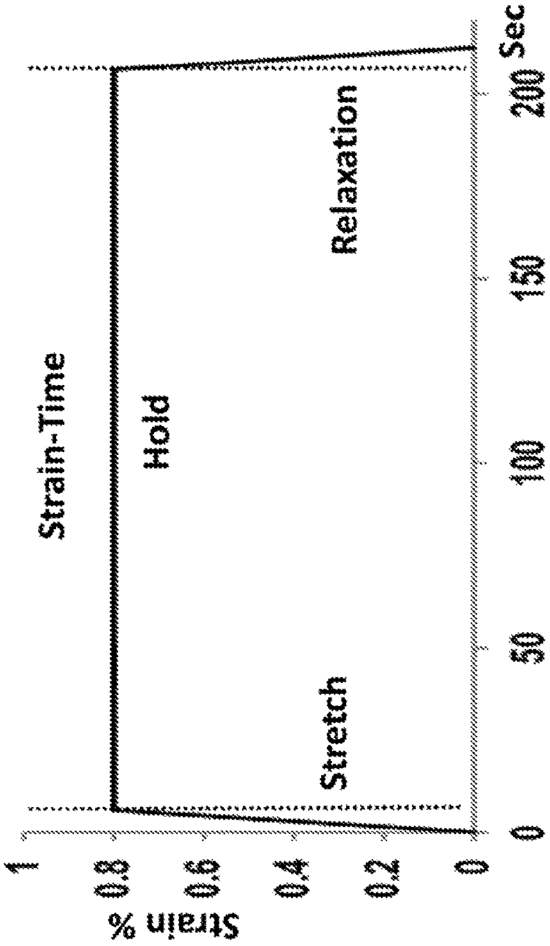
FIG. 17B is a graph depicting the strain-time plot of the strain-stress test, used to assess the water triggered shape-memory of the keratin polymeric fiber including alpha-keratin protofibrils and intermediate filaments depicted in FIG. 17A.

The experimental design is depicted in FIGS. 17A and 17E. The fiber bundle was first wetted with a water nebulizer and immediately subjected to a stretching process up to 80% of strain within 8 seconds. The fiber bundle is then held under load for 200 seconds and finally allowed to relax (FIG. 17B).

Figure 17C:
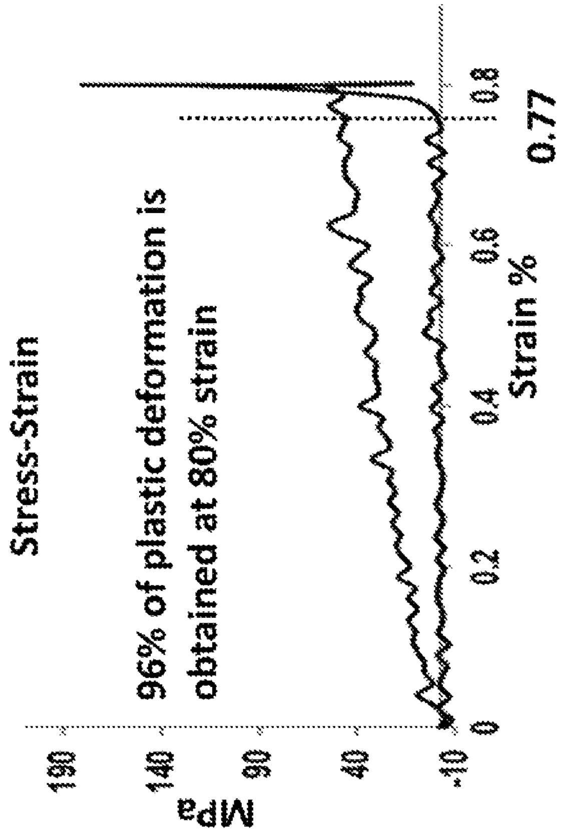
FIG. 17C is a graph from a stress-strain test used to assess the water triggered shape-memory of the keratin polymeric fiber of FIG. 17A.
Figure 17D:
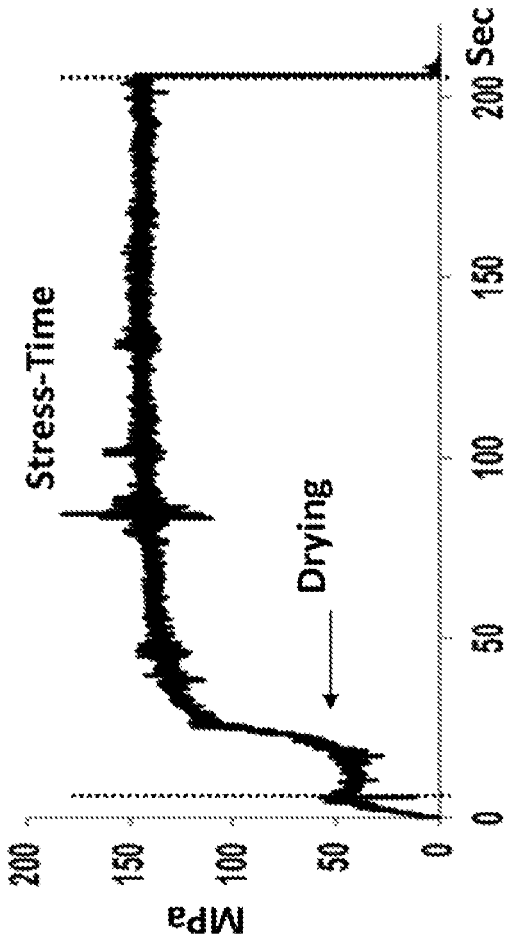
FIG. 17D is a graph depicting the stress-time plot of the strain-stress test used to assess the water triggered shape-memory of the keratin polymeric fiber of FIG. 17A.
Figure 18E:
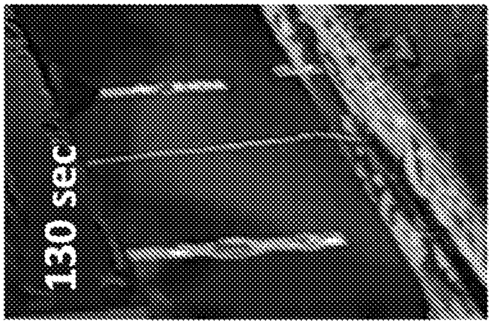
FIGS. 18A-18E are photographic images depicting the recovery of the water triggered deformed keratin polymeric fiber including alpha-keratin protofibrils and intermediate filaments depicted in FIG. 17E over time. Specifically.
Figure 18D:
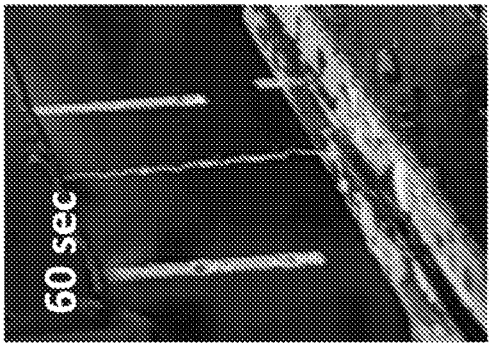
Figure 18C:
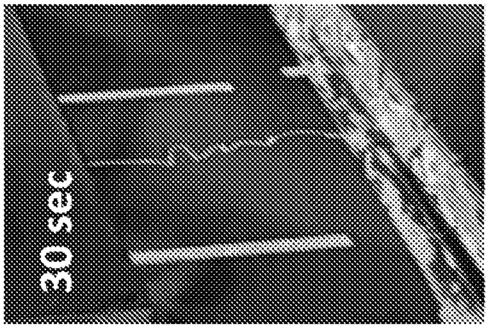
Figure 18B:
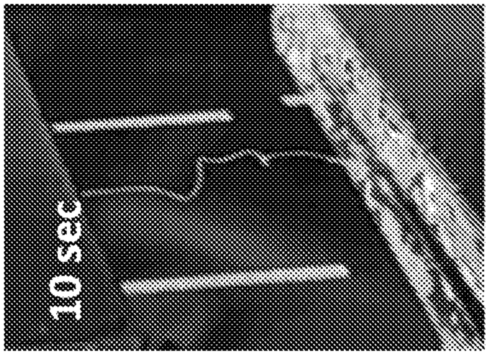
Figure 18A:
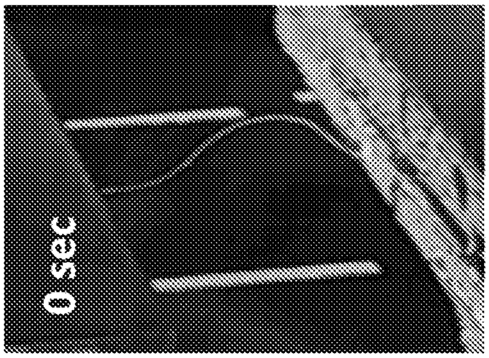
Figure 19A:
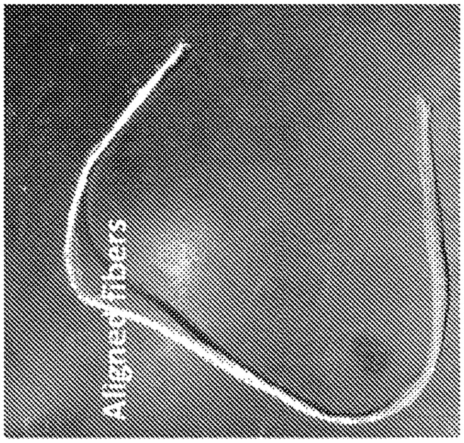
FIG. 19A is a photographic image of a yarn of the keratin polymeric fibers prepared using the alpha-keratin solution including alpha-keratin protofibrils and intermediate filaments in liquid crystal phase (alpha-keratin dope) extracted from wool as described in Example 1 that were drawn using the wet-spinning system depicted in FIGS. 7A and 7B prior to deformation using a load.
Figure 19B:
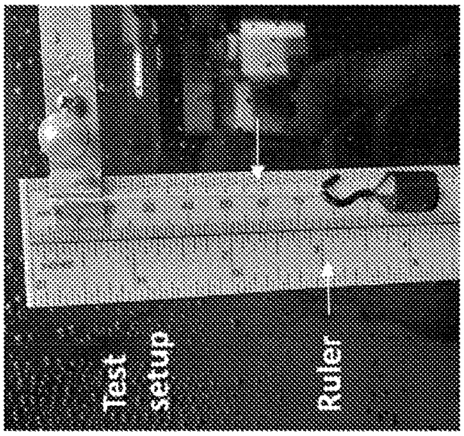
FIG. 19B is a photographic image of an experimental set-up for assessing the extensional deformation and recovery under load of the yarn depicted in FIG. 19A during a wet-dry-wet cycle.
Figure 19C:
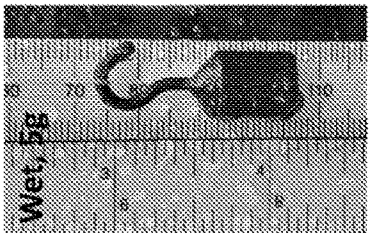
FIGS. 19C-19G are photographic images of the effect of the indicated strains and wet/dry conditions on the extensional deformation and recovery of the yarn depicted in FIG. 19B. Specifically.
Figure 19D:
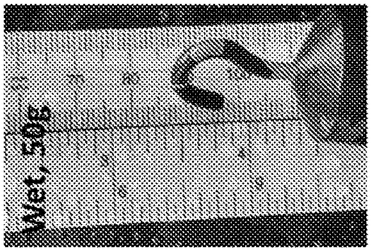
Figure 19E:
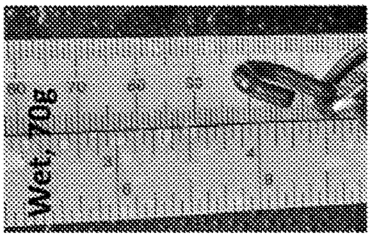
Figure 19F:
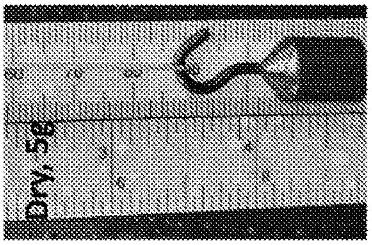
Figure 19G:
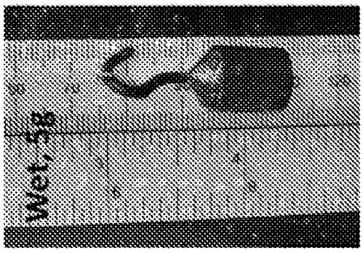

As shown in the stress-strain plot (FIG. 17C), the fiber bundle undergoes an elastic deformation during the whole stretching phase, until an increase of strength is observed during the hold period as the fiber dries. After the relaxation step, the fiber retains 96% of its deformation. When the fiber bundle is re-exposed to water, 90% of its original length is regained in 130 seconds (FIG. 17D).

Example 8: Shape-Memory Effect in Keratin Yarns

The shape-memory effect was scaled up to the yarn size. Shape-memory keratin polymeric fibers including alpha-keratin intermediate filaments prepared as described above (14 mm in length and 20 μm in width) were manually twisted into a yarn. Load was applied using iron weights and the extensional deformation and recovery were tested under load with a wet-dry-wet cycle. Water was applied with a nebulizer and heat with a heat-gun.

As depicted in FIGS. 18A-18E, a 14 cm-long yarn gained a max extension of 30% in wet conditions under a 70 g load and a stable deformation of 22% was achieved in dry conditions. 96% of deformation was recovered in wet conditions.

Example 9: Shape-Memory Properties of a Spring Shaped Keratin Polymeric Fiber

The shape-memory properties of a keratin polymeric fiber including alpha-keratin intermediate filaments, prepared as described above, to deformation of a spring-like shape into a linear one were also investigated.

A spring-shaped polymeric fiber including alpha-keratin intermediate filaments was produced using a 22 needle gauge and collecting the fiber in the second coagulation bath onto a 5 mm-thick rod whose speed was set to be equal to the first collector (1.1 m/min).

The spring-shaped fiber was then wetted which elongated the fiber demonstrating the elastic behavior of the fiber (FIG.

19A). When the wetted, elongated fiber was dried under constant load close to a heat source (i.e., a hot plate), it retained its elongated shape showing an increased stiffness. The fiber was then immersed in a petri dish filled with water with a temperature of ≅35° C. and it slowly regained its spring-like shape (FIGS. 19B-19G).

Figure 20A:
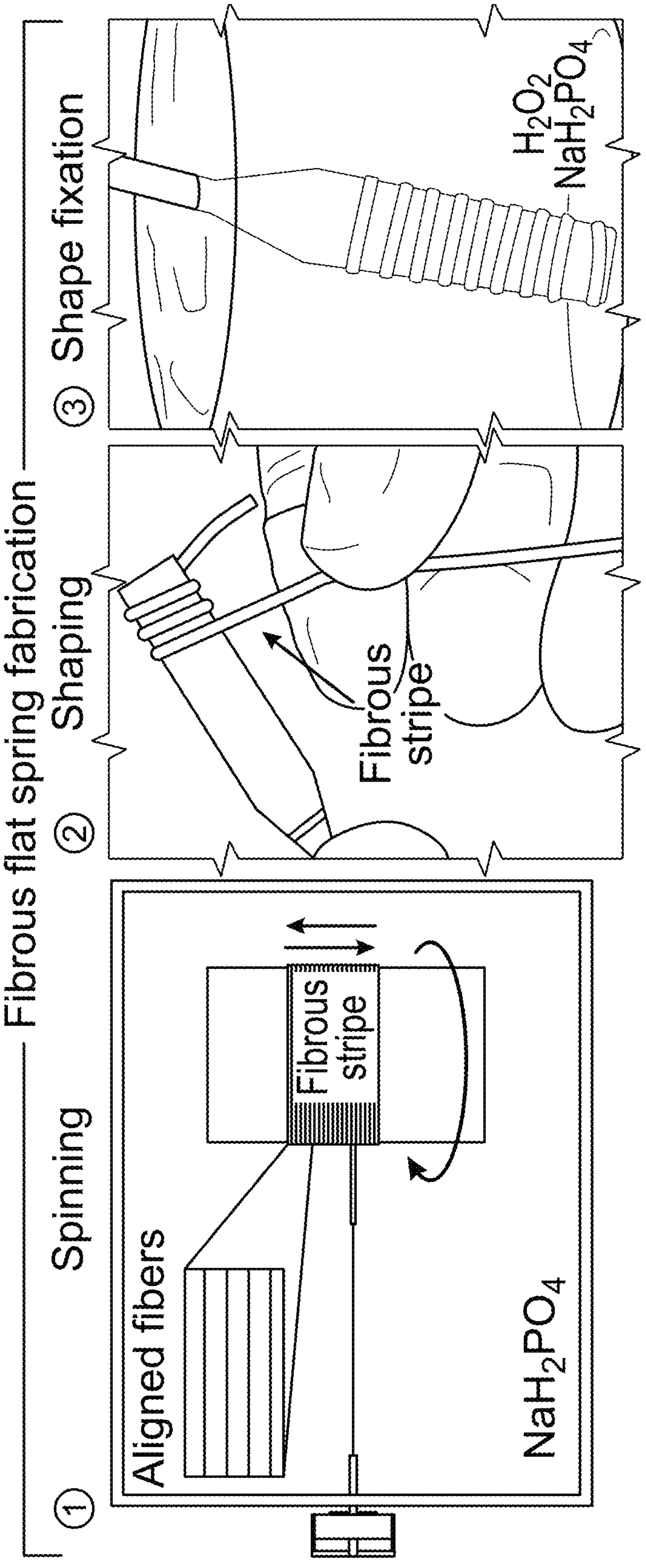
FIG. 20A schematically depicts steps of the production of a keratin flat spring in accordance with an example embodiment. The schematic of step 1 illustrates the spinning process used to fabricate the keratin strip composed of aligned fibers (left). The image of step 2 depicts the shaping of the strip into a flat spring via manual coiling around a metal spatula (center). The image of step 3 depicts shape fixation of the flat spring by immersion into a $H_2O_2$ (1% w/v) and $NaH_2PO_4$ (0.5 M) water solution for 1 h.
Figure 20B:
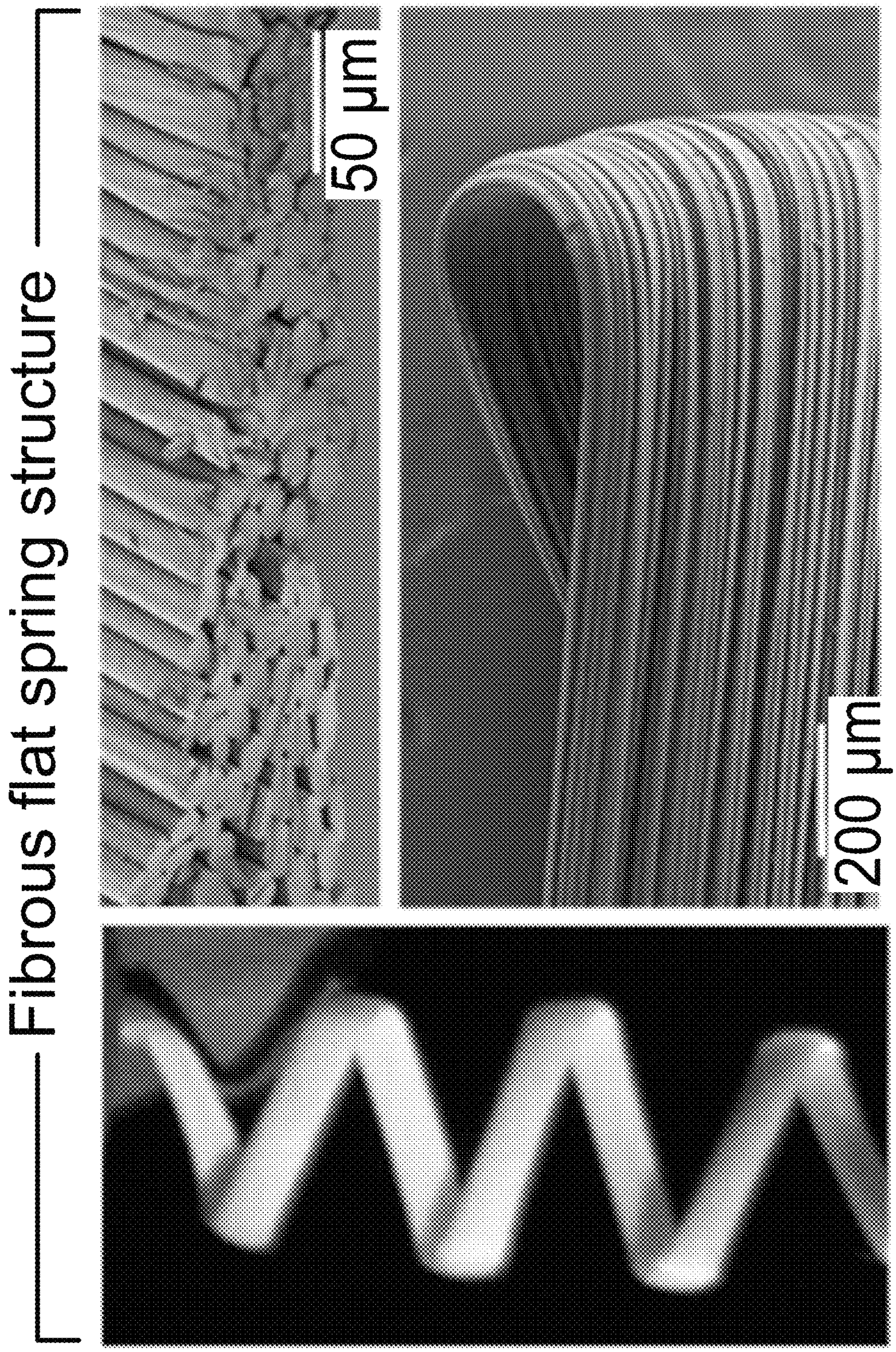
FIG. 20B includes a photographic image of the resulting keratin flat spring (left), and SEM micrographs of the resulting flat spring showing its fibrous and anisotropic structure (right).

The α-helix-to-β-sheet transition was further investigated in the context of shape memory effect beyond the 1 dimensionality of the fiber. A material capable of carrying out more complex transformations in the 3 dimensions and featuring the 1-way shape memory modality was created. This was achieved by structuring the material as a stack of unidirectionally aligned fibers produced via wet-spinning, thus allowing for the anisotropic ordering of the coiled-coils in the three dimensions of the bulk (FIG. 20A). As proof of concept, a flat spring was chosen as geometry and the ability of the object to recover its original shape after deformation tested. The spring of defined width and thickness was produced by first collecting a continuous fiber on a single spot of the wet-spinning mandrel. Before undergoing oxidative treatment, the material was plastic and it could be shaped into the desired coiled architecture. After oxidation, the strip lost its plasticity and it was locked in its flat spiral architecture by retaining its curvatures connected by straight segments (FIG. 20B, right). Stability of the stacked fiber architecture of the object was ensured by the presence of disulfide bonds, which function as cross-linker of the keratin network within the fiber, and also lock the fibers together through inter-fiber covalent interactions. The SEM micrographs reveals the fibrous nature of the strip which is composed of aligned keratin fibers of same diameter and fused together into their stacked assembly (FIG. 20B).

Figure 20C:
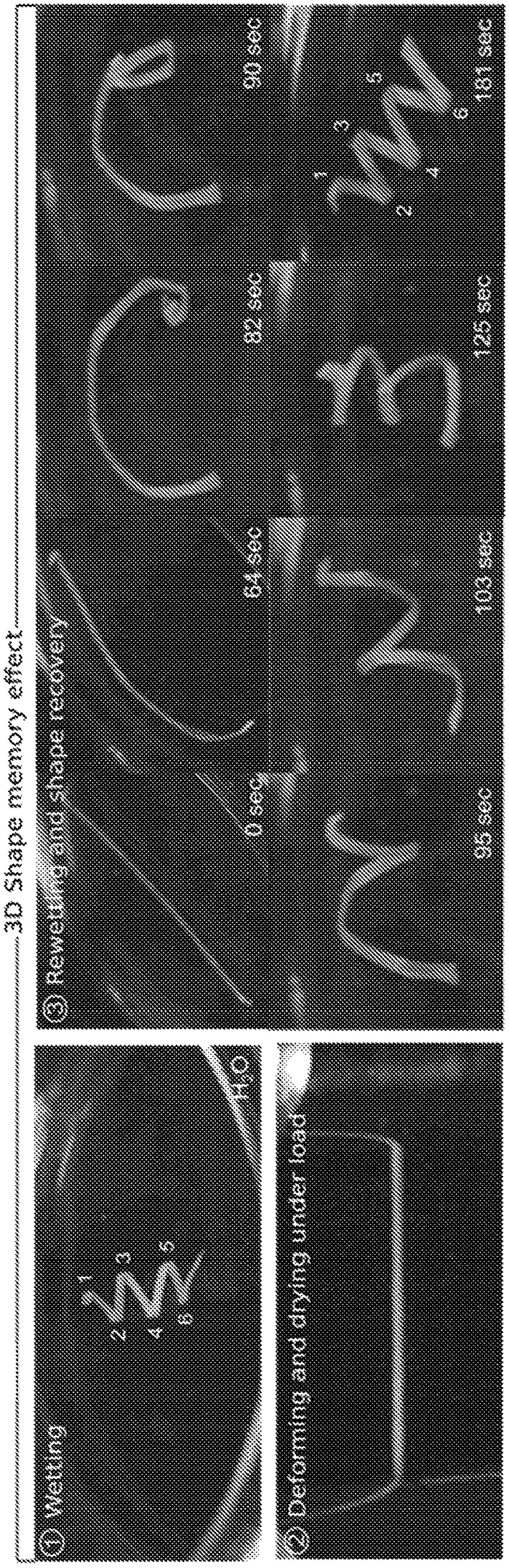
FIG. 20C includes photographic images illustrating each step of the water-triggered shape memory effect in the keratin flat spring: wetting (top left), deformation and drying under load (bottom left), and shape recovery (right). For clarity purposes, italics number are used to label each fold of the spring to better show the successful recovery of the original shape after deformation.

The 1-way shape memory property of the spring was tested by the same protocol used for the yarn. Each step of the geometrical transition is reported in FIG. 20C. After wetting, the spring is stretched and kept under load for ~10 minutes to dry. In its stretched conformation, the stripe was perfectly straight. Rewetting of the strip causes its back folding into the original shape in about 3 minutes (FIG. 20, right). By following the shape recovery over time, a first latent period of about 30 seconds was observed which correspond to the stripe hydration step. Afterwards, equilibration of the hydrogen bonds of the peptide chains in water allows for the stripe to remember its original shape. Indeed, refolding of the stripe was clearly observed over time until the original 6 folded architecture was restored. Restoration of the spring shape through a bending mode showed the ability of the bulk material to undergo shape recovery after compressive stress.

Example 10: 3D Printing of Keratin-Based Shape-Memory Objects

The spinnable keratin dope prepared in Example 1 was used as a 3D-printing material or ink to produce keratin-based, shape-memory structures and objects. The shear forces of the ink extruded from the printer needle induced alignment of the keratin protofibrills, thus the 3D-printing ink has the anisotropic characteristics that enable formation of shape-memory structures and objects.

Materials

The reagents used for the 3D printing are commercially available and were used without further purification unless otherwise indicated. Rhodamine B, hydrogen peroxide ($H_2O_2$) and sodium mono phosphate ($NaH_2PO_4$) were purchased from Sigma Aldrich, while Pluronic F127 Surfactant Prill was purchased from BASF. The Cellink (BIO X Model) 3D printer was used for the object fabrication.

Printing and Fixation

Figure 21A:
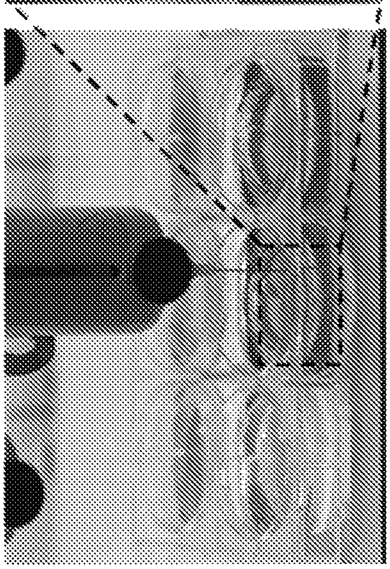
FIG. 21A is a photograph of 3D-printing of keratin fibers in accordance with an example embodiment.
Figure 21B:
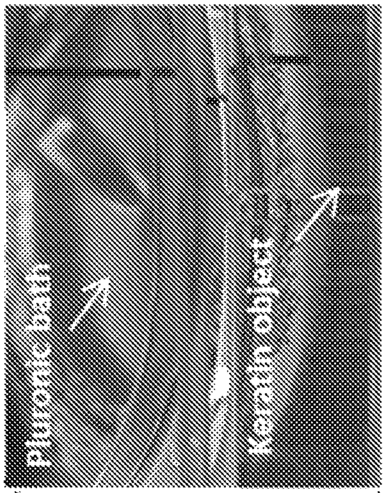
FIG. 21B is a photograph of a keratin structure 3D printed into a 3D printing supporting bath (e.g., a pluronic bath) in accordance with an example embodiment.

The keratin printing material was extruded at 40° C., under a pressure of 90 kPa and through a 27 gauge needle moving at a speed of 8 mm/s onto a support in a printing bath (see FIGS. 21A and 21B). Pluronic F127 (25% m/v water solution) was used both as an initial coagulating and supporting bath for printing. To help visualize the object structure during printing, Rhodamin B was added in the keratin printing material as tracer.

Figure 21C:
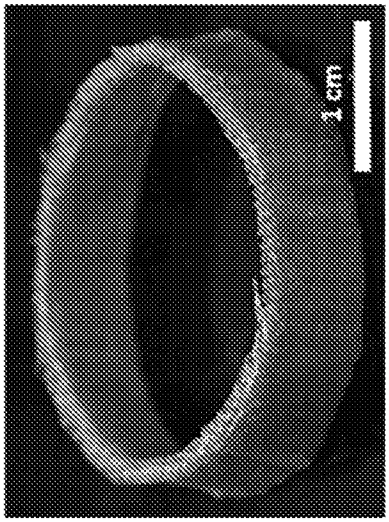
FIG. 21C is a photograph of the resulting 3D printed ring-shaped structure after being washed with a coagulating solution in accordance with an example embodiment.

After the 3D printing, the Pluronic bath was removed and the printed structure was washed with a copious amount of a cold (around 0° C.) coagulating water solution of salts such as $NaH_2PO_4$, $Na_2HPO_4$ or $CaCl_2$. The shape of the structure was permanently fixed by adding $H_2O_2$ (1% v/v) into the coagulating salt solution with the resulting fixed structure shown in FIG. 21C.

Figure 22A:
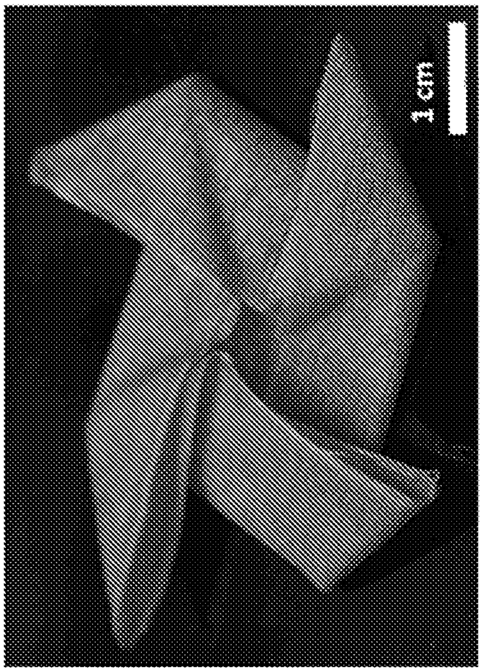
FIG. 22A is an image of a star-shaped folded shape memory structure made from a 3D printed sheet that was physically manipulated prior to fixation in accordance with an example embodiment.
Figure 22B:
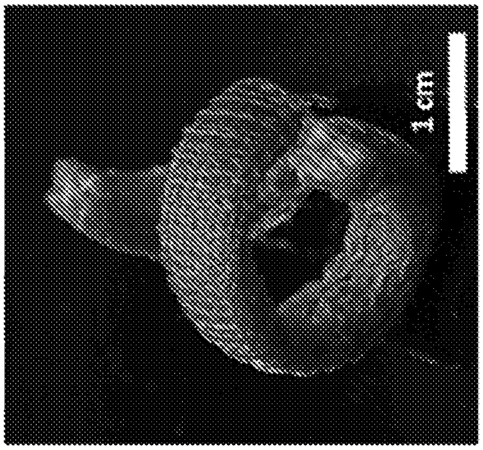
FIG. 22B is an image of a spiral-shaped structure produced by 3D printing a rod and manual manipulation prior to fixation in accordance with an example embodiment.
Figure 22C:
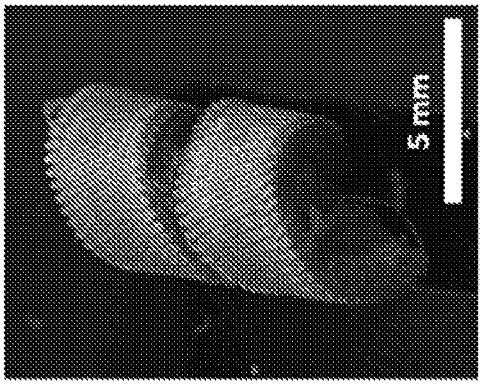
FIG. 22C is an image of another spiral-shaped structure produced by 3D printing a flat bar/stripe and manual manipulation prior to fixation in accordance with an example embodiment.

The separate $H_2O_2$ fixation treatment enables further shaping of the printed structure into a desired memory structure/configuration after the 3D printing process and thus, obtainment of more complex structures than those achieved by 3D printing alone. An origami star structure (FIG. 22A) was obtained from a 3D-printed flat sheet, which was folded into the desired star geometry, and then fixed by exposure to a fixing solution including $H_2O_2$ and a coagulating salt. The spiral structures depicted in FIGS. 22B and 22C were obtained from a 3D-printed rod and a 3D-printed flat stripe, respectively, which were shaped into spirals after printing.

Figure 23A:
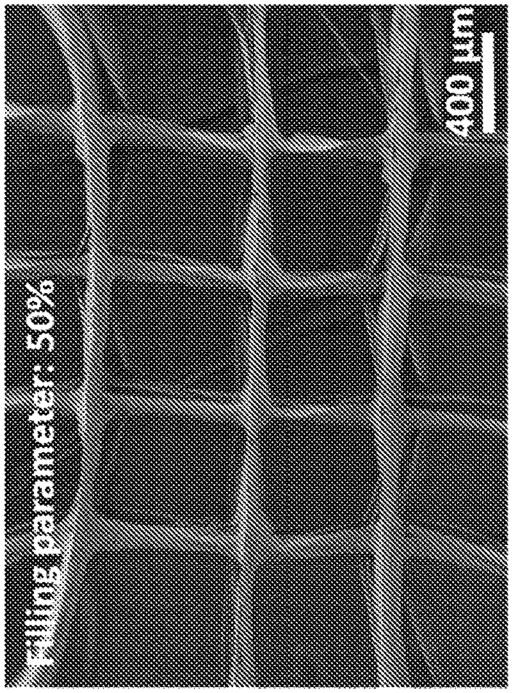
FIGS. 23A-23C include microscopic images of the interconnection of keratin fibers in 3D printed structures printed with different filling parameters. Specifically.
Figure 23B:
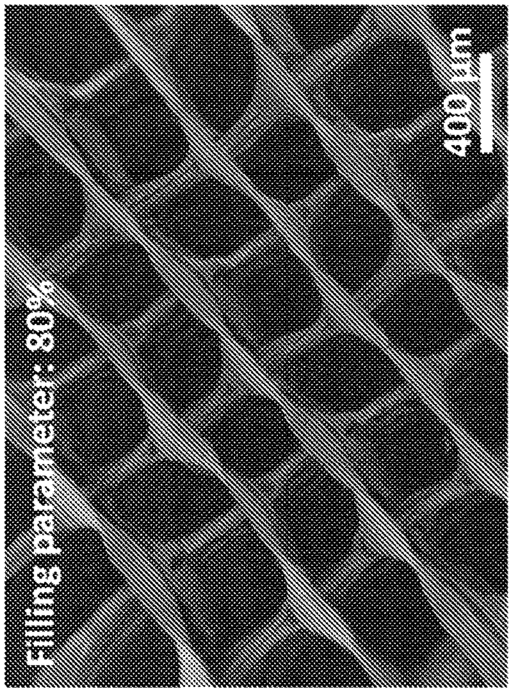
Figure 23C:
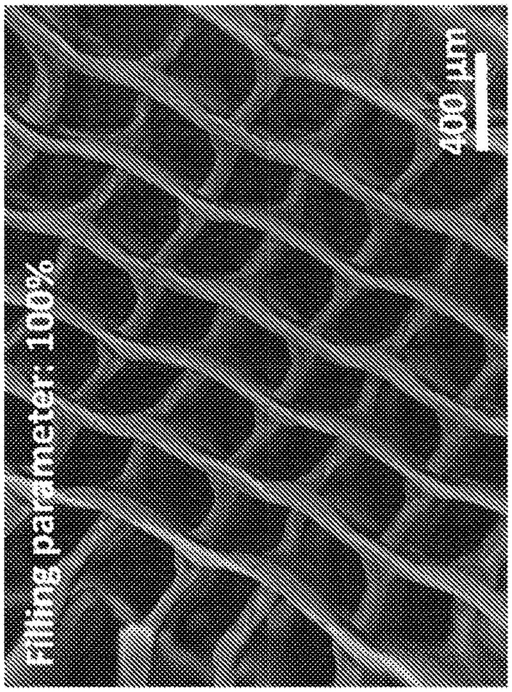

Structural characterization of the 3D-printed objects was performed by scanning electron microscopy (SEM). As depicted in FIGS. 23A-23C, The 3D printed objects were constituted by interconnected networks of keratin fibers. Different pore sizes were obtained by tuning the filling parameter of the 3D printer from 50 to 100%.

Figure 24:
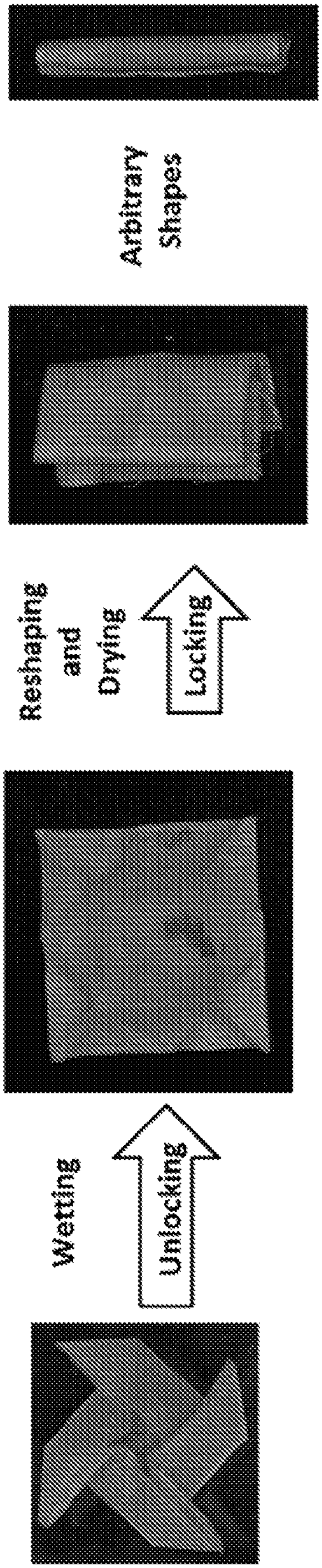
FIG. 24 includes photographic images showing the shape fixation of a 3D printed structure flat sheet folded into an origami star prior to fixation in accordance with an example embodiment.
Figure 25A:
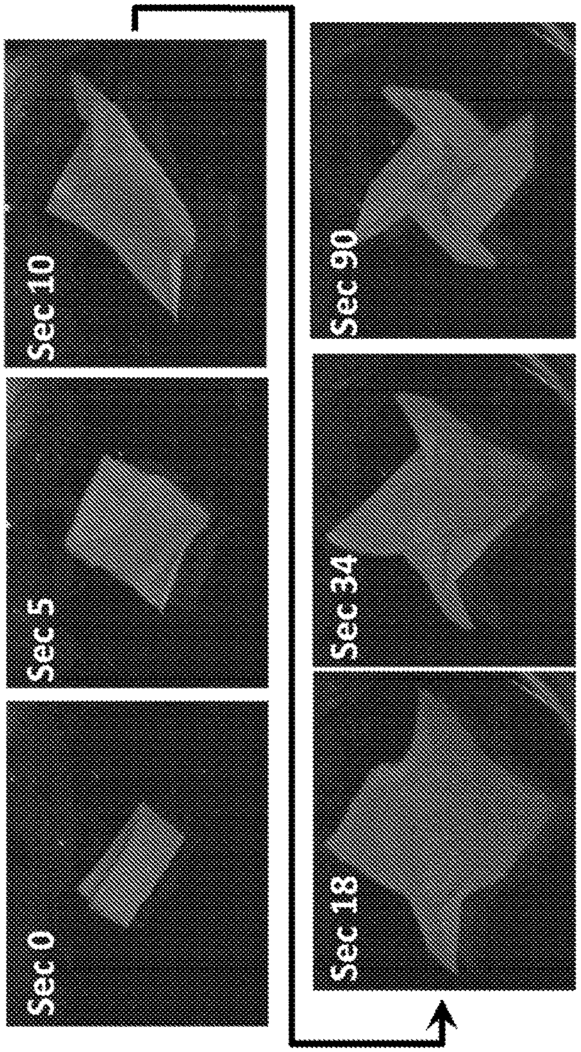
FIG. 25A includes photographic images illustrating the shape-memory effect in a star-shaped origami object made from a 3D printed sheet fixed in an star-shaped origami configuration. The images show the sheet physically manipulated into a rectangular folded configuration and returning to the origami star shape upon exposure to water.
Figure 25B:
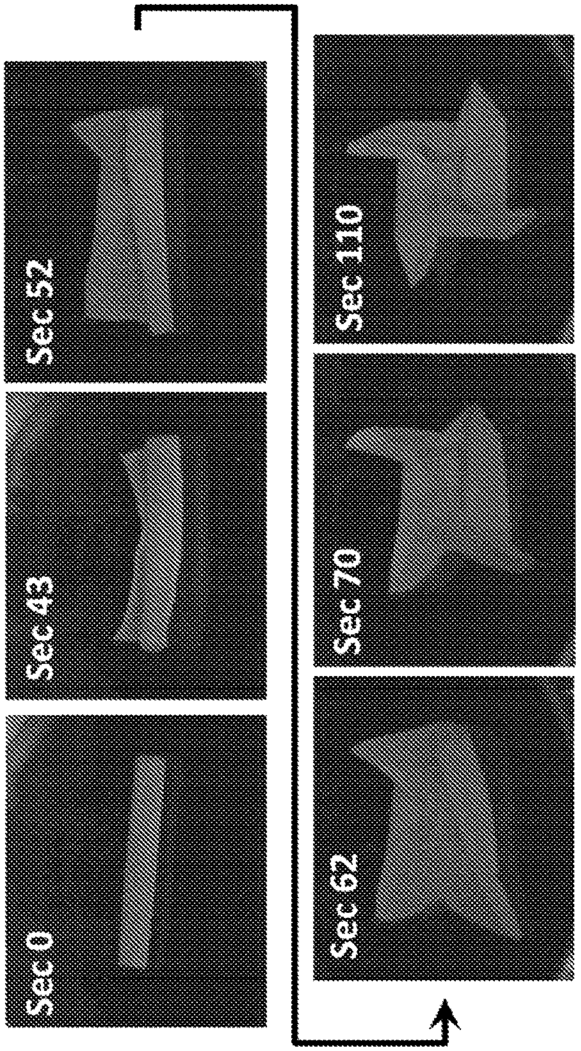
FIG. 25B includes photographic images further illustrating the shape-memory effect in the star shape origami object made from a 3D printed sheet fixed in an star-shaped origami configuration. The images show the sheet physically manipulated into a rolled configuration and returning to the origami star shape upon exposure to water.

The shape-memory effects of the 3D-printed objects was also investigated. In its hydrated state, the 3D-printed origami star is plastic and can be refolded into different arbitrary shapes. Fixation of the new structures was achieved when water was removed over a drying step (FIG. 24). Rehydration of the reshaped objects caused the recovery of the initial fixed shape of the origami star (FIG. 25)

We claim:

1. A method for preparing an alpha-keratin solution comprising alpha-keratin protofibrils and intermediate filaments in liquid crystal phase from hair for preparation of shape-memory polymeric fibers, comprising providing a hair powder;

contacting the hair powder with an aqueous solution comprising about 6 M to about 12 M of a denaturing agent and about 50 mM to about 300 mM of a reducing agent, thereby preparing a hair residue suspension comprising insoluble hair residue and a solution comprising alpha-keratin protofibrils and intermediate filaments in liquid crystal phase;

separating the insoluble hair residue from the solution comprising the alpha-keratin protofibrils and the intermediate filaments in liquid crystal phase;

contacting the solution comprising the alpha-keratin protofibrils and the intermediate filaments in liquid crystal phase with a solution comprising about 20 to about 50 mg/mL of a salt, thereby yielding a two-phase solution comprising a first solution comprising alpha-keratin protofibrils and intermediate filaments in liquid crystal phase and a first portion of the salt and a second solution comprising a second portion of the salt; and separating the first solution comprising alpha-keratin protofibrils and intermediate filaments in liquid crystal phase and the first portion of the salt from the second solution comprising the second portion of the salt, thereby preparing the alpha-keratin solution comprising alpha-keratin protofibrils and intermediate filaments in liquid crystal phase from hair for preparation of shape-memory polymeric fibers.

2. The method of claim 1, wherein the prepared alpha-keratin solution comprises between 25% and 50%(w/v) alpha-keratin protofibrils and intermediate filaments.

3. The method of claim 1, wherein contacting the hair powder with the aqueous solution of a denaturing agent and a reducing agent comprises mixing the wool powder and the aqueous solution at a temperature of about 70° C. to about 100° C. for about 16 to about 48 hours.

4. The method of claim 1, wherein the denaturing agent is LiBr and wherein the hair powder is contacted with a solution comprising about 6.25 M, about 6.5, about 6.75 M, about 7 M, about 7.25 M, about 7.5, about 7.75 M, about 8 M, about 8.25 M, about 8.5, about 8.75 M, about 8 M, about 8.25 M, about 8.5, about 8.75 M, about 9 M, about 9.25 M, about 9.5, about 9.75 M, about 10 M, about 10.25 M, about 1.5, about 10.75 M, about 11 M, about 11.25 M, about 11.5, or about 11.75 M LiBr.

5. The method of claim 1, wherein the insoluble hair residue is removed from the hair residue suspension by filtration or ultracentrifugation.

6. The method of claim 1, wherein the solution comprising about 20 to about 50 mg/mL of a salt comprises sodium chloride (NaCl), a phosphate salt, calcium chloride ($CaCl_2$)), magnesium chloride ($MgCl_2$), a sulfate salt, or a combination of any of aforementioned.

7. The method of claim 1, wherein the first solution comprising alpha-keratin intermediate filaments in liquid crystal phase and the first portion of the salt is separated from the second solution comprising the second portion of the salt by filtration.

8. The method of claim 2, wherein the prepared alpha-keratin solution comprises between 40% and 50%(w/v) alpha-keratin protofibrils and intermediate filaments.

9. The method of claim 1, wherein the hair is animal hair or human hair.

10. The method of claim 9, wherein the hair is wool.

11. The method of claim 4, wherein the hair powder is contacted with a solution comprising about 8 M LiBr.

12. The method of claim 1, wherein the reducing agent is dithiothreitol (DTT).

13. The method of claim 12, wherein the hair powder is contacted with a solution comprising about 75 mM, about 100 mM, about 125 mM, about 150 mM, 175 mM, 200 mM, about 225 mM, about 250 mM, or about 275 mM DTT.

14. The method of claim 13, wherein the hair powder is contacted with a solution comprising about 150 mM DTT.

15. The method of claim 5, wherein the filtration is performed at a temperature of about 70° C. to about 100° C.

16. The method of claim 1, wherein the solution comprising about 20 to about 50 mg/mL of a salt comprises about 21, 22, 23, 24, 25, 26, 27, 28, 29, 30, 31, 32, 33, 34, 35, 36, 37, 28, 39, 40, 41, 42, 43, 44, 45, 46, 47, 48, or about 49 mg/ml NaCl.

* * * * *